United States Patent
Choudhury et al.

(10) Patent No.: US 9,730,029 B2
(45) Date of Patent: Aug. 8, 2017

(54) UNSUPERVISED INDOOR LOCALIZATION AND HEADING DIRECTIONS ESTIMATION

(71) Applicant: DUKE UNIVERSITY, Durham, NC (US)

(72) Inventors: Romit Roy Choudhury, Champaign, IL (US); He Wang, Urbana, IL (US); Nirupam Roy, Urbana, IL (US); Souvik Sen, Palo Alto, CA (US); Moustafa Youssef, Conway, AR (US); Ahmed Elgohary, Alexandria (EG); Moustafa Farid, Alexandria (EG)

(73) Assignee: Duke University, Durham, NC (US)

(*) Notice: Subject to any disclaimer, the term of this patent is extended or adjusted under 35 U.S.C. 154(b) by 0 days.

(21) Appl. No.: 14/441,284

(22) PCT Filed: Nov. 8, 2013

(86) PCT No.: PCT/US2013/069178
§ 371 (c)(1),
(2) Date: May 7, 2015

(87) PCT Pub. No.: WO2014/074837
PCT Pub. Date: May 15, 2014

(65) Prior Publication Data
US 2015/0281910 A1    Oct. 1, 2015

Related U.S. Application Data

(60) Provisional application No. 61/723,919, filed on Nov. 8, 2012, provisional application No. 61/842,083, filed on Jul. 2, 2013.

(51) Int. Cl.
*H04W 4/04*     (2009.01)
*G01S 5/02*     (2010.01)
(Continued)

(52) U.S. Cl.
CPC ............ *H04W 4/04* (2013.01); *G01C 21/165* (2013.01); *G01C 21/206* (2013.01);
(Continued)

(58) Field of Classification Search
CPC ........ H04W 4/04; H04W 4/025; H04W 4/005
(Continued)

(56) References Cited

U.S. PATENT DOCUMENTS

2007/0205886 A1*  9/2007  Huseth ............... A62B 9/006
                                               340/539.15
2010/0127935 A1    5/2010  Huang et al.
(Continued)

OTHER PUBLICATIONS

International Search Report and Written Opinion issued in International Application No. PCT/US2013/069178, mailed on Feb. 21, 2014; 14 pages.
(Continued)

*Primary Examiner* — Cong Tran
(74) *Attorney, Agent, or Firm* — Talem IP Law, LLP

(57) ABSTRACT

Systems and methods for unsupervised indoor localization are provided. Sensor data obtained from a device carried by a user can be used to simultaneously estimate the indoor location of a user and identify landmarks within the indoor environment based on their signatures. The landmarks can be used to reset the location estimate of the user, and the location estimate of the user can be used to improve the learned location of the landmarks. This recursive process leads to excellent accuracy in indoor localization. Systems and methods for estimating the heading direction of a user are also provided. Sensor data obtained from the user can be used to analyze the forces acting on the user in order to give an accurate heading direction estimate.

11 Claims, 30 Drawing Sheets

(51) Int. Cl.
*G01C 21/16* (2006.01)
*G01C 21/20* (2006.01)
*G01C 22/00* (2006.01)
*H04W 4/00* (2009.01)
*H04W 4/02* (2009.01)

(52) U.S. Cl.
CPC ............ *G01C 22/006* (2013.01); *G01S 5/021* (2013.01); *H04W 4/005* (2013.01); *H04W 4/025* (2013.01)

(58) Field of Classification Search
USPC ... 455/456.1, 457, 404.2, 414.1, 414.2, 440, 455/41.1, 41.2
See application file for complete search history.

(56) References Cited

U.S. PATENT DOCUMENTS

| | | | |
|---|---|---|---|
| 2010/0250134 A1* | 9/2010 | Bornstein | G01C 21/12 701/500 |
| 2012/0143495 A1* | 6/2012 | Dantu | G01C 21/206 701/428 |
| 2012/0214511 A1 | 8/2012 | Vartanian et al. | |
| 2012/0214515 A1 | 8/2012 | Davis et al. | |
| 2012/0225663 A1 | 9/2012 | Gupta et al. | |
| 2012/0232792 A1 | 9/2012 | Ding et al. | |
| 2013/0101163 A1* | 4/2013 | Gupta | G06K 9/00671 382/103 |
| 2013/0281111 A1* | 10/2013 | Syrjarinne | H04W 64/00 455/456.1 |
| 2014/0114561 A1* | 4/2014 | Pakzad | G01C 21/206 701/410 |
| 2014/0256356 A1* | 9/2014 | Shen | H04W 4/023 455/456.3 |
| 2015/0133148 A1* | 5/2015 | Yang | G06F 17/30289 455/456.1 |

OTHER PUBLICATIONS

"RADAR: An In-Building RF-based User Location and Tracking System" by Paramvir Bahl, et al.; in INFOCOM, 2000; 11 pages.

"The Horus WLAN Location Determination System" by Moustafa Youssef, et al.; MobiSys '05: The Third International Conference on Mobile Systems, Applications, and Services; 2005; 14 pages.

"Accuracy Characterization for Metropolitan-scale Wi-Fi Localization" by Yu-Chung Cheng, et al.; MobiSys '05: The Third International Conference on Mobile Systems, Applications, and Services; 2005; 13 pages.

"ActiveCampus: Experiments in Community-Oriented Ubiquitous Computing" by William G. Griswold, et al.; in Computer, Oct. 2004; 9 pages.

"SurroundSense: Mobile Phone Localization via Ambience Fingerprinting" by Martin Azizyan, et al.; MobiCom '09, Beijing, China; Sep. 2009; 12 pages.

"Indoor Localization Without the Pain" by Krishna Chintalapudi, et al.; MobiCom '10, Chicago, Illinois; Sep. 2010; 12 pages.

"WiFi-SLAM Using Gaussian Process Latent Variable Models" by Brian Ferris, et al.; in Proceedings of the 20th International Joint Conference on Artificial Intelligence; 2007; 6 pages.

"Indoor Localization without Infrastructure using the Acoustic Background Spectrum" by Stephen P. Tarzia, et al.; MobiSys '11, Bethesda, Maryland; Jul. 2011; 14 pages.

"A Practical Approach to Recognizing Physical Activities" by Jonathan Lester, et al.; in Pervasive Computing; 2006.

* cited by examiner

UNSUPERVISED INDOOR LOCALIZATION AND HEADING DIRECTIONS ESTIMATION

CROSS-REFERENCE TO RELATED APPLICATIONS

This application is the U.S. national stage application of International Application Serial No. PCT/US2013/069178, filed Nov. 8, 2013, which claims the benefit of U.S. Provisional Application Ser. No. 61/723,919, filed Nov. 8, 2012, and U.S. Provisional Application Ser. No. 61/842,083, filed Jul. 2, 2013, both of which are hereby incorporated by reference herein in their entireties, including any figures, tables, and drawings.

GOVERNMENT SUPPORT

This invention was made with government support under Grant No. NSF Grant No. CNS 0747206 and NSF Grant No. U.S. Pat. No. 0,910,846. The government has certain rights in the invention.

BACKGROUND

Localization refers to the process by which an object's location is determined. Outdoor localization, for example, through global positioning systems (GPS) is prevalent. However, indoor localization is not common, partly due to the spatial granularity requirements that place a burden on a system to achieve fairly high location accuracy. For instance, while a five-meter location error outdoors may still indicate the same street, a five-meter location error in an indoor environment may mean an entirely different room in a building or two different aisles in a grocery store, which would render an inventory-management application that needs aisle-level precision inoperable.

While high precision may be attainable with pervasive WiFi systems, this comes at what may be prohibitively high cost, mostly in the form of meticulous signal calibration. Also, such calibration is not necessarily a one-time cost since radio frequency (RF) fingerprints could change, for example, due to changes in layout and objects in the indoor environment. Attempting to simplify the calibration process in the related art has led to significantly reduced location accuracy. This tradeoff between accuracy and calibration overhead has been an important challenge to the development of an accurate indoor localization system with low calibration overhead.

BRIEF SUMMARY

Techniques and systems for indoor localization are described.

A system for unsupervised indoor localization can include at least one sensor, a list of landmarks of an indoor environment stored on the one or more computer-readable storage media; and an unsupervised indoor location application embodied in program instructions stored on the one or more computer-readable storage media that, when executed by a processing system, direct the processing system to: determine an estimated current location of a user; collect sensor data from the at least one sensor for a period of time; estimate a location of the user using the sensor data, the period of time, and the list of landmarks; determine an existence of a new organic landmark and add any new organic landmarks to the list of landmarks; and update location of the user.

In an embodiment, a system includes a computer-readable medium having computer-executable instructions for performing a method comprising estimating the indoor location of a user of the system. Estimating the indoor location of the user can include performing dead-reckoning using sensor data calibrated (and re-calibrated) from seed and organic landmarks and determining the location of at least one organic landmark using sensor data. The sensor data used for determining the location the at least one landmark can be the same as, have some overlap with, or be different from the sensor data used for dead-reckoning.

In an embodiment, a system can include an application or "app" running on a mobile device of a user of the system. The app can run completely locally on the mobile device or can communicate with one or more other devices (e.g., a server and/or computing devices such as computers and/or mobile devices) over a network (e.g., a WiFi network or cellular network). Sensor data obtained by the mobile device of the user can be stored locally on the mobile device, on a server, on other computing devices in communication with the user's mobile device, or some combination thereof. In a particular embodiment, sensor data is collected over a network from multiple uses of the system (e.g., from multiple users each using a mobile device which may be different from that of other users) and stored on a server. Then, a user of the system can access the data previously collected, which can help improve the accuracy of the indoor localization of that user.

Techniques for unsupervised indoor localization can include: in response to receiving first sensor data, estimating a projected location of a user in an indoor environment by using the first sensor data, last known location, and time since the user was at the last known location; determining a presence of another known location, wherein the another known location is an estimated indoor location based on a distinct signature detected by one or more sensors providing the first sensor data; and, in response to determining the presence of the another known location, adjusting the projected location and estimating a second projected location of the user by using a second sensor data provided by the one or more sensors, the another known location, and time since the user was at the another known location.

According to another implementation, a method of unsupervised indoor localization can include estimating a location of a user within an indoor environment by estimating a movement trace of the user within the indoor environment using first sensor data obtained from at least one sensor; and identifying at least one landmark within the indoor environment using second sensor data obtained from the at least one sensor.

A method for identifying landmarks within an indoor environment can include obtaining sensor data from at least one device carried by a user within the indoor environment; analyzing the sensor data to identify sensor signatures of the sensor data within the indoor environment; comparing the sensor data against known sensor signatures for building entrances, staircases, elevators, and escalators to determine the existence and quantity of such structures within the indoor environment; and determining an existence of any organic landmarks by the presence of a unique sensor signature within the indoor environment that is repeated within a predetermined threshold and/or across a predetermined number of users. The sensor data may be obtained from at least one sensor of the device, for example, an accelerometer, compass, gyroscope, magnetometer, barometer, microphone, light sensor, temperature sensor, chemical sensor, humidity sensor, Bluetooth signal strength sensor, WiFi signal strength sensor, or cellular signal strength sensor.

Techniques for estimating a heading direction of a user are also described. In some implementations, the heading direction estimation can be used when performing indoor localization. According to an example technique heading direction of a user may be estimated by: obtaining sensor data from a device carried by the user, wherein the sensor data comprises accelerometer data and gyroscope data; detecting a motion mode of the user by analyzing the accelerometer data; detecting a number of steps of the user by analyzing the accelerometer data in view of the motion mode; determining an initial heading direction of the user in three-dimensional space using the gyroscope data and the number of steps; determining a heading direction vector of the user by estimating the heading angle of the user relative to a reference direction; and projecting the heading direction vector onto a plane on which the user is moving to estimate the heading direction of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations and examples are described in connection with these drawings, the disclosure is not limited to the implementations and examples disclosed herein.

DETAILED DESCRIPTION

Techniques and systems for indoor localization are described. Through a mobile device running a trace program as described herein, a user's location within a building or other indoor environment can be tracked (upon the permission of the user). The localization—tracking—can be accomplished through unsupervised techniques. That is, landmarks are not required to be labeled in order for localization to be carried out. In the systems described herein, landmarks are not labeled upon identification, nor do they need to be. The system can recognize a landmark based on the landmark's sensor signature only and need not understand what the function (if any) of the landmark is within the indoor environment. Certain techniques described herein can evaluate an interior and a user's course within the interior through clustering of data points indicating possible landmarks.

Embodiments of the subject invention provide systems and methods for unsupervised indoor localization without the need for searching for a WiFi wireless network in a geographic location (also referred to as "war-driving"). Instead of searching for and relying on WiFi access points that may or may not exist in an indoor environment, one or more sensors are used to detect and determine the existence of identifiable signatures in one or more sensing dimensions.

Identifiable signatures can include, for example: an elevator, which can impose a distinct pattern on an accelerometer (e.g. an accelerometer of a device, for example a mobile device such as a smartphone); a corridor and/or corner of a building, which can have a unique or relatively unique set of WiFi access points available in range; and/or a particular location in a building that has an unusual (i.e. distinct from background) magnetic fluctuation. These types of signatures naturally exist in the environment of a building, and systems and methods of the subject invention can consider these as internal, or indoor, landmarks of a building.

One or more sensors, for example, those existing on a mobile device, can be used detect these landmarks; the detected landmarks can then be used to calibrate and/or recalibrate the location of a user on or near where the sensor(s) are located. This calibration and/or recalibration can be part of a "dead reckoning" process where the current user position is calculated based on a previously determined position and known or estimated speeds over elapsed time. The internal landmarks determined from the identifiable signatures can provide a new "fix" from which a new dead reckoning calculation may begin. This enables "tracking" of a user.

Figure 1:
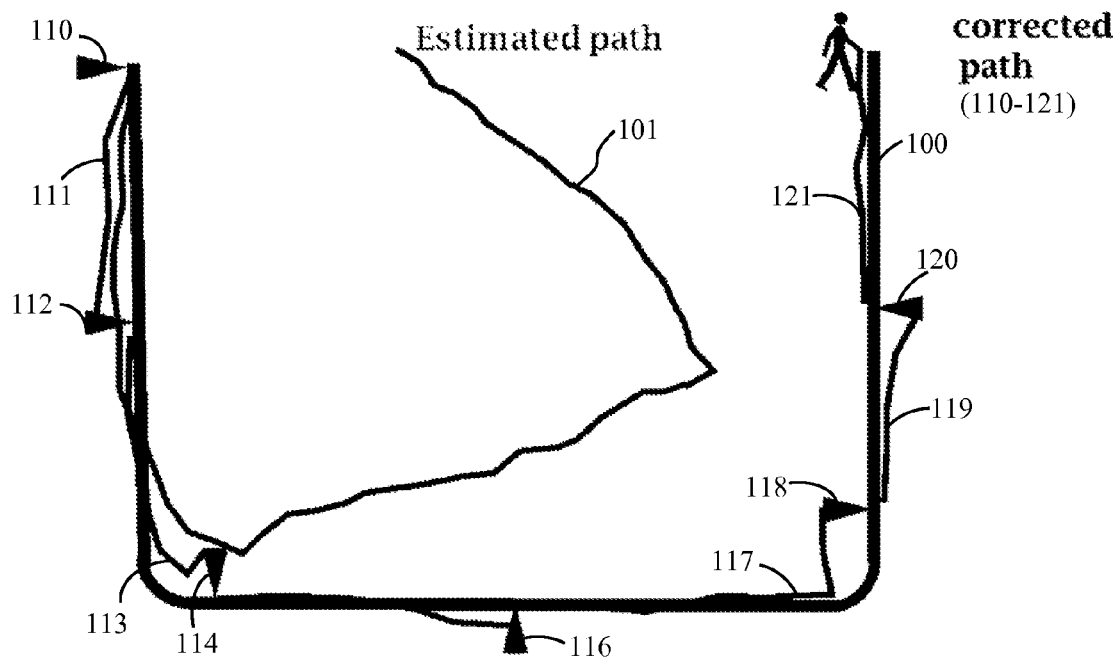
FIG. 1 illustrates error correction in dead reckoning.

FIG. 1 illustrates error correction in dead reckoning. Referring to FIG. 1, a user's walking path 100 may be estimated. Calculations using only dead-reckoning can have error as shown in estimated path 101, so it is advantageous to reset calculations along the walking path 100. To estimate the user's location (e.g., performing the dead reckoning with known locations along the walking path 100), motion vectors can be computed from the recorded sensor reading(s), and the location can be computed via dead reckoning projections from the last "known" location.

The dead-reckoning error can be periodically reset using landmarks in the environment. For example, an initial fix 110 may be a known location. Then, a first projected path 111 can be corrected/reset through a first recognized landmark 112; a second projected path 113 can be reset through a second recognized landmark 114; a third projected path 115 can be reset through a third recognized landmark 116; a fourth projected path 117 can be reset through a fourth recognized landmark 118; a fifth projected path 319 can be reset through a fifth recognized landmark 120; and a sixth projected path 121 can complete a corrected path (110-121).

The dead-reckoning can include estimating a movement trace of the user using sensor data, which can be obtained from, for example, a mobile device (e.g., cell phone/smart phone; wearable computer). The sensor data used for dead-reckoning can be obtained from sensors of the device and can include, but are not limited to, data from one or more of a compass, an accelerometer, a gyroscope, a magnetometer, a WiFi antenna, a GPS sensor, a microphone, a camera or other light sensor, a temperature sensor, a chemical sensor, a humidity sensor, a Bluetooth antenna, and/or a barometer. The sensor data used for determining the location of the at least one landmark can also be obtained from sensors of the device and can include but are not limited to data from one or more of a compass, an accelerometer, a gyroscope, a magnetometer, a WiFi antenna, a GPS sensor, a microphone, a camera or other light sensor, a temperature sensor, a chemical sensor, a humidity sensor, a Bluetooth antenna, and/or a barometer. In various implementations, WiFi, 3G, 4G, LTE (Long Term Evolution radio platform), WiMax, GSM (Global System for Mobile communications), Bluetooth, near field communication (NFC), AM radio, FM radio, and/or similar signals can also be used as sensor data for determining the walking trace of a user and/or the location of a user and/or a landmark.

For reduced power consumption, sensors that consume less energy may be used more frequently than sensors that consume more energy. In some cases, the sensor data may be entirely or mostly obtained from passive sensors (e.g., sensors that do not require battery power for operation). In some cases, energy harvesting circuits may be included to improve power consumption of a battery of the mobile device.

The location(s) of a user and/or a landmark can be simultaneously or separately determined. This can be done in such a manner such that the locations converge quickly. Neither WiFi search (and mapping) nor floor plans are necessary, though certain embodiments can use one or more of these.

Figure 2:
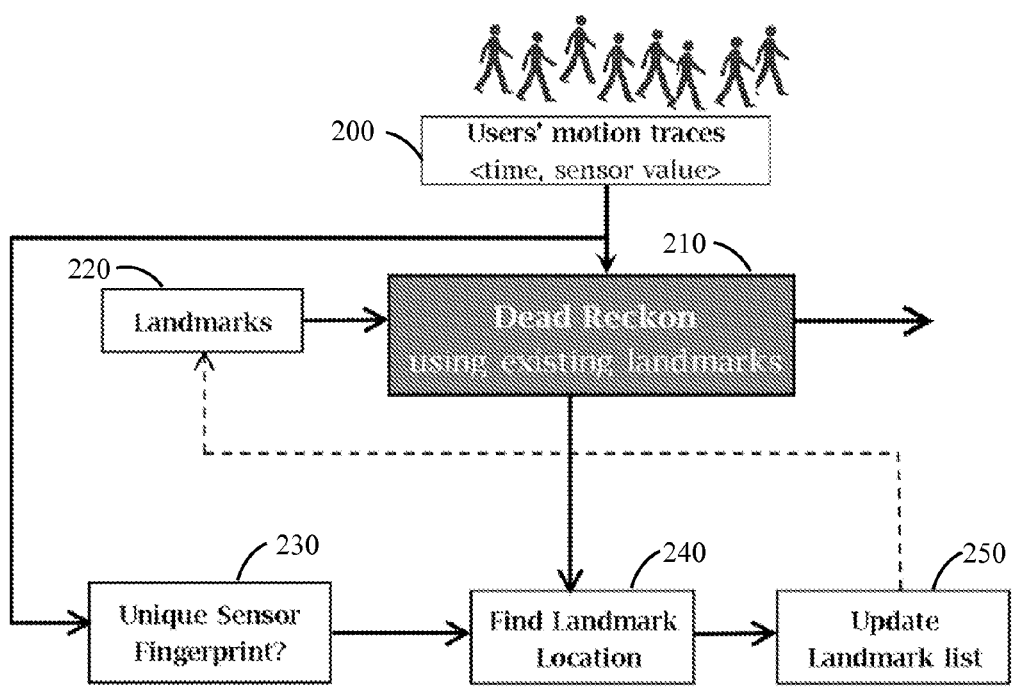
FIG. 2 shows a diagram illustrating indoor localization according to an embodiment of the subject invention.

FIG. 2 shows a diagram illustrating indoor localization according to an embodiment of the subject invention. One or more users' motion can be traced using time and sensor value data. In operation, a motion trace (200) receives sensor data from a user's device. The user may be moving about an indoor area or may be stationary. To determine the location of a user, for example to provide targeted advertisements or directions, dead reckoning (210) is performed on the sensor data (and time information) using indoor landmarks (220) known to the system.

The sensor and time values are also analyzed to determine whether there is a unique sensor fingerprint (230). Where there is a unique fingerprint, a landmark location can be ascertained (240). The landmark list can be updated (250) to include the new landmark location (and made available in the set of indoor landmarks 220 used to perform the dead reckoning (210)). In addition, a user's position information can be used to improve estimations of the locations of landmarks (thus, an output from dead reckoning (210) may be provided to find a landmark location (240)).

The motion trace can be implemented as part of an application that can run on a mobile device. The application can be a client application that communicates with a server to retrieve data regarding landmarks. Aggregated data from multiple users can be provided to supplement the landmark listing and improve estimations of the locations of the landmarks.

According to various implementations, the landmarks may be known to the system from data collected by previous interactions with the user and a particular indoor environment, by previous interactions between other users and the particular indoor environment, or by current interactions with the user and the particular indoor environment.

As one example of landmarks known to the system from data collected by previous interactions between the user and a particular indoor environment, a user's computing device (e.g., phone) may collect sensor readings as the user goes about her or his business. For example, the user may walk around a grocery store, library, movie theater, mall, university campus, and the like while the user's computing device collects sensor readings in the background and computes landmarks. Later, when the user visits any one of the previously traveled places, the landmarks that the user collected (i.e. "personal" landmarks) can now be matched, enabling the system to know the user's location. Self-localization to known landmarks can be performed so long as the user has traversed a location once before.

As one example of landmarks known to the system from data collected by previous interactions between other users and the particular indoor environment, two users of the system may have personal landmarks for their respective grocery stores. If these two users select to share their landmarks with each other, then each user can go to both grocery stores and localize themselves. In further implementations, friends on a social media site (e.g., FACEBOOK), employees of an office, or even strangers using the subject motion trace applications or systems may choose to share their landmarks with each other, which generates a repository of landmarks that enable each user to receive localization services at any place where at least one other user has visited in the past.

Figure 3A:
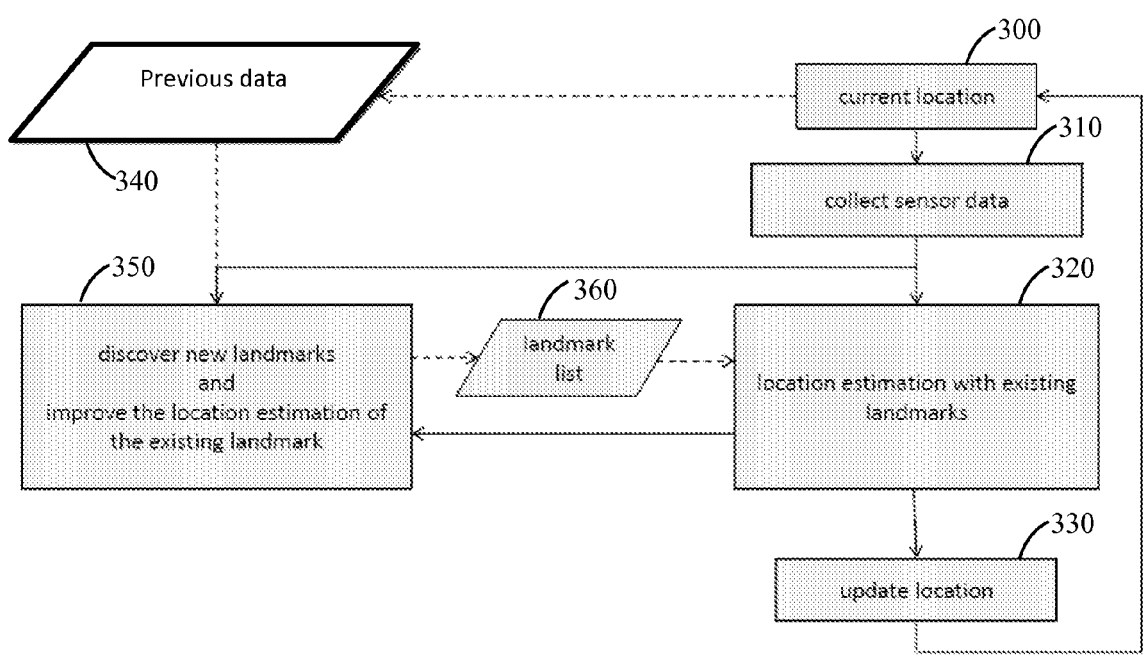
FIG. 3A shows a process flow for indoor localization according to an embodiment of the subject invention.
Figure 3B:
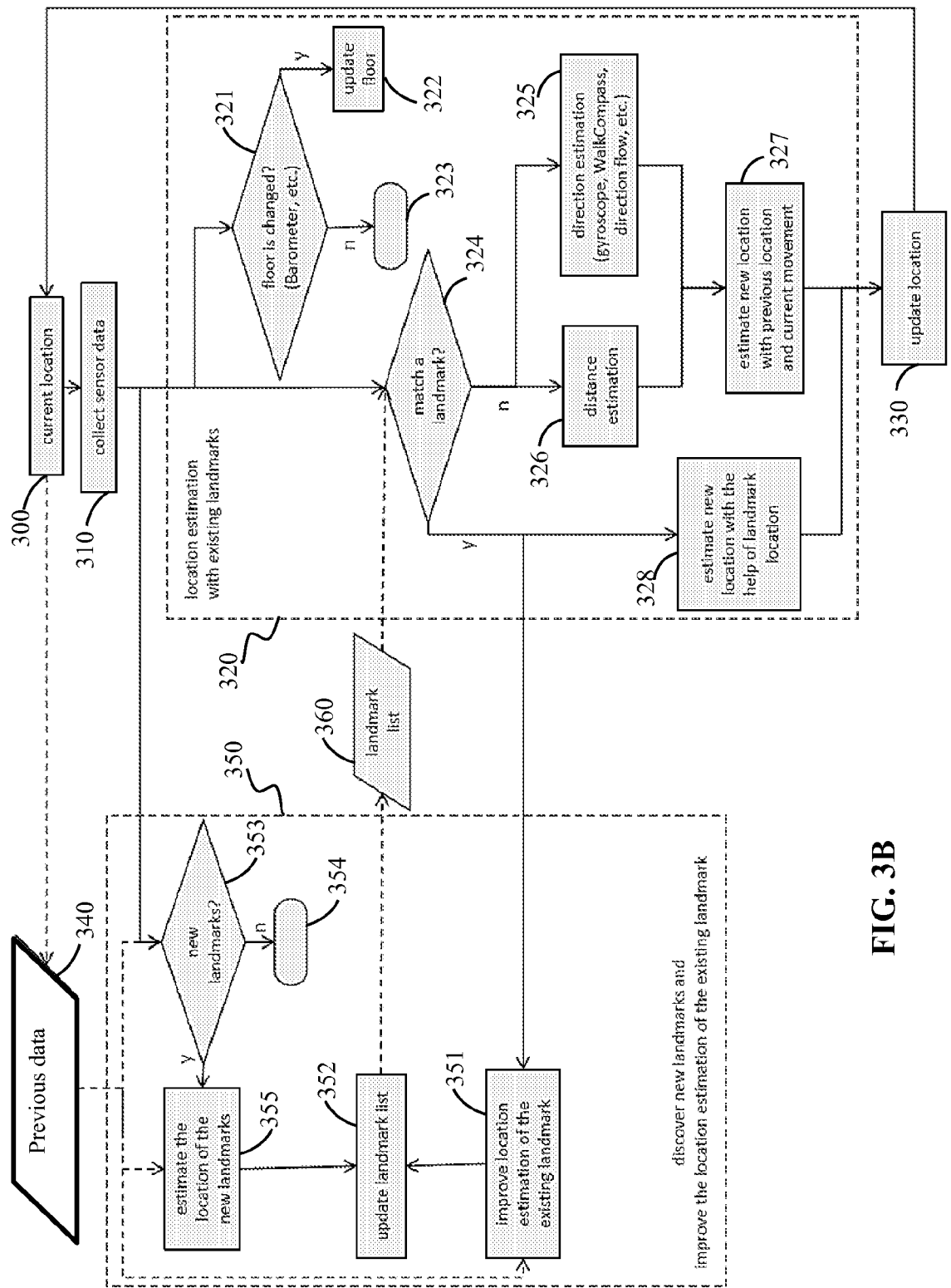
FIG. 3B shows an example process flow for indoor localization.

FIG. 3A shows a process flow for indoor localization according to an embodiment of the subject invention; and FIG. 3B shows an example process flow for indoor localization. A current location data point (300) can be determined and sensor data collected (310) to determine a projected location via location estimation with existing landmarks (320). The estimated location can then be updated (330) and used as the current location (e.g., 300) in a recursive manner. The current location information can be uploaded or otherwise provided to the system along with previous data (340) (which may be from the same user or multiple other users). The collected sensor data (310) can be used to discover new landmarks and improve the location estimation of existing landmarks (350). New landmarks can be added to a landmark list 360, which is used to perform the location estimation (320). Location estimation improvements can be made by incorporating the landmark indicia and its location along with previous data from multiple users when discovering new landmarks and improving the location estimation of existing landmarks (350). Location estimation improvement is useful because a same landmark may be indicated to be at different locations due to error tolerances in the estimations across multiple users (e.g., from differences in sensors on those user's devices as well as each user's stride and/or mannerisms)

According to one implementation, the location estimation with existing landmarks (320) can include, in response to receiving sensor data, determining whether the floor is changed (321). If sensor information, for example from a barometer, indicates that a floor is changed (e.g., a user is now on a second floor), the floor information can be updated (322). Otherwise, no update (323) to floor information is needed. A particular floor may be identified by the landmarks on the floor and a determination that the floor has changed. The sensor data (and landmark list 360) are also used to determine whether the data matches a signature of a landmark (324). If there is no matching landmark, direction estimation can be performed using one or more of a gyroscope, compass, direction flow and the like (325) and distance is estimated (326) in order to estimate a new location with previous location and current movement (327). If there is a matching landmark, a new location is estimated with the help of landmark location (328).

A matching landmark is also provided to improve the location estimation of the existing landmark (351) and the improved location estimation is provided to update the landmark list (352). The discovering of new landmarks and improving the location estimation of the existing landmark (350) can also include, in response to receiving sensor data (as well as previous data), determining whether there is a new landmark indicated by the data (353). No new landmark may be found (354), but if there is a determination that a new landmark is found, the location of the new landmark is estimated (355) using the previous data as well as the data collected from the sensors. The landmark indicia and its estimated location is provided to updated the landmark list (352).

Accordingly, sensor data can be collected and used to estimate location (with existing landmarks) and discover new landmarks and improve the location estimation of existing landmarks. Previous data (from the same and/or other users) can also be used to discover new landmarks and improve the location estimation of existing landmarks. This information updates the landmark list, which is also used to estimate the user's location, and the user's location may be used to help improve the location of existing landmarks. The location is updated, and sensor data is collected to repeat the steps. The process is continuous, with sensor data being collected and used to update the landmark list, while the landmark list is also used to estimate the user's location.

According to certain implementations of the subject invention, the indoor landmarks (LMs) can be thought of as belonging to two different classes, seed landmarks (SLMs) and organic landmarks (OLMs).

SLMs are certain structures and/or areas in a building that force users to behave in predictable ways and/or have predictable sensor signatures. SLMs can include, but are not limited to, entrances, elevators, stairs, and escalators. For example, a building entrance can be characterized by a noticeable drop in a Global Positioning System (GPS) confidence when a user moves from an outdoor environment to an indoor environment. If a user enters a building and possesses a device having an active GPS function, the system can recognize the drop in GPS confidence and infer that the user is at an entrance. As another example, an elevator can exhibit a distinct accelerometer signature, emerging from the start and stop of the elevator. If a user uses an elevator in a building, the user's trace can be expected to contain the elevator signature embedded therein.

OLMs are locations that have recognizable signature across one or more sensing dimensions. Embodiments of the subject invention are based, in part, on the surprising discovery that locations within a building that may appear generic to the naked eye, offer these signatures that can be recognized and used to significantly improve the accuracy of indoor localization. One example of such signatures is found in the magnetic domain, where metals in a specific location may produce unique and reproducible fluctuations on a magnetometer near that location. Signatures may additionally or alternatively be WiFi-based, for example, where a particular location enables a device to get ("overhear") messages from a particular set of WiFi base stations and/or access points (APs) that may not be available (e.g., "overheard") at short distances away from that location. Conversely, a "dead" spot, where a device may not be able to get any WiFi or GSM/3G signals, may function as a signature (e.g., in a building that has WiFi and/or cellular access throughout most of the remainder of the building). Further, even a water fountain could be a signature, such that users that stop to drink water may exhibit some common patterns on an accelerometer and/or magnetometer.

The nature of an OLM is such that it does not need to be known ahead of time (or at all). In an embodiment, a threshold can be set within the system to require a signature within one or more sensing domains to be different and/or repeated across multiple uses of the system. Once a particular signature meets the threshold, the system can determine that location to be an OLM, and that OLM can then be used to improve the indoor localization system during future uses whenever that LM's signature is noted by the system. Whenever the pattern of a known landmark surfaces on a user's trace, it can be used to reset the location and thereby reset the error that may have been accumulated during dead-reckoning from the time since the previously known landmark within the building was used as the fix.

Figure 4:
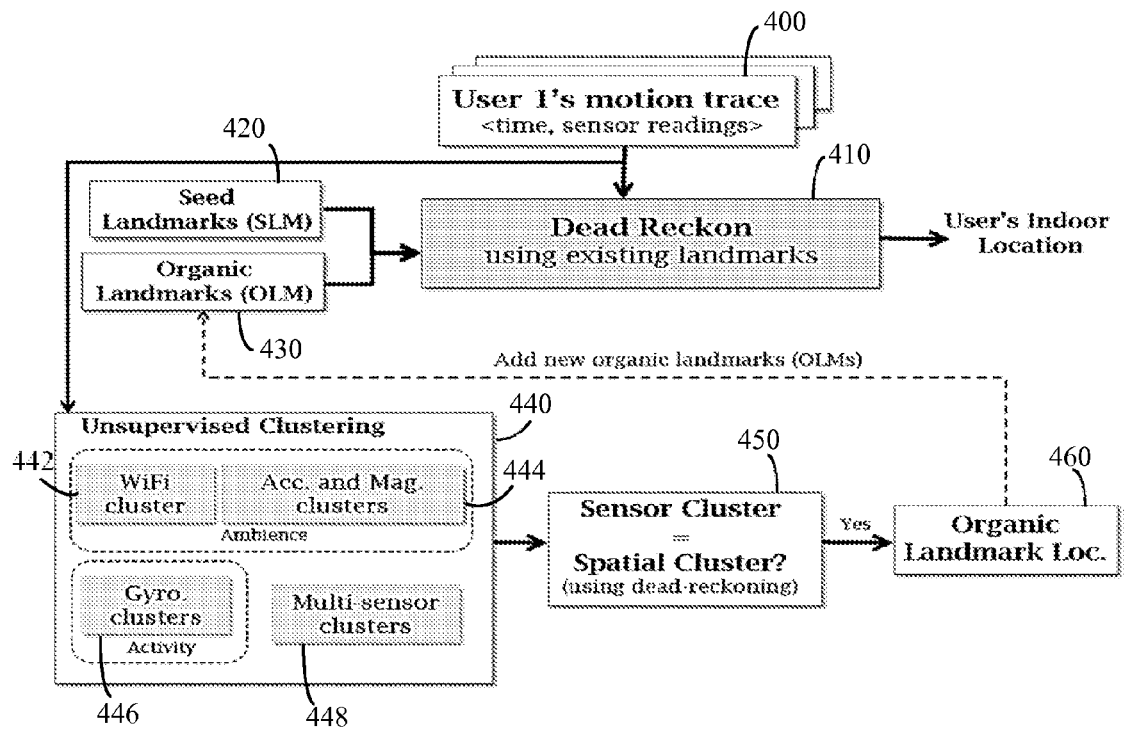
FIG. 4 shows a diagram illustrating indoor localization according to an embodiment of the subject invention.

FIG. 4 shows a diagram illustrating indoor localization according to an embodiment of the subject invention. The steps illustrated in FIG. 4 may be implemented as a motion trace program executed by a processor. Referring to FIG. 4, a user motion trace (400) can carry out indoor localization in response to receiving time and sensor data.

Dead reckoning (410) can be performed to determine a user's indoor location based on known landmarks, for example seed landmarks (SLMs) 420 and organic landmarks (OLMs) 430 as stored in a database (or data file stored on the mobile device).

The landmarks may be used as a recognized fix from which the dead reckoning calculations are performed. For example, the stored signatures of an SLM can be used with no prior information about the building in order to track the user. That is, in an embodiment, the first SLM identified can be used as an origin (or "fix") from which all other landmarks and all traces of the user can be plotted.

Whenever the signature of a LM, for example a SLM such as an elevator, is recognized, the system can localize the user at that time. The user's trace can then be estimated using dead-reckoning until another landmark signature is recognized. In certain embodiments, a floor plan of the building can be known, such that the location of one or more (or, in some cases, all) SLMs can be known.

The sensor data can be used to simultaneously track the user through the dead reckoning and to perform unsupervised clustering in an attempt to identify new landmarks and/or match up with landmarks already known to the system. The sensor data is mined to identify signatures of potential new landmarks. These landmarks can help in improving localization accuracy during subsequent uses, either by the same user or by a different user.

The organic landmarks (OLMs) 430 may not be known a priori and can vary across different buildings. Thus, they may have to be learned dynamically. In an embodiment, sensor data can be subjected to a clustering algorithm. Accordingly, in addition to performing a dead reckoning (410) using known landmarks, the sensor readings over time can be used in performing unsupervised clustering (440). Any sensor available to the mobile device can individually, and even in combination, have its data be used to cluster similar readings/values. For example, ambience can be detected through WiFi related data 442 and/or accelerometer and magnetometer data 444. Activity can be detected through movement data 446 received from gyroscope sensors. Other clustering may be carried out using combination data 448 from one or more sensors in combination.

The clusters grouped by sensor feature can then be analyzed based on location of the cluster members to determine if the sensor cluster is also spatially clustered (450). A spatially clustered sensor feature cluster can be identified as an organic landmark location (460) and added to a database of organic landmarks 430. The spatial location of the cluster can be based on dead-reckoning from a known position (which may be a previously identified location).

During the motion trace program (400), sensor data can be continuously mined to attempt to create new landmarks, whether a floor plan is known or not, to increase the number of landmarks and thereby improve the accuracy for future uses of the system.

Figures 5A, 5B, 5C:
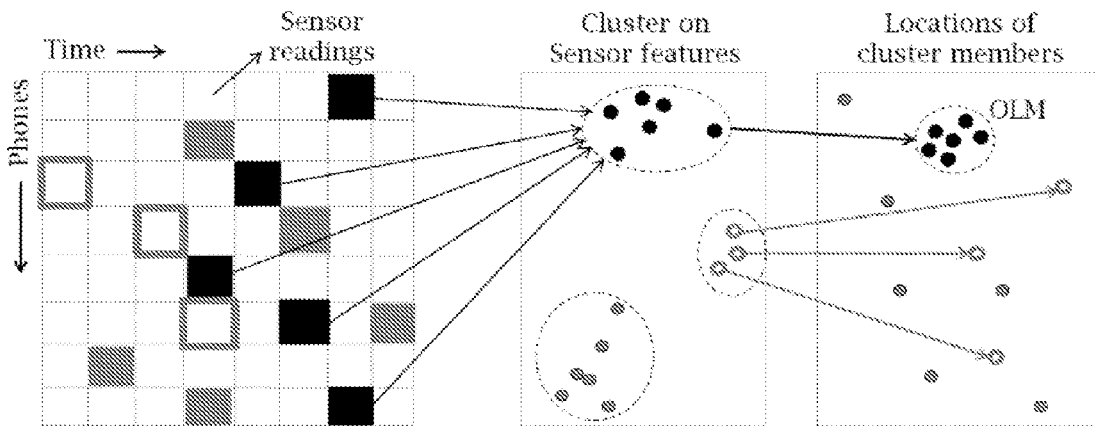
FIGS. 5A-5C illustrate locating a landmark through clustering according to an embodiment of the subject invention.

FIGS. 5A-5C illustrate locating a landmark through clustering according to an embodiment of the subject invention. Through clustering, various features of the data can be extracted, and the clustering can run on high dimensional space. Once the clustering operation has completed, each of the resulting clusters can be expected to contain similar sensor patterns. Because each sensor reading can be associated with time-stamps, it is possible to find the corresponding locations via dead-reckoning. The system can compute these locations to check whether all instances of a cluster fall within a small area.

FIG. 5A shows a matrix of sensor readings collected across time. As shown in FIG. 5B, the sensor readings may be clustered by feature/characteristics. Then, as illustrated by FIG. 5C, if the instances of a cluster fall within a certain area, the system can deem the location a new landmark (i.e., a new OLM). In an embodiment, the system can accumulate the data from multiple users, simultaneously (e.g., on a server and/or through a network) and/or over different times, in order to improve the accuracy of the landmark location.

The dead reckoning scheme of embodiments of the invention uses known landmarks to correct the location of the user whenever such a landmark is encountered, thereby providing for a more accurate estimate of the user's indoor location than dead reckoning (the basic calculations) alone.

In some implementations dead-reckoning uses accelerometer and/or compass data from a device to track a mobile user. Based on the accelerometer readings, it is possible to count the number of steps a user has walked, and therefrom derive the displacement of the user. The direction of each of these steps can be tracked using a compass. Merging these, the <displacement, direction, time> tuple forms the user's motion vector. Pivoting these vectors at the landmarks, systems and methods of the subject invention can track the location of a user.

Although the tracking operation may accrue error over time (due to, e.g., noisy sensors), the error gets reset whenever the user comes across any known landmarks. Thus, in the steady state, a user's localization error can exhibit a saw-tooth behavior, such that over time, the localization error can grow and then sharply drop to zero (or close to zero) at a known landmark, and this pattern can be repeated. By increasing the density of landmarks, the error can be reset frequently, thereby curbing the error growth. Embodiments of the subject invention can increase the landmark density by recognizing all (or almost all) SLMs encountered by a user and by extracting OLMs from the indoor environment as discussed herein.

In an embodiment, WiFi access points can be used to partition an indoor space into smaller sub-spaces. Thus, a LM signature need not be unique in the entire building; so long as it is unique within a WiFi sub-space, it can be recognized without ambiguity.

The techniques described herein advantageously make use of simultaneous localization and mapping. SLMs and newly-discovered OLMs can be used to improve dead-reckoning for subsequent uses, which in turn can improve the location estimates of the SLMs/OLMs themselves. This circular process can push the entire system to better accuracy as it continues to improve over time. In some implementations, as few as three cycles can establish a sufficient number of OLMs.

The continuous improvement is based at least in part on the following three observations: dead reckoning can attain desired levels of accuracy, if periodically recalibrated by landmarks; indoor environments can indeed offer the requisite number of landmarks; and the locations of the landmarks can be computed from rough estimates of multiple uses of one or more devices (i.e., the dead-reckoning errors can be independent). An indoor environment is rich with ambient signals, like sound, light, magnetic field, temperature, WiFi, 3G, and more. Moreover, different building structures (e.g., stairs, doors, elevators, escalators) force humans to behave in specific ways. By collecting these sensor signals and analyzing their high-dimensional combinations, signatures emerge. Further, these signatures need not be unique in the entire building; so long as they are unique within a WiFi sub-space, they can be valid LMs. Examples 1-4 discuss these observations in more detail.

In the case that a building's floor plan is known (which is not necessary but can be helpful to visualize the user's location), then the system can infer the locations of SLMs, including but not limited to doors, elevators, staircases, and escalators. When a device detects these SLMs while passing through them, the device can recalibrate its location. In many embodiments, a system includes an SLM detection module with defined sensor patterns that are global across all buildings.

A building entrance can be characterized by a noticeable drop in a GPS confidence when a user moves from an outdoor environment to an indoor environment. Elevators, staircases, and escalators can be identified using inertial sensors. These sensors have the advantages of being very common (e.g., they are installed on a large class of smart phones), having a low-energy footprint, and being capable of being always on during operation of a device (e.g., during smart phone operation to detect the change of screen orientation).

Figure 6:
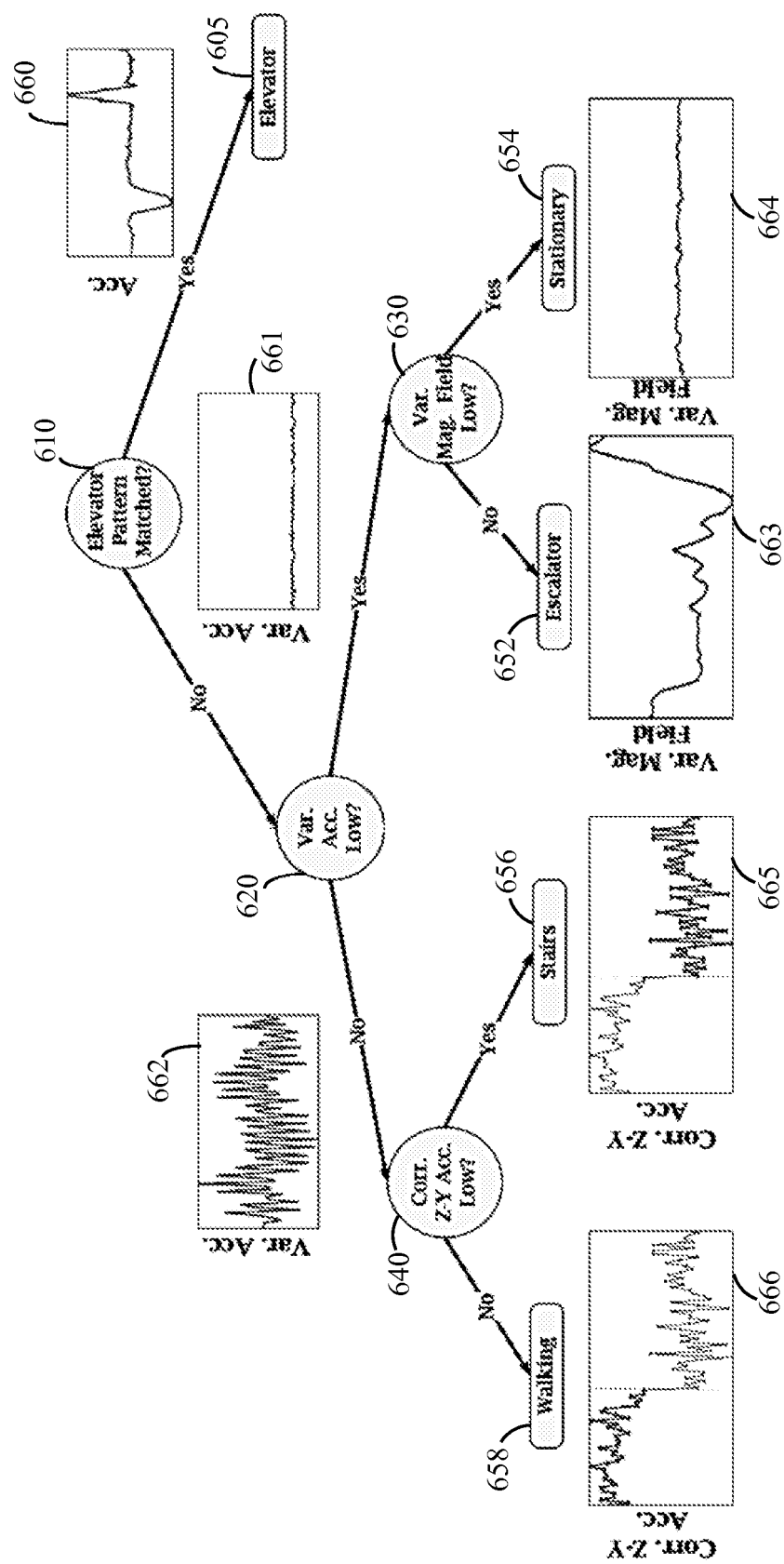
FIG. 6 shows a classification tree for detecting the elevators, staircases, and escalators.

FIG. 6 shows a classification tree for detecting elevators, staircases, and escalators and for separating them from walking and being stationary. A false positive leads to errors in estimating the location of an SLM while a false negative leads to missing an opportunity for recalibration. Therefore, high detection accuracy with low false positive/negative rates is important. Referring to FIG. 6, the top level separates the elevator 605 based on its unique acceleration pattern by determining whether the elevator pattern is matched (610). The second level separates the constant velocity classes (stairs and escalator) from the other two classes (walking and stairs) based on the variance of the acceleration. In particular, if the variance of the acceleration is low, than the variance of the magnetic field is determined (630); otherwise the correlation between the Z and Y acceleration is determined (640). The third level uses the variance of magnetic field (630) to separate the escalator 652 from the stationary case 654 and the correlation between the Z and Y acceleration components (640)*to* separate between the stairs 656 and walking cases 658.

A typical elevator usage trace (see inset plot 660) can include a normal walking period, followed by waiting for the elevator for some time, walking into the elevator, and standing inside for a short time. Then, an addition of weight or a weight loss occurs (depending on the direction of the elevator), followed by a stationary period which depends on the number of the floors the elevator moved, and another addition of weight or weight-loss, and finally a walk-out. To recognize the elevator motion pattern, a Finite State Machine (FSM) that depends on the observed state transitions can be used. Different thresholds can be used to move between the states. Embodiments of the subject invention can include thresholds that are robust to changes in the environment and can achieve false positive and false negative rates of 0.0%. In a particular embodiment, false positive rates and false negative rates can be 0.6% or less and 0.0%, respectively. In certain embodiments, data from a barometer can be used to determine how many floors were traveled by the user in the elevator. That is, depending on the pressure when the user entered and exited the elevator, the system can determine the number of floors (either up or down) traveled by the user.

Figure 7:
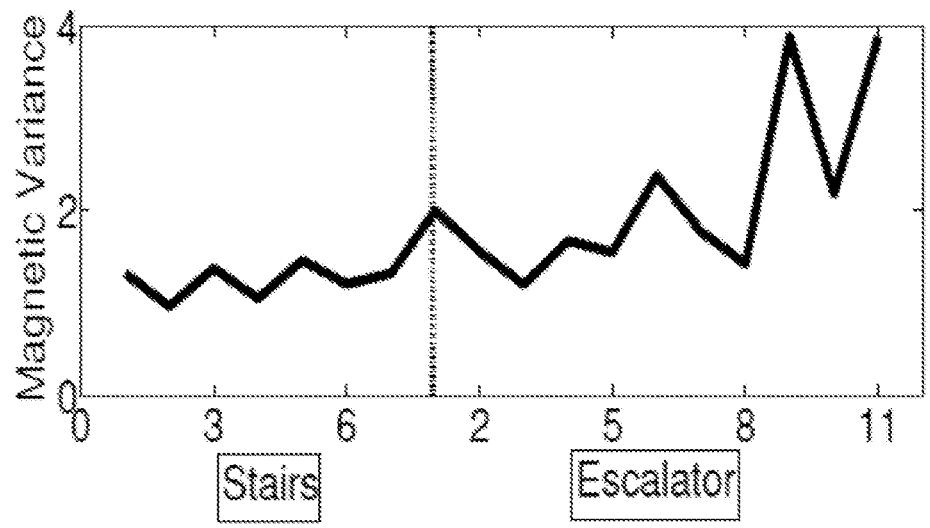
FIG. 7 shows a plot of magnetic variance.

Once an elevator 605 has been separated, it becomes easier to separate the classes (escalator 652 and stationary 654) that indicate with constant velocity (see inset plot 661) from the other classes (walking and stairs) that indicate with the variance of acceleration (see inset plot 662). To separate the escalator 652 from being stationary 654, the variance of the magnetic field can be a reliable discriminator (see inset plot 663 and 664). A user may sometimes climb up the escalator, but the magnetic variance also differentiates between this and an actual staircase-climb. FIG. 7 shows the magnetic variance when a user climbs stairs and when a user climbs an escalator. Referring to FIG. 7, these two events show difference magnetic variance patterns.

Returning to FIG. 6, once the scenario with constant speed (e.g. shown in inset plot 661) is separated, climbing stairs 656 and walking 658 can be differentiated. When a user is using the stairs 656, the user's speed increases or decreases based on whether the gravity is helping. This creates a higher correlation between the acceleration in the direction of motion and direction of gravity as compared to walking (see inset plot 665 and 666). Embodiments of the subject invention can provide false positive and false negative rates of 0.0%. In a particular embodiment, false positive rates and false negative rates can be 0.0% and 1.8% or less, respectively.

In an embodiment, dead-reckoning can include: computing a user's displacement based on accelerometer data; and continuously tracking the direction of movement.

Figure 8:
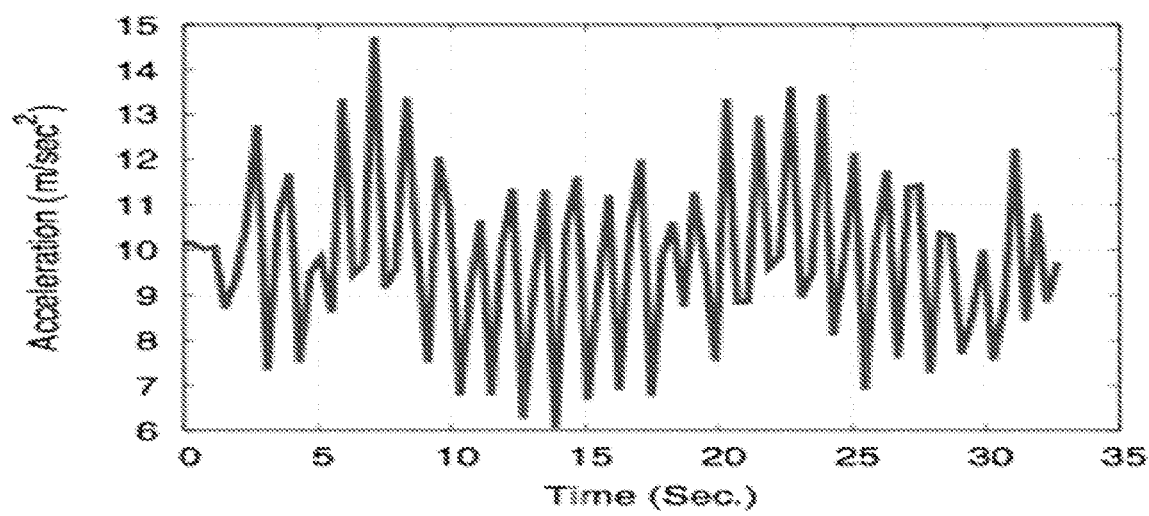
FIG. 8 shows a plot of acceleration versus time.
Figure 9:
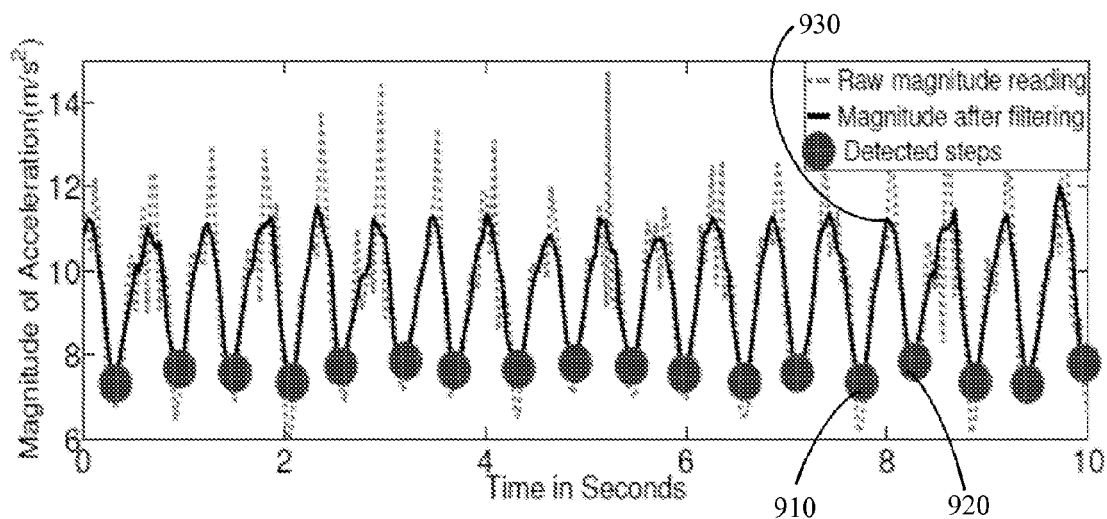
FIG. 9 shows a plot of acceleration versus time.
Figure 10:
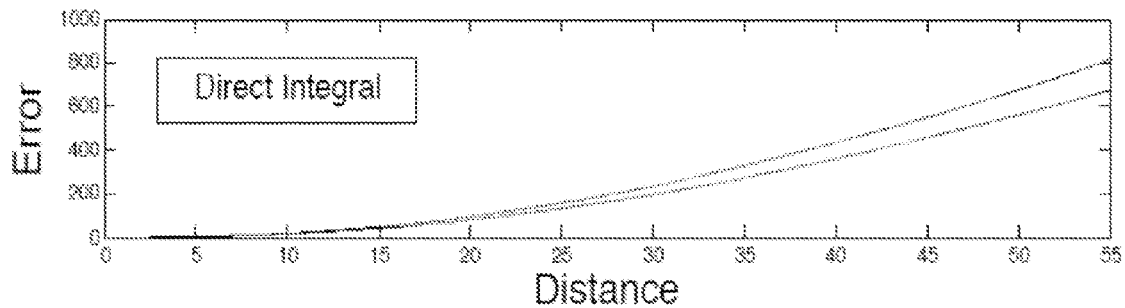
FIG. 10 shows a plot of displacement versus error.

FIG. 8 illustrates an example plot of acceleration verses time. To illustrate suitability of this method, a raw magnitude reading of acceleration and magnitude after filtering is shown in the plot of acceleration verses time of FIG. 9. As illustrated in FIG. 10, computing displacement by double-integrating the accelerometer readings does not result in a useful result as the difference between the estimated and actual displacement reaches more than 100 m only after 30 m of actual displacement. This may be attributed to a noisy accelerometer, low sampling rate (24 Hz), and jerky movements of the device when carried by a user.

Figure 11:
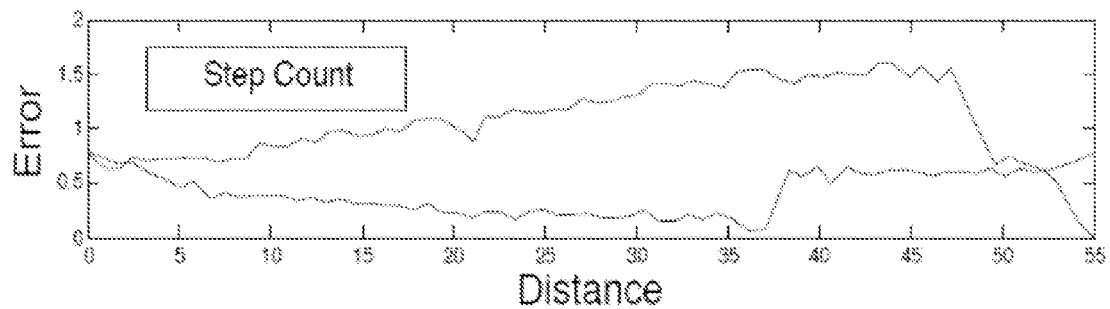
FIG. 11 shows a plot of displacement versus error.

In contrast, returning to FIG. 9, a better approach is to identify a human-walking signature, which arises from the natural up/down bounce of the human body for each step taken. To capture this, the signal can be passed through a low pass filter, and two consecutive local minima (e.g. 910 and 920) can be identified. Between these local minima, a local maximum 930 can be identified. A calculation can be performed to check whether the difference between the maximum and minimum is greater than a threshold. If so, the step count is incremented. In an embodiment, the physical displacement can be computed by multiplying step count with the user's step size. The step size can be estimated using the user's weight and height, which can be input into the system by the user. Employing a fixed step size across all users can be erroneous, but systems and methods of the subject invention can infer step size by counting the number of steps for a known displacement (e.g., between two landmarks). Referring to FIG. 11, it is shown that the error accumulated using these techniques is low. A step count accuracy of 98% or higher can be obtained.

Figure 12A:
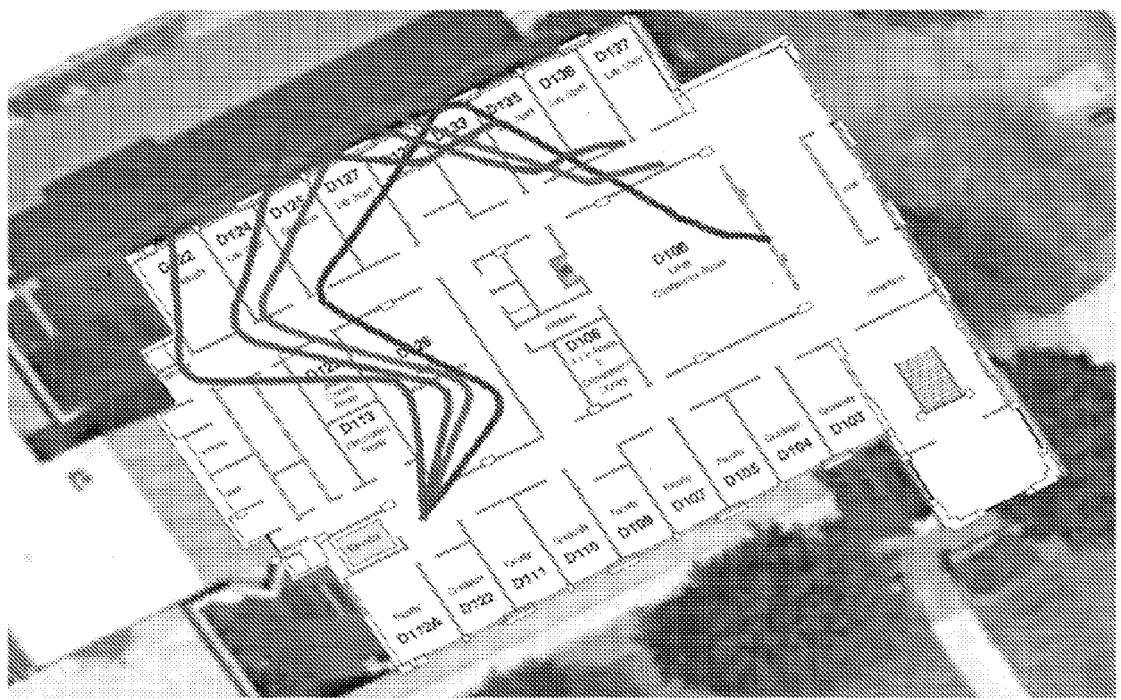
FIG. 12A shows a schematic diagram of walking paths of an indoor location overlaid a photograph.
Figure 12B:
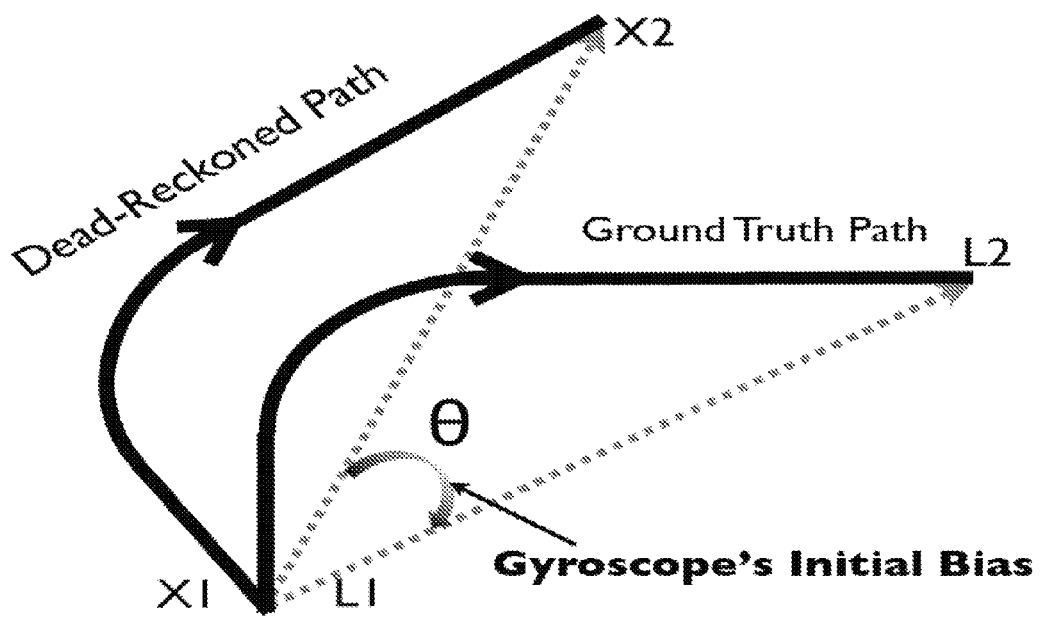
FIG. 12B shows a diagram of a corrected walking path.

In an embodiment, readings from a gyroscope can be used to infer a user's movement direction(s). The gyroscope may be decoupled from the magnetometer sensor, and hence, can be insensitive to ambient magnetic fields. The gyroscope, though, gives relative angular velocity in the form of a 3D rotation matrix. When multiplied by a time interval, this yields the relative angular displacement (RAD) of the device having the gyroscope. The RAD is with respect to a direction that is not necessarily the absolute direction, so the user's motion path using the gyroscope can be biased by the error in their initial direction. FIG. 12A shows a schematic diagram of walking paths, and FIG. 12B shows a diagram of a corrected walking path. Referring to FIG. 12A, using the gyroscope alone can give rotated versions of the true path. Referring to FIG. 12B, encountering landmarks can help infer this bias and therefore correct for it.

Referring to FIG. 12B, consider a user encountering a known landmark $L_1$ at time $t_1$, and later another landmark $L_2$ at time $t_2$. The system can identify that the user encountered these two landmarks because the signatures matched, and hence, regardless of the dead-reckoned estimates, the system can determine the user's path at these locations. Let $\theta$ denote the angle between the line joining $L_1$, $L_2$ and the line joining $L_1$, $X_2$, where $X_2$ is the dead-reckoned estimate at time $t_2$. It can be observed that $\theta$ is the initial bias, and therefore, the system can rotate the entire motion segment by $\theta$. The same $\theta$ can be used to track the user for the subsequent motion segment (e.g., until the user encounters landmark $L_3$) at which point the bias can again be updated. This process of learning and updating the bias at every landmark leads to stable and consistent results. The remaining issue relates to tracking the user until the second landmark is encountered. During this phase, the dead-reckoning error can be arbitrarily high. In one embodiment, a compass can be used during the initial phase when the gyroscope bias is still unknown. Magnetic field fluctuations may degrade the results from the compass, so the gyroscope and compass readings can be juxtaposed.

Figure 13A:
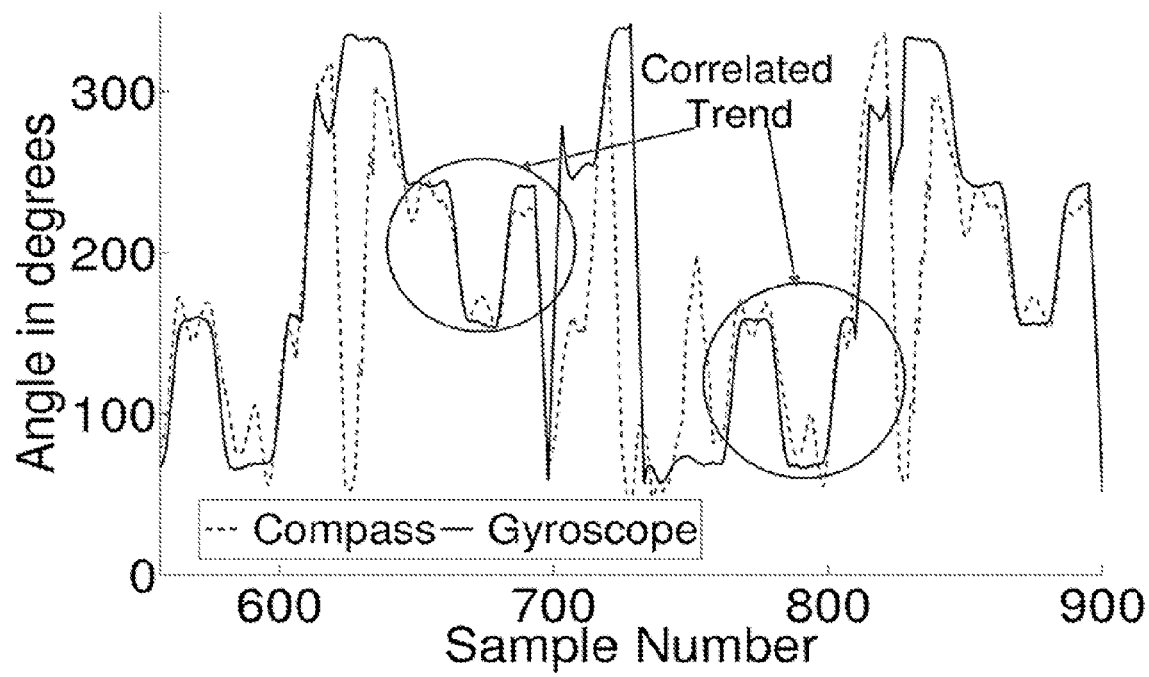
FIG. 13A shows a plot of angle of walking orientation for a compass and for a gyroscope.
Figure 13B:
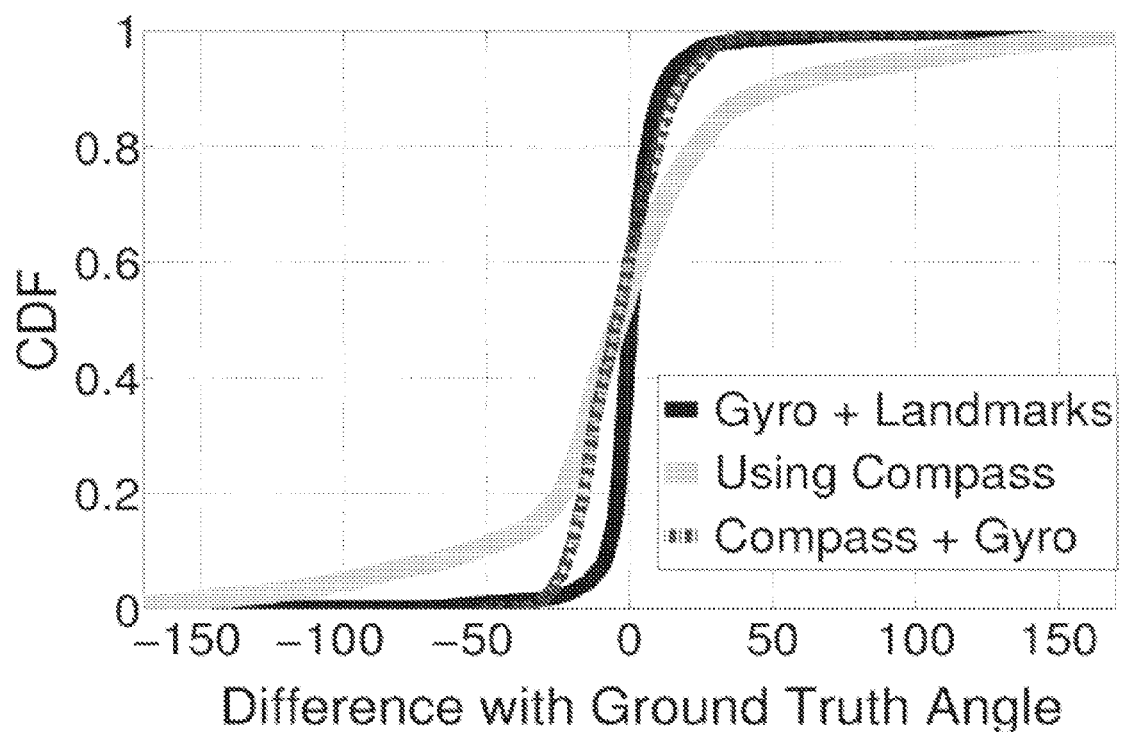
FIG. 13B shows a plot of the CDF of the difference with ground truth angle for different methods.

FIG. 13A shows a plot of angle of walking direction for a compass and for a gyroscope. Referring to FIG. 13A, whenever the trends for a device having a compass and gyroscope are correlated, the compass value can be selected as the direction of motion. The gyroscope's bias can be inferred and used thereafter. Correlated trends in compass and gyroscope can be an indicator of proper compass readings, and if the compass is not reflecting the gyroscope's trend, it may be affected by other factors. FIG. 13B shows a plot of the cumulative distribution function (CDF) of the difference with ground truth angle for using gyroscope and landmarks, using compass only, and using compass and gyroscope. Referring to FIG. 13B, the compass helps with the initial phase, while gyroscope based dead-reckoning proves to be effective. This novel method of leveraging gyroscope readings for indoor dead-reckoning provides surprisingly good results.

While tracing a user within an indoor environment, data may be collected for generating new OLMs. Discovering OLMs can include: recognizing a distinct pattern from many sensed signals; and testing whether a given pattern is spatially confined to a small area. Referring again to FIG. 5A, sensor readings can be gathered in a matrix; element <i,j> of the matrix contains sensor readings from device i at time j. These sensor readings are essentially features of the raw sensed values (from e.g., an accelerometer, a compass, a gyroscope, a magnetometer, and/or WiFi).

Figure 14:
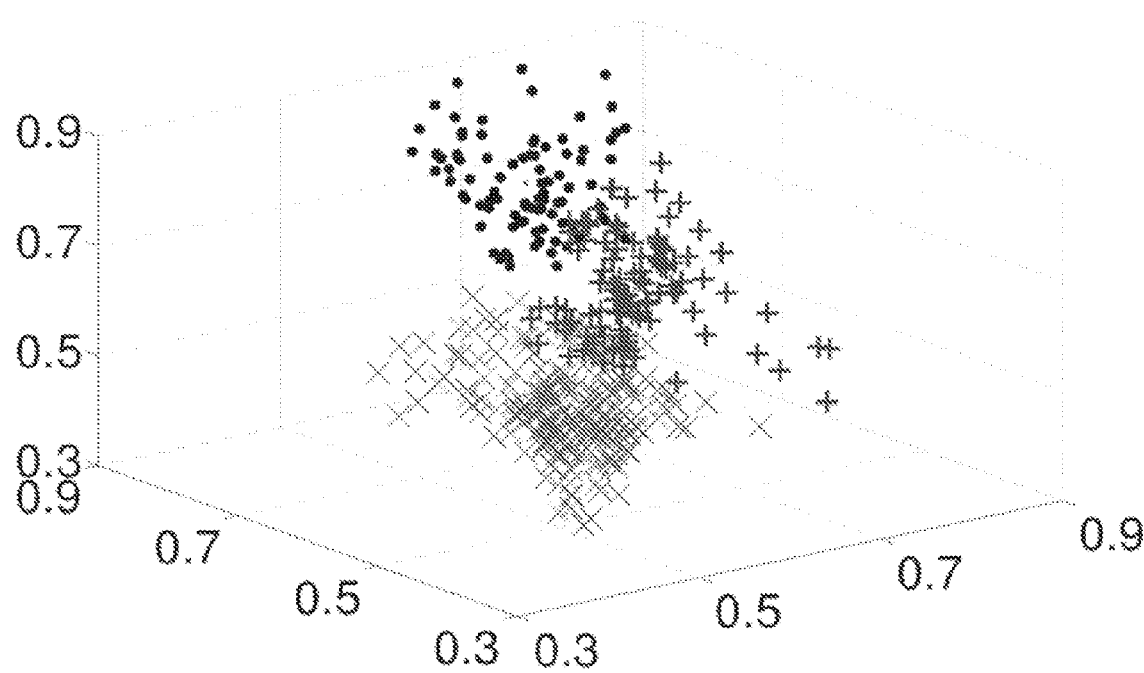
FIG. 14 shows a plot of clusters identified by a K-means algorithm.

Features for the magnetic and inertial sensors include, but are not necessarily limited to, mean, max, min, variance, and mean-crossings, while for WiFi, features can include, but are not necessarily limited to MAC ID (media access control identifier) and RSSI (received signal strength indicator). In an embodiment, the system can normalize these features between [−1, 1] and feed them to a K-means clustering algorithm. Other clustering methods, such as Expectation Maximization (EM) clustering, may be used. The clustering can be executed for each individual sensing dimension, as well as their combinations (e.g., accelerometer and compass together). FIG. 14 shows a plot of clusters identified by a K-means algorithm. Referring to FIG. 14, clusters from an example of magnetometer readings for K=3 are shown. For FIG. 14, the value of K was varied, and the clusters were recorded in each case.

Clusters that have low similarity with all other clusters can be identified, and such clusters can suggest a good signature. For this, the correlation between a given cluster and all other clusters can be computed. If the maximum correlation is less than a similarity threshold, the cluster can be a candidate to be an LM. In an embodiment, in order to qualify as an OLM, a candidate cluster must also be confined to a small geographical area. Members of a cluster can be tested to determine if they are within the same WiFi area (i.e., they overhear the same WiFi APs). Many WiFi areas are large, so for clusters within a WiFi area, the dead-reckoned locations for each of their members can be computed. If locations of all cluster-members are within a small area (e.g., 4 m²), then this cluster can be considered an OLM. The different sensing dimensions can require some customization.

For WiFi LMs, MAC addresses of WiFi APs and their corresponding RSSI values can be used as features. To remain robust to signal variations, which can alter the set of overheard APs, APs that are stronger than a threshold RSSI can be considered. Applying K-means clustering can identify small areas (e.g., 4 m² or smaller) that have low similarity with all locations outside that area. In an embodiment, the similarity of two locations, $l_1$ and $l_2$ can be computed as follows. Denote the sets of WiFi APs overheard at locations $l_1$ and $l_2$ as $A_1$ and $A_2$, respectively. Also, let $A = A_1 \cup A_2$. Let $f_i(a)$ denote the RSSI of AP a, a∈A, overheard at location $l_i$; if a is not overheard at then $f_i(a)=0$. Similarity S∈[0, 1], between locations $l_1$ and $l_2$ can be defined as:

$$S = \frac{1}{|A|} \sum_{\forall a \in A} \frac{\min(f_1(a), f_2(a))}{\max(f_1(a), f_2(a))}$$

Figure 15:
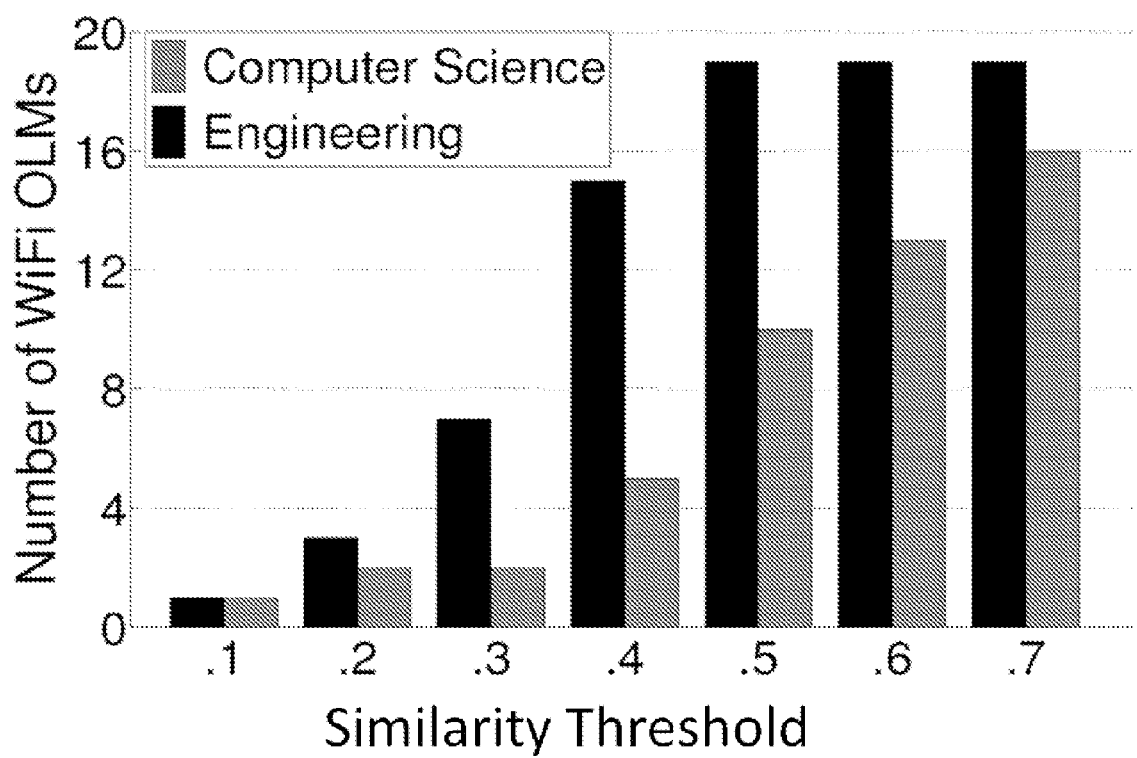
FIG. 15 shows a plot of number of WiFi OLMs versus similarity threshold.
Figure 16:
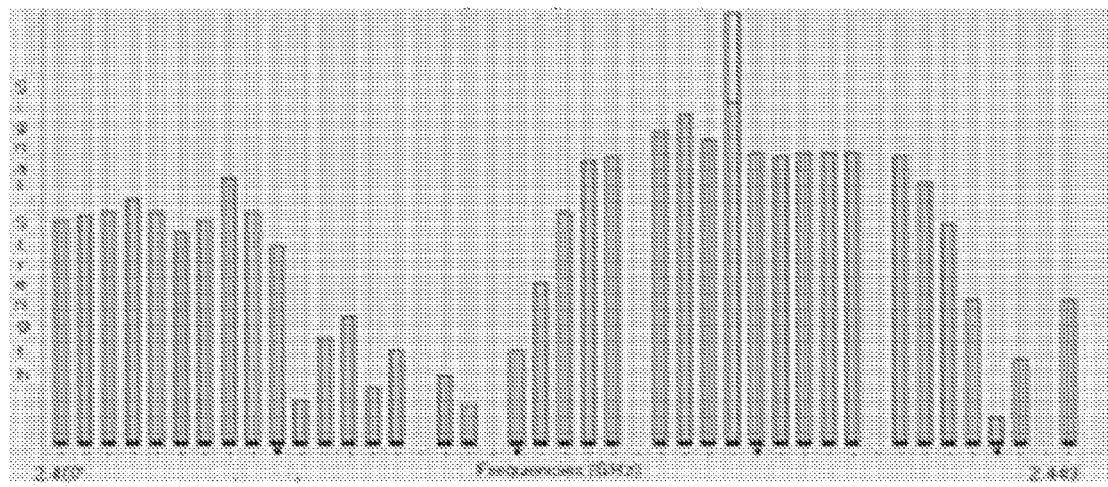
FIG. 16 shows a plot of signal strength versus frequency.

The rationale for this equation is to add proportionally large weights to S when an AP's signals are similarly strong at both locations, and vice versa. S can be thresholded on to define a WiFi landmark. For example, a threshold of 0.4 can be chosen, indicating that all locations within the WiFi landmark need to exhibit less than 0.4 similarity with any other location outside the landmark. Such a strict threshold can ensure that landmarks are quite distinct, but can also reduce the number of possible landmarks. FIG. 15 shows a plot of number of WiFi OLMs versus similarity threshold. The tradeoff is illustrated using traces from two Duke University buildings, Computer Science and Engineering. As shown in FIG. 15, it can be observed that 0.4 is a reasonable cut-off point, balancing quality and quantity of WiFi OLMs. FIG. 16 shows a plot of signal strength versus frequency, and is one example of data that may be used to help determine WiFi LMs.

Indoor environments are characterized by at least a few turns (e.g., at the end of corridors, into offices, classrooms, stairs, and more). Because a gyroscope can provide reliable angular displacements, such turns can be used as OLMs. In an embodiment, a special feature can be considered, referred to as a bending coefficient. The bending coefficient is used to capture the notion of path curvature, computed as the length of the perpendicular from the center of a walking segment to the straight line joining the endpoints of the segment. The bending coefficient can be computed over a sliding window on a user's walking path, and this can be used as a separate feature. When bending coefficient and WiFi are clustered together as features, similar turns within a WiFi area can gather in the same cluster. The turns in the cluster could still be doors of adjacent classrooms in a corridor; these turns may very well lie within the same WiFi area. To avoid coalescing all these turns into the same landmark, the system can check if the cluster is confined to within a small area (e.g., 4 $m^2$ or less), and the cluster can then be declared a landmark.

Figure 17:
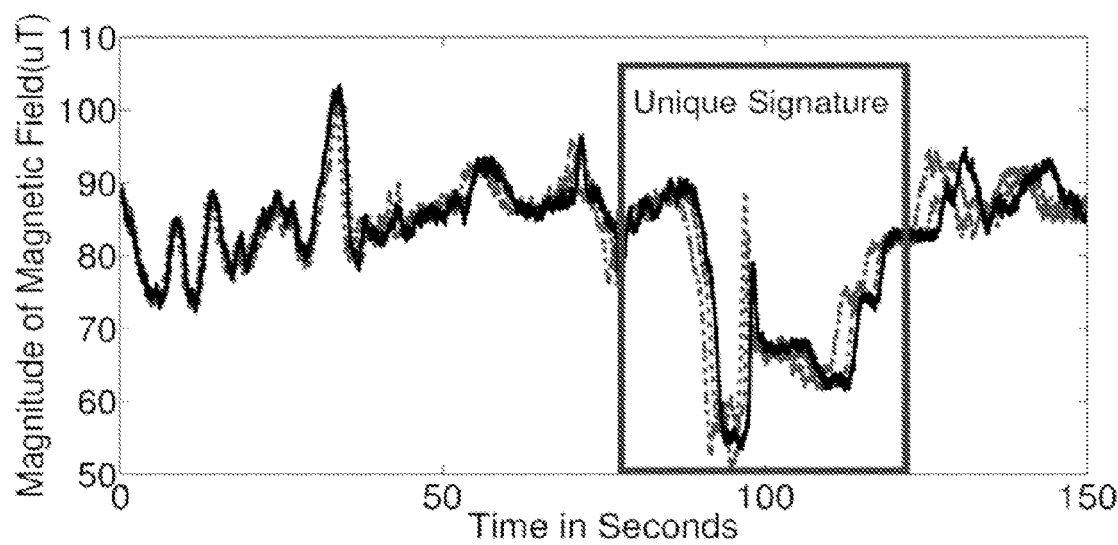
FIG. 17 shows a plot of magnetic field versus time.

Magnetic landmarks can be derived through similar techniques. As long as the magnetic signature is unique within one WiFi area, and the sensed locations are spatially confined within a small area (e.g., 4 $m^2$), it can be deemed as a magnetic OLM. FIG. 17 shows a plot of magnetic field versus time. Referring to FIG. 17, an example is shown where the magnetic field near a networking lab demonstrates a unique distortion.

Systems and methods of the subject invention can use SLMs and OLMs to reset dead-reckoning error and track a user. The improved dead-reckoned paths can help in refining the landmark locations because different paths offer independent estimates (possibly independently erroneous estimates) of a specific landmark. Combining these independent errors can produce the refinement, based at least in part on the law of large numbers, where the sampled mean converges to the true mean for a large number of samples. In an embodiment, estimates of a landmark, say $L_i$, can be combined as follows. One approach could be to compute the centroid, but also the observation that all estimated locations may not be equally incorrect can be taken advantage of. Consider two users who arrive at $L_i$ from landmarks $L_j$ and $L_k$, respectively. If $L_j$ is closer to $L_i$ than $L_k$ is, then the user that walks from $L_j$ is likely to have incurred less error. This is because pure dead-reckoning accumulates error over time. Thus, accounting for this confidence in landmark estimates, a weighted centroid can be computed. The result can be declared as the location of the landmark.

Systems and methods of the subject invention do not require a floor plan of the building in which indoor localization is performed. In many embodiments, only one ground truth location of any SLM is needed. Such an SLM location could be, for example, the location of an entrance, a staircase, or an elevator. Once the location (e.g., GPS coordinates) of one SLM is known, the rest of the SLMs and OLMs can be organically grown, using this known coordinate as the origin (or as any other coordinates). Importantly, the location of this original SLM (e.g., the building's entrance) needs to be learned only once when the system is used for the first time. In the steady state, even if users do not know when they are passing through the entrance, their locations can become known once they encounter a landmark. The same is true when a user enters through a different entrance of the building, or turns on a device running the system at some time after the user is inside the building. The localization service can activate once the first landmark is encountered. In a particular embodiment, the GPS location of a building entrance can be determined (e.g., from Google™ Satellite View). A user can activate the system when entering through this entrance or the system could already be active when entering. In an alternative embodiment, the entrance location can be collected by other means, or even estimated from locations where GPS fixes are lost (e.g., after entering a building). Obtaining the GPS coordinate of one SLM, just one time, is not difficult in practice.

Systems and methods of the subject invention can use activity-based landmarks. For example, a busy coffee shop may invariably have a queue, or visiting a restroom may have a unique signature. These activities can very well be LMs as long as their patterns surface upon clustering. Even temporary landmarks can be learned by the system (e.g., queue exists between noon and 2:00 PM only), and even unlearned if the queuing behavior disappears (e.g., during winter vacation).

In an embodiment, early users of a system and/or method can help with localizing OLMs and bring the system to convergence. However, this is not war-driving because the early users behave naturally and do not collect ground truth (since they do not need GPS). In fact, they collect exactly the same sensor readings as all other users. The only difference is that the early users may experience less localization accuracy (see also Example 7). The process of war-driving, on the contrary, is associated with the notion of (ground truth) calibration, which naturally requires additional equipment.

LM signatures may vary across smartphone platforms. In an embodiment, data gathered from smartphones can be indexed by the phone's make and model, and LM signatures can be detected for each distinct model. Thus, a phone can download LM signatures that are specific to its hardware and/or software, and run the system for localization. Of course, the system can be used on a device for which no previous data has been gathered, as discussed herein.

In many embodiments, the systems and methods avoid using sensors that have a high energy footprint, e.g., light and sound. In an embodiment, a system can incrementally turn on sensors, depending on the density of LMs available in the environment. For example, if a wing of a building has numerous landmarks, the system could turn off the magnetometer, and use only the accelerometer- and compass-based landmarks for localization.

Systems and methods of the subject invention do not require periodic GPS fixes, and instead may only require a one-time global truth information (e.g., the location of a door, staircase, and/or elevator). The entire system can operate from this. The systems are infrastructure-independent and do not require calibration (though calibration may be performed). GPS coordinates can be replaced with indoor landmarks; the ability to identify these landmarks in an unsupervised way enables indoor localization with no war-driving (and no calibration required). Ambient signatures realized from sensor data enables identification of LMs, which allows for improved dead-reckoning in an indoor environment.

Embodiments of the subject invention are also drawn to systems and methods for determining or estimating the heading direction of a user of the system. Such heading direction estimation techniques can be used in the indoor localization systems and methods described herein (e.g., during the dead-reckoning phase of indoor localization).

Determining moving direction with the inertial sensors of a mobile device (e.g., a cellular telephone) is a problem in the field of location service. Use of a compass alone cannot solve this problem because a device's compass cannot adapt with orientation change. GPS works successfully in an outdoor environment but is not suitable for an indoor environment. Dead-reckoning needs to know a device's initial orientation, and over time error grows. Systems and methods of the subject invention can calculate the heading direction without any user intervention and are accurate and can be implemented on a light-weight device. They can work as a generic system and are not restricted by any strict requirement for its function.

In an embodiment, a system includes a computer-readable medium having computer-executable instructions for performing a method comprising estimating the indoor location of a user of the system. Estimating the indoor location of the user can include performing dead-reckoning using sensor data and determining the location of at least one landmark using sensor data. The system can include an app running on a mobile device of a user of the system. The app can run completely locally on the mobile device or can communicate with one or more other devices (e.g., a server and/or computing devices such as computers and/or mobile devices). Such communication can be accomplished over a network, such as a WiFi network or cellular network, though embodiments are not limited thereto.

Sensor data obtained by the mobile device of the user can be stored locally on the mobile device, on a server, on other computing devices in communication with the user's mobile device, or some combination thereof. In a particular embodiment, sensor data is collected over a network from multiple uses of the system (e.g., from a same user that navigates an indoor location multiple times or from multiple users each using a mobile device which may be different from that of other users) and stored on a server. Then, a user of the system can access the data previously collected, which can help improve the accuracy of the indoor localization of that user.

According to many embodiments of the subject invention, no war-driving is performed. In certain embodiments, no calibration of any kind is performed. Instead, the first user of a system can use a mobile device to obtain sensor data, and the system can start "from scratch" to begin to build a map of the indoor environment while simultaneously estimating the indoor location of the user. For example, the system can identify an SLM (e.g., an entrance, a staircase, an elevator, or an escalator) and use that SLM as a reference point for all localization of both the user and future identified LMs within that same indoor environment.

In an alternative embodiment, a calibration process can be performed. For example, a user can move around the indoor environment (e.g., to multiple floors using an elevator or a staircase) and inform the system (e.g., through the use of an app running on the mobile device) of the user's location at least one location. The user can inform the system by, for example, talking to the mobile device, which can accept the data through a microphone, or through data entry using a physical or virtual keyboard. After this calibration process, the system can determine the user's location relative to either determined LM data (e.g., SLM data) or relative to data provided by the user during calibration.

If the calibration process is performed, the system can (surprisingly) accurately predict the user's location (after calibration) using sensor data from only a compass and an accelerometer. Though, sensor data from other types of sensors can help to provide even more accurate estimation of the user's indoor location. This calibration process is not war-driving. In a particular embodiment, the calibration process can include using GPS data from the mobile device as the user moves around the indoor environment.

Systems and methods of the subject invention provide unsupervised indoor localization. LMs are not labeled upon identification, nor does the system require this for accurate localization. The system can recognize a LM based on its sensor signature only and need not understand what the function (if any) of the LM is within the indoor environment.

In an embodiment, a system can include a computer-readable medium having computer-executable instructions for performing a method comprising estimating the location of a user in an indoor environment by estimating the movement trace of the user within the indoor environment using first sensor data, and identifying at least one landmark within the indoor environment using second sensor data. The first sensor data can be the same as, overlap with to some extent, or be different from the second sensor data. The method is unsupervised, such that the at least one landmark does not need to be labeled by the system and, in many embodiments is not labeled by the system. The system can include a mobile device, and the mobile device can include the computer-readable medium. The mobile device can be carried by the user. In many embodiments, the method does not include any war-driving.

In certain embodiments, the system includes a server in communication with the mobile device of the user, and the server can store sensor data obtained by the user and/or by other users of the system. Sensor data stored on the server can be used to improve indoor localization within the same indoor environment over time. As more sensor data is collected, the number of LMs and the accuracy of the location of LMs within an indoor environment will improve due to larger sample sizes. This data can be used by subsequent users of the system to improve their location estimation, which can in turn refine the location of LMs even more, leading to even more accurate location estimation for subsequent users, and so on. This recursive process provides very accurate estimates of indoor location of both users and LMs and does not take many uses to show its effect.

In certain embodiments, the system can be run locally on the mobile device of the user, and the mobile device can store sensor data obtained by the user. Sensor data stored on the mobile device can be used to improve indoor localization within the same indoor environment over time. As more sensor data is collected, the number of LMs and the accuracy of the location of LMs within an indoor environment will improve due to larger sample sizes. This data can be used during subsequent uses of the system to improve location estimation, which can in turn refine the location of LMs even more, leading to even more accurate location estimation during subsequent uses, and so on. This recursive process provides very accurate estimates of indoor location of both the user and LMs and does not take many uses to show its effect.

It should be understood that user privacy can be maintained even though a user's path is being traced. Privacy mechanisms can include removal of personal data (or non-recording of personal data) before providing user sensor data and/or results to the system.

In a further embodiment, a user concerned about privacy but wanting to take advantage of previous sensor data collected by other users of the system can connect to a server having sensor data stored for an indoor environment, download the stored sensor data, and disconnect from the server. The system can then be used offline while maintaining the advantage of using sensor data obtained from previous users. The user can later reconnect to upload sensor data obtained by that user or can choose not to do so. The user's sensor data can be kept private even if that user connects again to the server to download updated data from other users regarding the same or a different indoor environment.

In yet a further embodiment, a user can share sensor data with a select other user or group of other users. For example, this can be done directly between two or more mobile devices (the main user and the "other" user(s)), through an application (e.g., a social media application), or over a local area network (LAN) or intranet (e.g., using WiFi or other internet or cellular signal). The users sharing data can benefit from the sensor data from the other users to improve the accuracy of indoor localization.

Systems and methods of the subject invention continuously improve the accuracy of the location of LMs, and therefore the accuracy of indoor localization for the user, over time. Each time the system is used, further sensor data is obtained, which can be used to improve LM location estimation. Over a period of time, an extensive library of LMs for a wide range of indoor environments can be collected and used for accurate indoor localization for a user over a vast array of environments. This is true for the case where all data is stored locally but especially true for the case where sensor data from multiple users is stored together (e.g., on a server).

In certain implementations, a heading direction estimator can be included. A heading direction estimator can be used to determine an estimate of the heading direction of movement of a user (e.g., a pedestrian) using sensor data obtained from a device (e.g., a mobile computing device such as a smart phone). Such a device can be carried by the user. The system does not make any assumptions on the orientation of the device; rather it is aware that the device will change its orientation during the movement. The heading direction of non-pedestrian locomotion can also be estimated (e.g., swimming, skating, running) As long as the motion is repetitive, an accurate estimate can be obtained. Locomotion including periodic movement of the limbs can lead to especially accurate estimates.

A device having sensors used for heading direction estimation according to certain embodiments of the subject invention can be, for example, mobile and/or wearable computing devices equipped with 3-axes sensors, which are capable of sensing the movement, acceleration, and rotation of the device, though embodiments are not limited thereto. Other sensors, such as a magnetometer, can be used to obtain a global reference for the heading direction, but the calculation of the heading direction itself is not dependent on it.

In an embodiment, a system or method of estimating the heading direction of a user can include: analyzing the forces applied to a device due to the movement of various body parts during locomotion; identifying the heading force; determining the heading plane; estimating the heading angle; and providing an output that estimates the heading direction of the user. The user can be, for example, a pedestrian. The device can be, for example a mobile device such as a smart phone.

Any object, including the human body, moves as the effect of forces, and the change in velocity of that object happens in the direction of these forces. Therefore, the direction of the forces can potentially indicate the direction of the movement of the object. Short term and long term heading direction can differ in bipedal locomotion; the body can move towards the left and right with the steps taken with the left and right legs, respectively. However, these movements can be compensated by each other, such that the body moves towards the resultant direction after a significant number of steps. This can help to compensate for possible error that can be produced in finding long term heading direction for bipedal locomotion.

Even the simplest form of human locomotion involves various forces applied in multiple directions. Therefore, the identification of the heading force that is applied to the direction of movement can be useful in estimating heading direction. The heading force can depend on the type of movement and may not be unique. In an embodiment, repetitive patterns and energy in the sensor data can be identified to determine the type of the movement (e.g., walk or run) and the placement of the device (e.g., in a pocket, in a hand). Each repeated block of data in the sensor data can correspond to one full cycle in the movement. Each block can be analyzed to identify the portion of the data that represents the heading force. Acceleration shows the direction of force, so accelerometer data can be used to determine the direction vector for the heading force.

Also, in certain embodiments, it is assumed that movement is restricted to the two-dimensional horizontal plane. This can be the case even though the direction of heading force can be determined in three-dimensional space. The plane perpendicular to gravity can be used as the global horizontal plane, and this is not dependent on the orientation of the device. The gravity vector can be calculated from sensor data (e.g., from multiple sensors) to separate gravitational acceleration from accelerometer data. This process can be customized for various types of movements to obtain better results.

To estimate the heading direction with reference to the earth's magnetic north, the heading direction estimator can projects the heading vector and the magnetic field vector on the global horizontal plane. It can then calculate the directed angle between these two projected vectors to obtain the heading angle of the user.

In certain embodiments, supporting techniques can be used in the estimation of heading direction. Because the hands and legs are connected to the body with the ball and socket joints, they can exhibit partial rotational motion during movement of the body. A technique of the subject invention can exploit this partial motion to determine the axis of rotation by analyzing sensor data (for example, gyroscope data). The cross product of this axis of rotation can be taken with the gravity vector, and the direction of the resultant vector points towards the direction of movement. In another supporting technique, the heading direction estimator can apply specific rotation of data from a three-axis accelerometer to minimize the effect of gravity in this data and can estimate the heading direction from this modified accelerometer sensor data. These supporting techniques can help the heading direction estimator produce a stable and more accurate estimate of the heading direction of a user.

Because the heading force calculated by the heading direction estimator can point the direction in three-dimensional space, the direction of movement can be determined in three-dimensional space. This can be helpful in identifying the heading direction when the user is climbing stairs, using an elevator, and in other scenarios where the movement is not restricted to the horizontal plane. Also, a machine-learning-based technique can be used to improve the response time of the heading direction estimator system. Because different types of movement in human locomotion follow a series of specific movements in various body parts, the system can learn this sequence of movements and predict the final heading force to determine the change in heading directions in advance.

The system can empirically determine various parameters for this technique over time. Moreover, the system performance can be improved by fast estimation of the direction change after the user takes a turn. The movements for turns can leave specific signatures in the output of the sensors that are sensitive to force and rotation. Therefore, the angle of the turn can be estimated by analyzing the data from such sensors, and current heading direction can be adjusted with this angle to get the direction after the turn. In addition, systems and methods of the subject invention for heading direction estimation can be used with multiple devices (e.g., located at various parts of the body of the user). Such a network of devices can lead to fast and accurate estimation of heading direction.

Techniques are described that can calculate or estimate the heading direction of a pedestrian. The variation of force during normal human walking is focused upon, and this property is captured with the help of one or more inertial sensors of a device possessed by the user. The systems and methods are not affected by the orientation of the device (e.g., a smartphone). The performance of the system does not depend on the holding style or location of the device on the body. Direction of movement can be determined in real time, and the complete system can be implemented in a regular smartphone. No bootstrapping is required, and results can be provided at each step of a walk. The estimated heading direction can have an average error of for example, six degrees or less. This error is considerably less than the error of at least 12 degrees displayed by related art heading direction estimators.

The moving direction of a pedestrian carrying a device (e.g., a smartphone) can be determined by analyzing the forces experienced by the device because of various movements during the walk. These forces do not depend on the orientation of the phone. Therefore, the algorithm is inherently free from any error generated by the orientation of the phone. Moreover, the performance of the system does not depend on the holding style or location of the phone on the body. The algorithm can determine the direction of movement in real time, and, because of its low complexity, the complete system can be implemented on a smartphone (or wearable computer e.g., watch-based or glasses-based). No bootstrapping is required, and results can be produced with the granularity of each step of a walk.

Heading direction can be computed by first determining gait cycle of the user and its various phases. Then, the time frame when the device was under the influence of the forward force can be determined. The acceleration under that time frame can point to the heading direction of the user. The direction vector can be determined from the accelerometer data and thus give the vector that represents the heading direction in three-dimensional space. This raw heading can then be projected on the desired plane of movement and compensated for possible errors introduced by lateral movements of bipedal locomotion. The gait cycle determination process can depend on various features obtained from the inertial sensor data. It can depend on the part of the body the device is placed. To deal with this, the system can distinguish between various usage patterns or motion modes of the device with the help of a novel motion mode detection algorithm. In one implementation, this algorithm can depend only on the various time domain features to accurately determine the motion mode of the device. In another implementation, both time domain and frequency domain features may be used.

Figure 18:
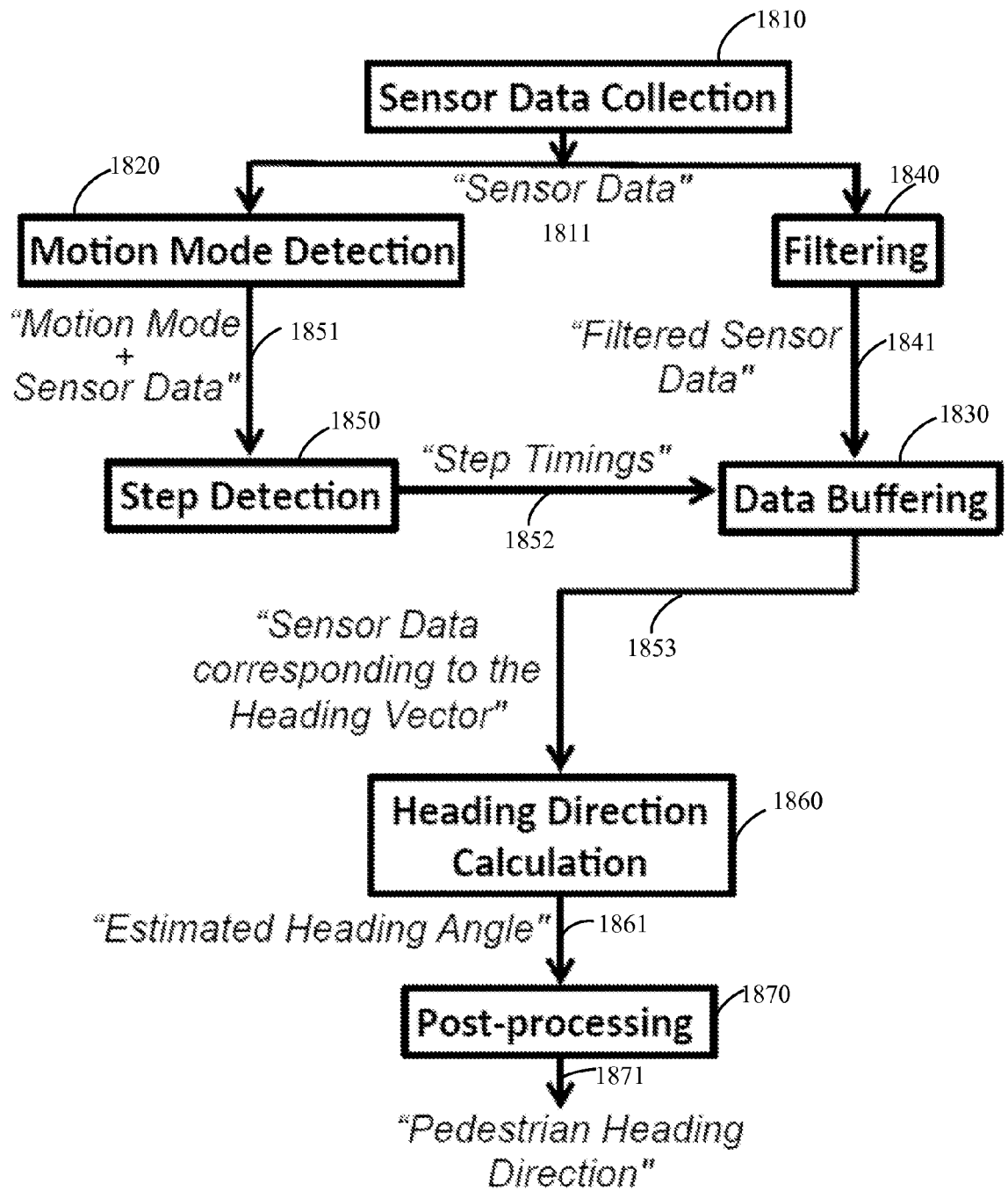
FIG. 18 shows a flow chart of a heading direction estimation algorithm according to an embodiment of the subject invention.

FIG. 18 shows a process flow for estimating a heading direction according to an embodiment of the subject invention. Referring to FIG. 18, sensor data is collected (1810). Because the pedestrian movement analysis does not need very high frequency signals and sampling at higher rates includes high frequency noise in the data, in an embodiment, the data collection can be limited (e.g., to a constant rate of 25 samples per second or less). The collected data 1811 goes to the motion mode detection module (1820) and a buffer module (1830) in parallel. A low pass filter module (1840) can be included to remove noise from the sensor data 1811 before sending it to the buffer 1830 as filtered data 1841, whereas the motion mode detection module (1820) can work with the raw sensor data.

A step detection module (1850) can receive data from the motion mode detection module (1820), with information about the motion mode 1851, and can estimate the timings "step timings" 1852 for the sensor data that correspond to the heading vector. The algorithm can obtain the heading direction vector and the compass direction vector from the buffered sensor data 1853 and feed it to the heading direction calculation module (1860) for generating the heading angle 1861. Then, the post-processing module 1870 can compensate for the errors in generated heading angle and produce the final result 1871.

The motion mode detection algorithm (1820) can determine various use patterns. The algorithm can be based on the energy and various time and frequency domain features of an accelerometer signal. The energy of the accelerometer signal alone can provide coarse division between high and low intensity activities. The high intensity activities can include, as an example, a walk with the phone in swinging hand or pants pocket. The low intensity activities can include, as examples, stationary position, walking with phone on palm top (holding in front such as to interact with the phone), and walking with phone in shirt pocket. The activity identification with energy detection alone may not be precise. For example, energy detection may fail to distinguish a walk with the phone on the palm top from texting in the stationary position. The system can use the results from motion mode to accurately identify the timing of the steps, as the phone shows significant diversity in the sensor data depending on the use pattern. In one embodiment, the motion mode detection module can recognize at least the following cases:

Case 1: The phone (or other device) is held in the hand that swings naturally during the walk.

Case 2: The phone (or other device) is in any of the pockets of the pants.

Case 3: The phone (or other device) is on the palm top or held in way so that the user can use it. The user can watch something on the screen and click or type on it. However, the motion detection algorithm does not assume that the screen will always face the user. It considers the use pattern to be Case 3 as long as the user holds the phone in hand to restrict its natural movement. It does not put any constraint on the orientation of the phone.

Case 4: The motions when the phone (or other device) experiences a sudden jerk. For example, the user raises the hand that holds the phone (phone or other device).

Case 5: The phone (or other device) is in a jacket pocket of the user.

Case 6: The phone (or other device) is in a belt clip of the user.

Case 7: The phone (or other device) is in a bag carried by the user.

Case 8: All other low energy random movements.

Figure 19:
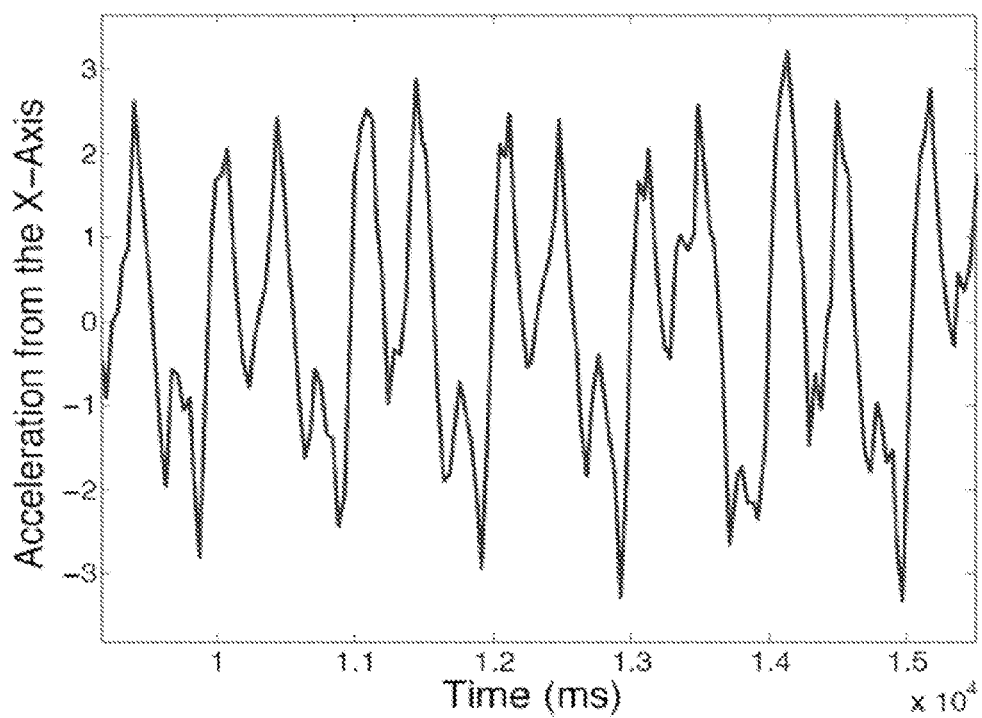
FIG. 19 shows a plot of acceleration versus time.

To achieve more granularity in activity recognition without the need for frequency domain features, the periodic nature of the accelerometer signal during a walk in the time domain can be focused on. FIG. 19 shows a plot of acceleration from the x-axis versus time of an example signal. Referring to FIG. 19, the accelerometer signal shows the periodic ups and downs according to the steps taken by the user. This feature is strongly connected with the walk or run and does not appear in the signal for any other normal activity with the phone. The accelerometer signal can be processed to locate the "positive zero crossing" in order to capture this periodic nature in a feature. "Positive zero crossing" data is actually a series of values that represents the times when the signal crosses (or touches) the value zero line from the negative side. Given the points of the signal are represented by the time and acceleration pair, $<t_i, a_i>$, a point $tz_j$ in the positive zero crossing is calculated with the following formula:

$$tz_j = t_i - a_i \cdot \frac{t_{i+1} - t_i}{a_{i+1} - a_i} \; \forall \, a_i \leq 0 \text{ and } a_{i+1} > 0$$

The mean and standard deviation of the positive zero crossing values over a window are the two features, which together with the power of the accelerometer signal distinguishes between five different modes of user activity required for the algorithm. The walk leaves a periodic effect on the accelerometer value, and the zero crossing values are also regular in the case of walking, compared to any other random activities (e.g., texting). Thus, a very low standard deviation of zero crossing values indicates an action involving repetitive patterns, such as walking or running. However, this feature is not prominent in all three axes of the accelerometer for all the time. Depending on the gait and orientation of the phone, an axis of the accelerometer may not have expected positive zero crossing value.

Fortunately, in the Cases 1-8 at least one axis shows consistent standard deviation values. This feature can be used to distinguish between Case 3 with a relatively stable phone and some random low intensity activity when the user is not walking. The mean value of the positive zero crossing values over a window provide an estimate of the time interval of the repetition. In high intensity activities, the low mean value signifies Case 2, and a high mean value is for Case 1. The algorithm first categorizes the quick, random jerk, high intensity activity and low intensity activity by looking to the total energy level of the accelerometer signal from all three axes. In the next step it uses the standard deviation and mean of the zero crossing values of the accelerometer to distinguish between various cases of user activities as discussed herein.

Once motion mode is determined, step detection (1850) helps the algorithm determine the status of the gait cycle. Various movements of the body during a walk leave an impact on the three axes of the accelerometer data. If the device is on the right side of the body, it experiences higher impact from the movement of the right limbs than that of the left. The reverse is also true. The side of the body on which the device is placed can be called the "primary side", and the other side can be called the "secondary side".

Figure 20A:
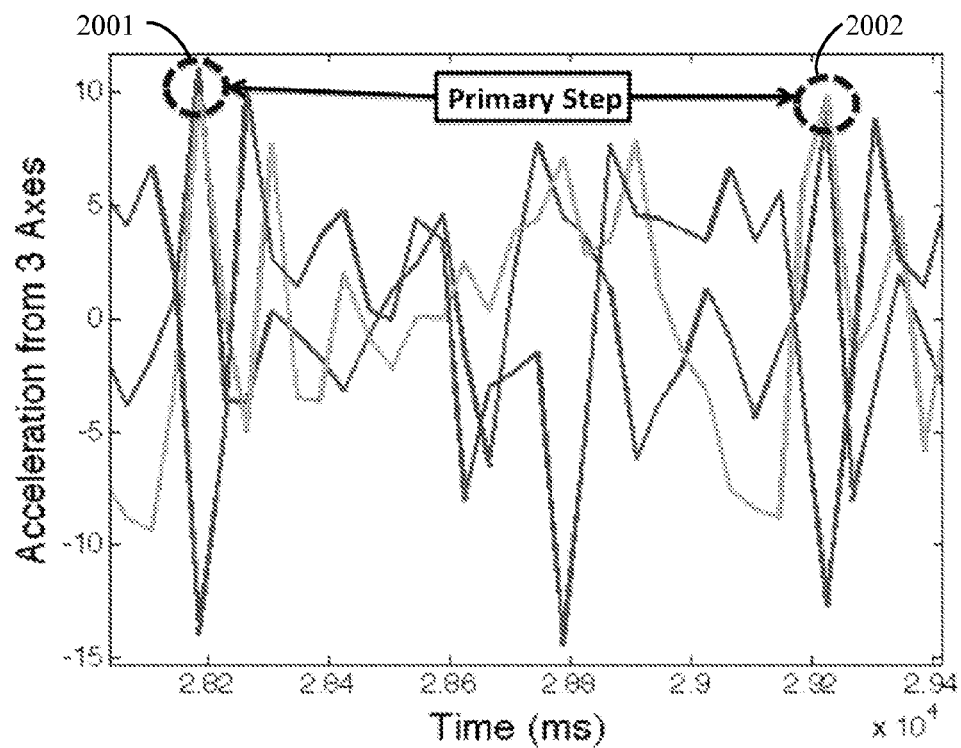
FIG. 20A shows a plot of acceleration versus time.
Figure 20B:
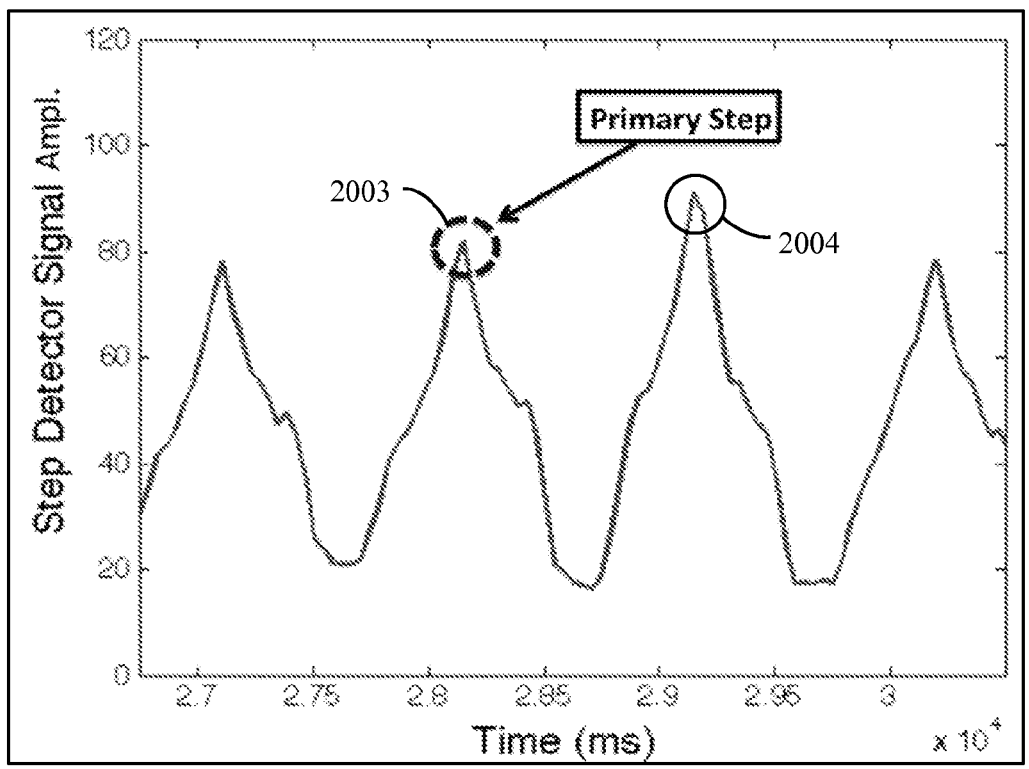
FIG. 20B shows a plot of step detector signal versus time.

Detecting the beginning and ending of a gait cycle generally involves the detection of the point in time when the primary leg touches the ground. This event has a significant impact on the accelerometer value, as it delivers a sharp jerk to the device. During all other time the values from the different axes of the accelerometer may or may not be correlated depending on the orientation of the device, but at the ground touch of the primary leg, all the three axes reach a high value simultaneously. FIG. 20A is a plot showing acceleration in all three axes versus time. Referring to FIG. 20A, the linear acceleration signals from all three axes simultaneously reach extreme values when the primary leg touches the ground during the walk. This key observation can be exploited to create another intermediate signal, which can be used for the primary step detection in the algorithm (for detection 1850). To generate the step detector signal, the absolute values from individual axes can be taken and added together. The envelope of this summation can be taken to get the step detector signal. Thus, a signal can be obtained that shows the point when all three axes of the accelerometer give a very high value together. The local peaks of the step detector signal indicate the ground touch of the primary leg. FIG. 20B shows a plot of step detector signal versus time. Referring to FIG. 20B, the peaks in the step detector signal indicate the timings of the primary steps. A peak detector algorithm can be run to determine the timing of the steps.

The time between two primary steps (e.g. 2001 and 2002; or 2003 and 2004) is the gait cycle. A gait cycle involves two sets of acceleration and deceleration phases, one for each leg. The cycle starts with the acceleration phase of the secondary leg and is followed by its deceleration phase. After that, the two phases of the primary leg come one by one. If the gait cycle is divided into four parts, the last part represents the deceleration phase of the primary leg. In an embodiment, this part can be used for finding the heading direction vector. A window in the middle of this phase can be used to find the average of the values of three axes separately from linear acceleration data within the window. These three average values, one from each axis, represent the three components of the heading direction vector on the device's coordinate system. Because it is a deceleration phase, the calculated vector points exactly opposite to the direction of the walk. This error is corrected by simply reversing the direction of the vector.

The calculated heading direction vector shows the movement of the leg in three-dimensional space, so this vector is projected onto a plane on which the user is moving to find the actual direction of the movement. For example, the vector can be projected onto a horizontal plane to find the actual direction of the walk in the user's two-dimensional space of movement. This horizontal plane should be globally constant and must not depend on the coordinate system of the phone. The plane perpendicular to the direction of gravity can be used for this purpose. The gravity vector always points to the ground no matter what the orientation of the device is. Therefore, it can serve as a global constant. This plane that is perpendicular to the gravity vector can be called the "walk plane". Vector operations can be applied to find the projection of the heading vector perpendicular to the gravity vector. The projected heading vector lies on the walk plane.

To present the heading direction in angles like a compass, the angle that the projected heading vector makes with the magnetic north of the Earth can be determined. The magnetic field vector can be projected on the walk plane, and the directed angle between can be determined from the magnetic field vector to the heading vector on the walk plane to get the direction of the walk as the deviation in angle from the magnetic north.

During bipedal movement, a pedestrian may take a step to the left or right of the actual heading direction. The step by step estimated angle, therefore, may not give the true direction of heading. Moreover, the generated heading angle may be noisy because of occasional random forces applied to the device during the walk. To deal with this issue, in certain embodiments, the post-processing module (1870) takes the average of two consecutive estimates of the estimated heading angle and applies a median filter. The output of the post-processing module can be the final heading direction estimate.

One of the indispensable properties of a generic heading direction estimator should be the robustness for any change in the device's orientation. It is a challenging aspect in the case of pedestrian heading direction estimation, as the device continuously changes its orientation during the walk. The direction and amount of the orientation change is unpredictable, because no restriction is placed on the carrying style of the phone. Systems and methods of the subject invention, though, are inherently free from the effect of the orientation. The direction of the forces applied on the device during the walk and in the global coordinate can be determined, and this direction can remain unchanged even after the device changes its orientation.

The heading direction estimator can sometimes give high error values (which is illustrated with reference to Example 9), though only a small percentage of the time. These high error values can be due to the initial empty buffers, which are used for filtering various data. The buffers are used to store a window of values for the moving average calculator, for the low pass filters used to process the raw sensor data, and/or for the median filter used to calculate the final heading angles. In the beginning of the execution of the application, these buffers may be filled with zeros and therefore any new value is underestimated until the buffer is sufficiently filled with valid values. This can be referred to as a "cold start issue". The estimates during this period may not match with the reality and thus can lead to a high error. This situation can also arise when the direction of walk changes abruptly with a high angle. This issue can be addressed by adaptively resizing the buffers and calibrating the optimal sizes for them.

The heading direction estimator can show the heading direction of a user, and this can be in the coordinate system of a device (e.g., a cellular phone, such as a smart phone) of the system. Because the orientation of the device's coordinate system is not known, a global landmark can be used to represent the heading direction relative to the direction of that landmark. In an embodiment, the magnetic north of the earth can serve as such a global landmark for direction. That is, a digital compass can be used to obtain a direction that can be used as or to determine the global reference direction. The direction of the magnetic field obtained from a magnetometer (e.g., a built-in magnetometer of a smart phone) can be used to represent the walking direction of the user as the angle of deviation from this reference direction. This can sometimes lead to a source of error in an indoor environment.

In an indoor environment, the direction of a magnetic compass can vary spatially due to the presence of ferrous structural material or contents, electrical power systems, and/or electronic appliances that can affect the natural geo-magnetic field. This can introduce error in an estimated heading direction estimated, although the heading vector computed by the algorithm may be correct. Thus, in many embodiments, an alternative global reference direction can be used, such as a WiFi RSS map, a magnetic map, and/or directions of WiFi APs.

In certain embodiments, the heading direction estimator can predict the direction of the next step based on previous stable headings and clues from various other sensors to find the orientation change of the user. This can be thought of as using a dead-reckoning technique for short intervals and at the points when a user takes a turn to estimate the heading direction of a walk ("micro-dead-reckoning"). In this technique, a change in walking direction must be distinguished from orientation change of the device only. In a further embodiment, the length of the buffer(s) can be adaptively maintained, such that at the beginning of a walk or whenever any turn invalidates the contents of the buffer, the length of the buffer can be shortened, and then increased up to a limit when a series of stable headings are found.

In a further embodiment, the heading direction of a user can be estimated three-dimensional space. The heading vector calculated by the heading direction estimator can already point the direction in three-dimensional space and can inherently produce the direction of movement in a three-dimensional environment. This is helpful to identify the heading direction when the user is climbing stairs and in many other scenarios where the movement is not restricted to the horizontal plane.

In another embodiment, the heading direction can be estimated for a user using equipment for locomotion, including but not limited to a wheel chair or a skateboard. The heading direction estimator can work as long as a repetitive pattern of heading forces occur and can be sensed during the process of movement. Thus, implementations are available for cases in which a user (and device) is traveling on an equipment for locomotion.

In certain embodiments, the heading direction can be estimated by using sensing data from and/or communicating between multiple sensing devices located at various parts of the body of a user. For example, the combined data from a device (e.g., a smart phone) in a pocket and a device (e.g., a tablet) in a hand can provide more information about the user's movement and can sometimes produce better estimation of the heading direction.

Systems and methods of the subject invention can estimate the heading direction of a user by analyzing the various forces employed during the walking process. The moving direction of the user can be identified on a per step basis. The systems and methods can be inherently free from the constraints of the orientation of a device used to obtain sensor data. An average error in heading direction estimation of, e.g., six degrees or less can be obtained.

The systems and methods of heading direction estimation can be used as in connection with any navigation system and/or localization system, including but not limited to the systems and methods for indoor localization described herein. For example, a heading direction estimation as described herein can be used during the walking trace estimation (using, e.g., dead-reckoning) of the indoor localization systems and methods described herein. Heading direction can be incorporated into the indoor localization process for a more robust experience in tracing a user's path (and facilitating orientation determination for recognizing calculations in some implementations).

The methods and processes (and algorithms) described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Experiments were performed in the computer engineering building at Duke University in Durham, N.C., United States of America. Volunteers were asked to carry NexusS phones in their pockets and walk naturally in one wing of the building. A system according to an embodiment of the subject invention was implemented on the mobile phone of each user. The system recorded the accelerometer and compass readings of each user and extracted from these reading the <displacement, direction, time> tuples. To record ground truth, different doors and windows in the building were marked with a distinct number, and when a user passed by that number, the user entered it into the phone. Since the mapping between the number and the door/window was known, ground truth could be extracted. Ten traces were gathered, each starting from the entrance of the building. Trace-based analysis was performed to understand how the dead-reckoned path diverged from the true path, with varying number of landmarks.

Figure 21:
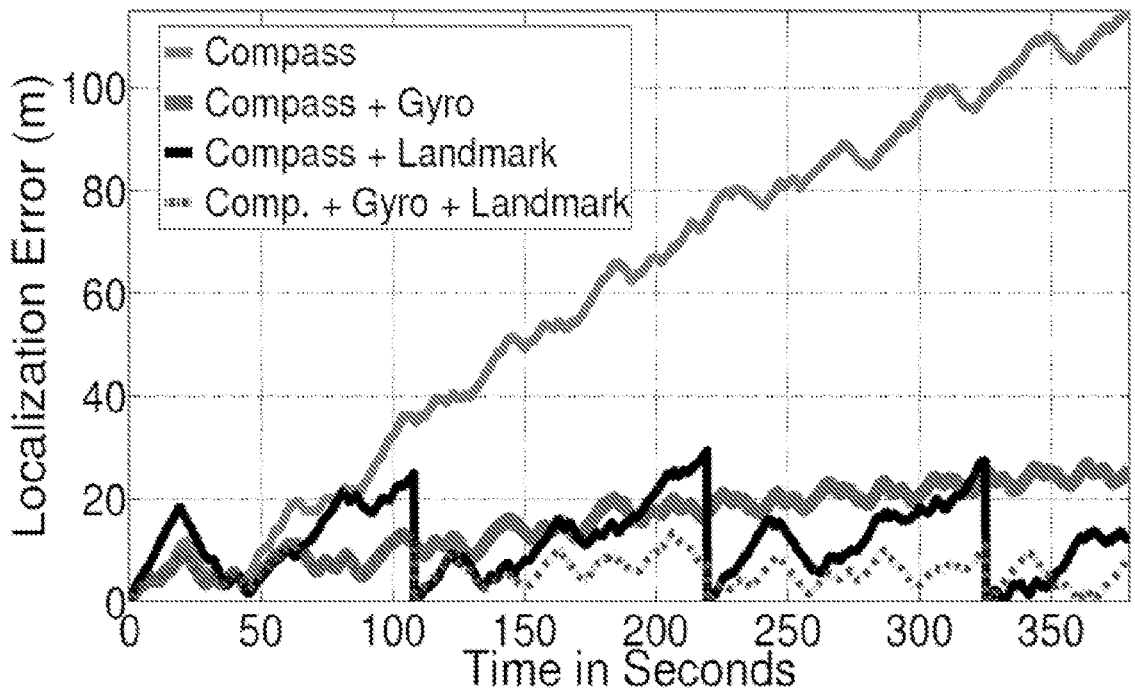
FIG. 21 shows a plot of localization error versus time using different levels of information.
Figure 22:
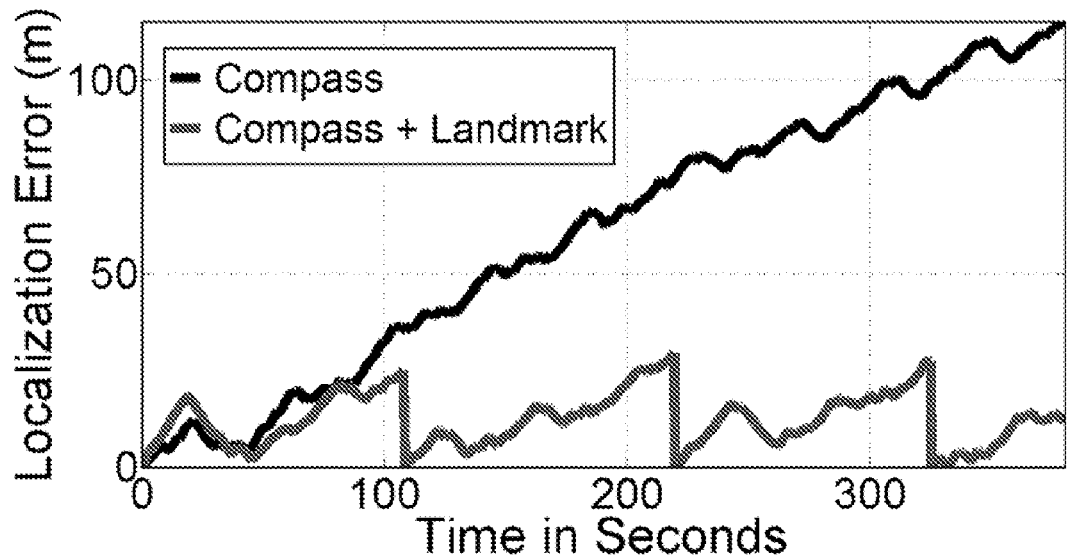
FIG. 22 shows a plot of localization error versus time using different levels of information.

FIGS. 21 and 22 show plots of localization error versus time using different levels of information. Referring to FIGS. 21 and 22, error from dead-reckoning reduces when a gyroscope is used and reduces further when landmarks are used. In FIG. 21, the line that reaches an error of over 100 m is for compass only, the lighter solid line that reaches an error of about 20 m is for compass and gyroscope, the darker line with the saw-tooth pattern is for compass and landmarks, and the dotted line is for compass, gyroscope, and landmarks. The accumulated error over time when using pure dead-reckoning with zero landmarks (compass only) accumulates dramatically fast and is completely unusable. Here, landmarks were simulated by periodically resetting the user's location to the correct location, and the compass+landmark curve shows the results. While the performance improves, the mean localization error is still 11.7 m.

It was observed that the magnetic field in the indoor environment was heavily distorted by metallic and electrical equipment in the building. Although these magnetic fluctuations can be beneficial for identifying LMs, they derail dead-reckoning by injecting heavy error in the compass. Gyroscopes measure the angular velocity in three dimensions and are not affected by the magnetic field. Gyroscope readings were processed to compute the angular changes during walking, i.e., how the user turned. However, gyroscope readings are relative and were combined with the compass to estimate the user's absolute walking direction. Using the gyroscope and the compass in tandem reduced the dead-reckoning error appreciably, as seen in FIG. 21. When re-calibrated by periodic landmarks, the average error dropped further to 1.2 m. In addition, once a landmark is encountered, the user's path can be retraced and corrected between the last two landmarks. Although this does not help in real-time tracking of the user, it helps in offline analysis, and for improving the location estimate of OLMs.

Example 2

Figure 23:
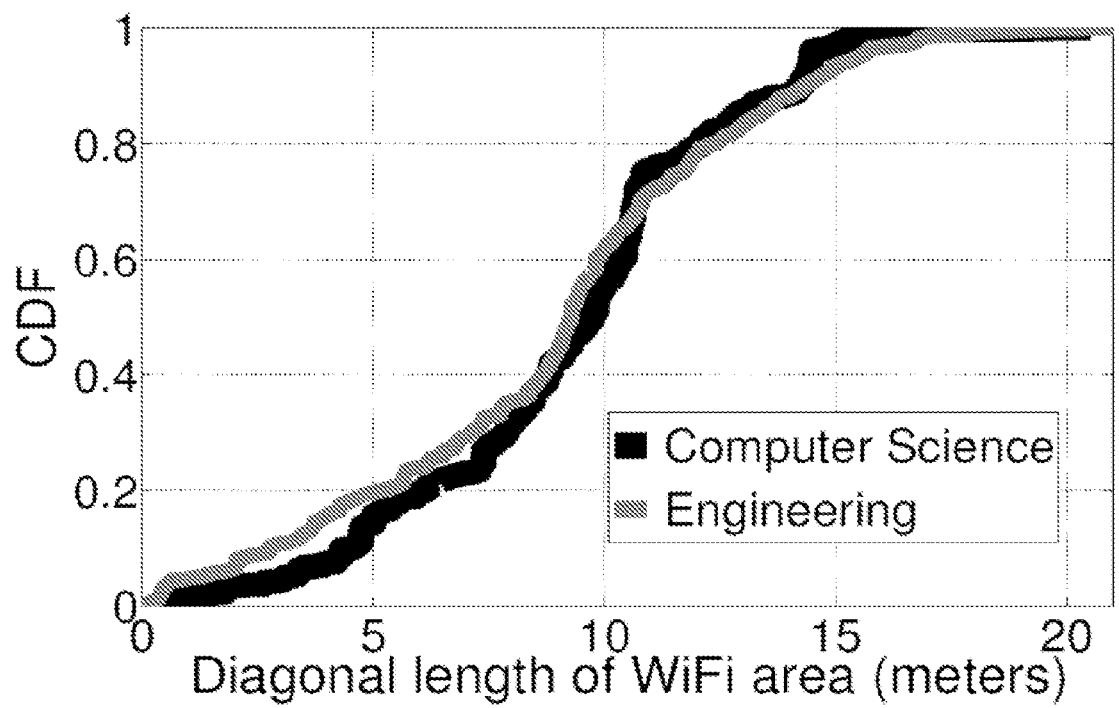
FIG. 23 shows a plot of the cumulative distribution function (CDF) of the sizes of WiFi areas in a building.

An indoor space is likely to have many areas, of varying sizes, within which all locations overhear a distinct set of WiFi APs. FIG. 23 shows a plot of the cumulative distribution function (CDF) of the sizes of these areas in the engineering building at Duke University. While most of the areas are quite large, explaining why simple WiFi-based localization is not very accurate, there are a few areas (at the left side of the X axis) that are very small. Systems and methods of the subject invention can exploit these small areas as an LM. If one of these small areas overhears a set of WiFi APs, denoted W, then a mobile device overhearing the same set can be assumed to be within that area. Since the area is small, the localization error of the phone will be small too, enabling a location recalibration. Measurements showed that in two floors of the engineering building, eight and five such WiFi landmarks exist, respectively, each of an area less than 4 $m^2$. Thus, WiFi APs can offer LMs to enhance dead-reckoning.

Example 3

Figure 24:
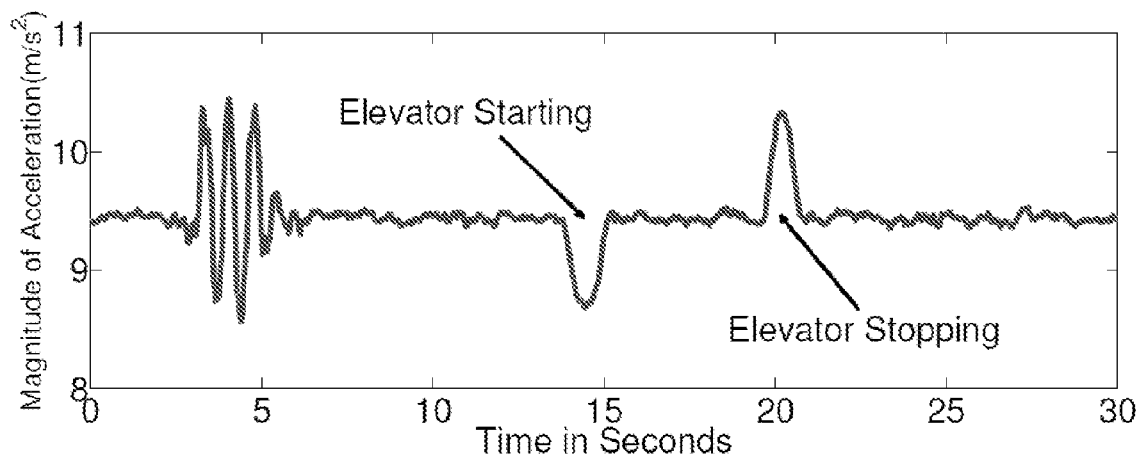
FIG. 24 shows a plot of acceleration versus time.

K-means clustering was executed on accelerometer and compass measurements obtained in Example 1. For each cluster, members were mapped to their corresponding physical locations (using ground truth). For most clusters, the member locations were widely scattered in space, and hence, were unusable as a LM. However, members of a few clusters proved to be tightly collocated in space as well. A unique/stable magnetic fluctuation was discovered near the networking lab within the engineering building. Another location with a distinct accelerometer signature—a pair of symmetric bumps in opposite directions—was also discovered. FIG. 24 shows a plot of acceleration versus time for this signature. Referring to FIG. 24, this accelerometer signature occurred inside an elevator, caused by the elevator starting and stopping. Though, the system need not understand the semantic meaning of these signatures.

The direction of the bumps (upward or downward) indicated whether the user went upstairs or downstairs. These spatially collocated patterns were natural LMs, and when all sensing dimensions were assimilated, the number of landmarks proved to be six and eight for the two floors, respectively. When accelerometer and compass data were combined, providing a higher dimensional signature, even more OLMs were discovered due to turns in the building. The OLMs and SLMs together offer the needed density to support indoor dead-reckoning.

Example 4

Figure 25A:
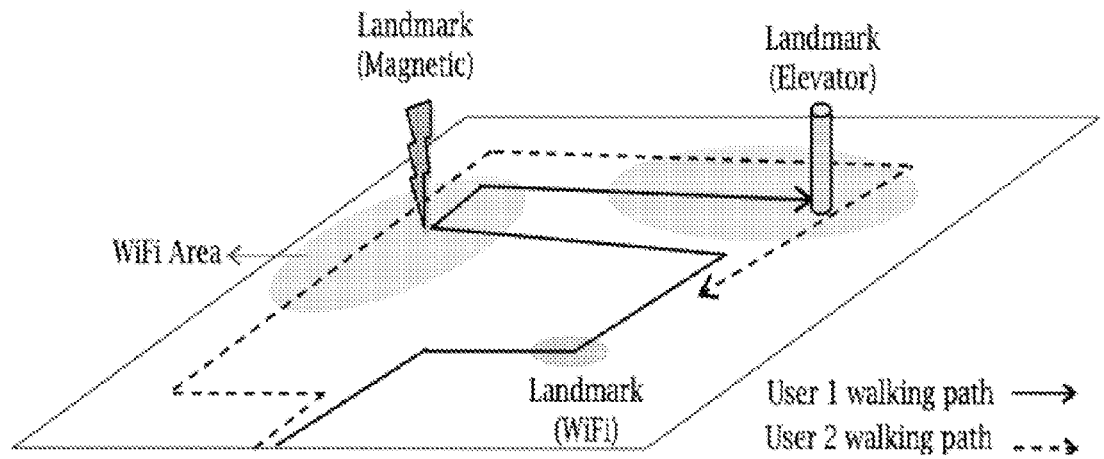
FIG. 25A shows a schematic diagram of users walking and periodically encountering landmarks (LMs).
Figure 25B:
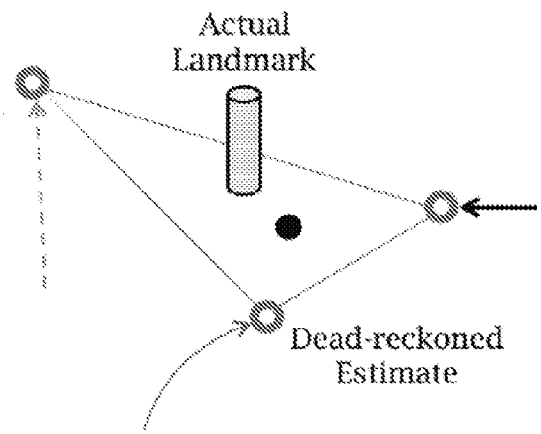
FIG. 25B shows a schematic diagram illustrating a centroid calculation of a LM.
Figure 26:
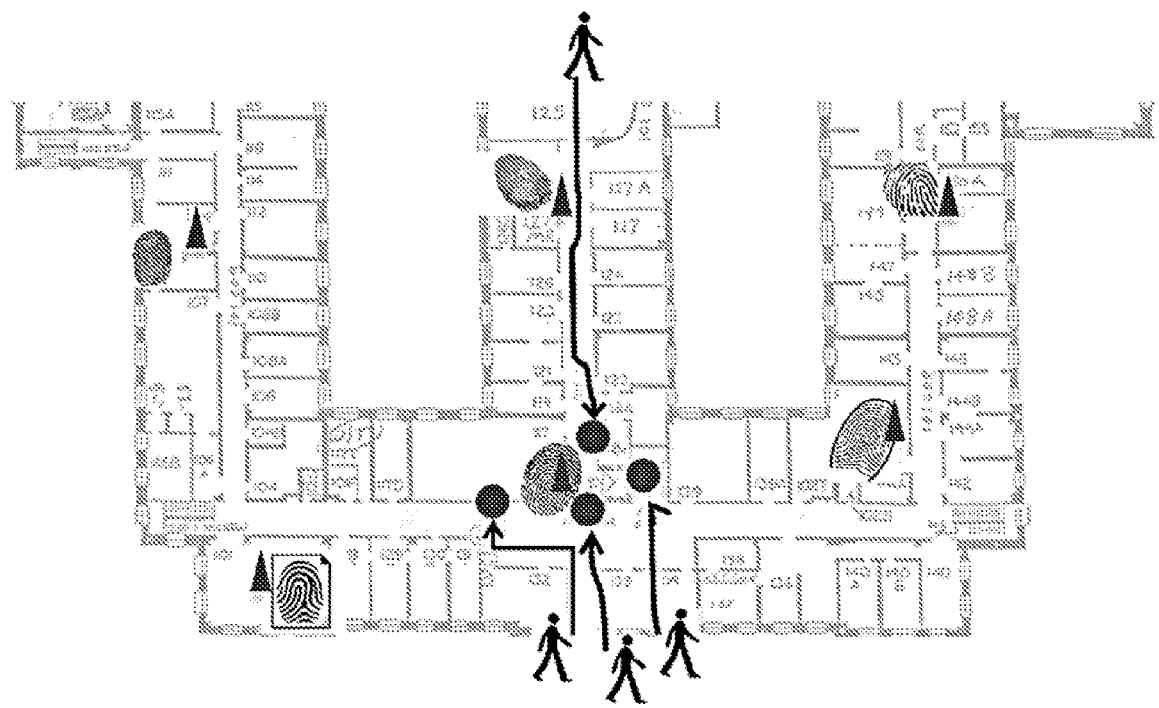
FIG. 26 shows a diagram of walking paths.
Figure 27:
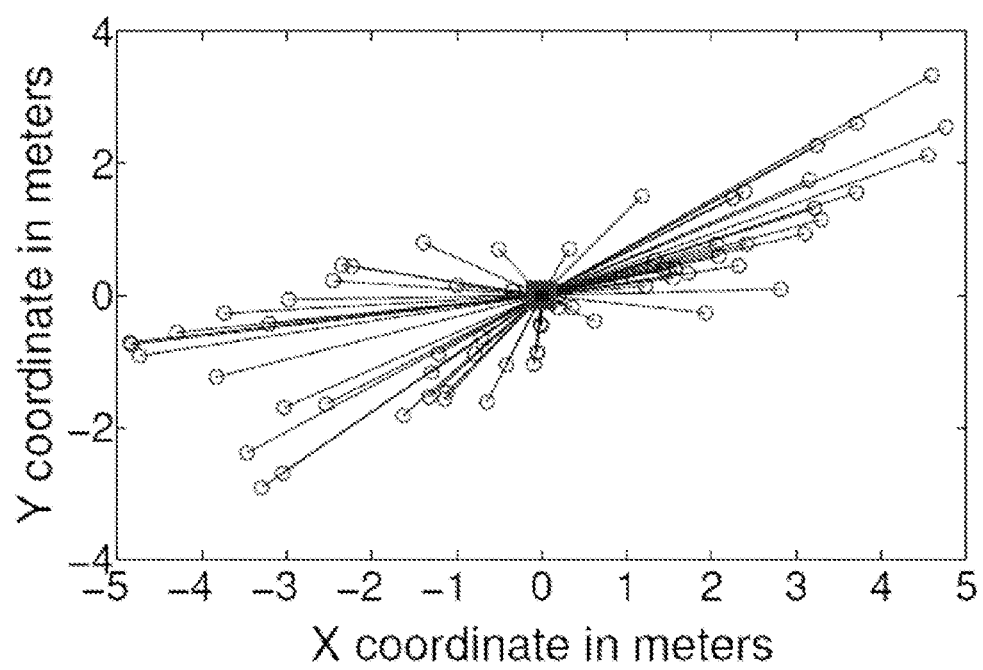
FIG. 27 shows a plot of y-coordinate of estimated LM location versus x-coordinate of estimated LM location.

FIG. 25A shows a schematic diagram of users walking and periodically encountering LMs. In this example, it is assumes that the system has combined the user's sensor data, clustered on them, and discovered three sensor signatures (in distinct WiFi areas), that can be used as LMs. The locations of these landmarks need to be computed, but there is no ground truth to learn that. One way to estimate the location of a landmark is to use dead-reckoning, but that may not be accurate since dead-reckoning itself can be erroneous. The landmark location can be computed by combining all the (dead-reckoned) estimates of a given landmark. The dead-reckoning errors have been observed to be random and independent, due to the noise in hardware sensors and human step sizes. By combining these errors from adequate measurements, the estimated mean can be expected to converge to the actual landmark location. FIG. 25B shows a schematic diagram illustrating this process through a simple centroid calculation. FIG. 26 shows a diagram of walking paths giving one example of how data for FIG. 25B might be obtained. FIG. 27 shows a plot of y-coordinate of estimated LM location versus x-coordinate of estimated LM location for multiple dead-reckoned estimates. Referring to FIG. 27, each line joins the estimated LM location to the actual location.

Example 5

A system according to the subject invention was implemented on Google NexusS phones using JAVA as the programming platform. The phone sampled the four sensors (magnetometer, compass, and accelerometer at 24 Hz; gyroscope at highest permissible rate) and WiFi (at 1 Hz). Various features derived from these measurements were sent to a server connected to the phones. The server side code was written using C# and MATLAB, and it implemented the dead-reckoning, clustering, and landmark signature-matching algorithms. Whenever a new landmark was detected from clustering, the server updated the OLM list.

Markers were placed on the ground at precisely known locations, such as the center of a classroom door, the first step in a staircase, the entry-point to an elevator, or in front of a window. Each of these markers had a number on it, and as a user walked through a marker, the user spoke out the number on the marker, and the phone recorded it. By superimposing the map of the building on Google™ Earth, and identifying the corresponding locations of the markers, their GPS locations were extracted. This provided ground truth at these markers. Between two markers (separated by 5 m on average), step-count was used to interpolate. The system did not rely on any of the ground truth markers to compute location; these were used only for error analysis.

Traces were obtained at two malls in Egypt. Table 1 shows the confusion matrix for the detection of all SLMs using these traces from the malls. The matrix shows that some SLMs were easier to detect than others due to their unique patterns. This led to zero false positive and negative rates for the elevators and walking cases. Even with the more difficult SLMs, the high accuracy was still achieved, with an overall 0.2% false positive rate and 1.1% false negative rate.

TABLE 1

Confusion matrix for classifying different seed landmarks

|  | Elevator | Stationary | Escalator | Walking | Stairs | FP | FN | Traces |
|---|---|---|---|---|---|---|---|---|
| Elevator | 24 | 0 | 0 | 0 | 0 | 0% | 0% | 24 |
| Stationary | 0 | 31 | 1 | 0 | 0 | 0% | 3.1% | 32 |
| Escalator | 0 | 0 | 22 | 0 | 0 | 0.6% | 0% | 22 |
| Walking | 0 | 0 | 0 | 39 | 0 | 0% | 0% | 39 |
| Stairs | 0 | 0 | 0 | 1 | 52 | 0% | 1.8% | 53 |
| Overall |  |  |  |  |  | 0.2% | 1.1% | 170 |

Example 6

A system according to the subject invention was implemented on Google NexusS phones using JAVA as the programming platform. The phone sampled the four sensors (magnetometer, compass, and accelerometer at 24 Hz; gyroscope at highest permissible rate) and WiFi (at 1 Hz). Various features derived from these measurements were sent to a server connected to the phones. The server side code was written using C# and MATLAB, and it implemented the dead-reckoning, clustering, and landmark signature-matching algorithms. Whenever a new landmark was detected from clustering, the server updated the OLM list. Prototypes of the tracking system show indoor localization with a median location error of 1.69 meters (m) or less.

Real-life experiments were performed with three different users in three different buildings: (1) the computer science building at Duke University; (2) the engineering building at Duke University; and (3) North Gate shopping mall in Durham, N.C. The area covered in each building was (approximately) 1750 m², 3000 m², and 4000 m², respectively. Each user walked around arbitrarily in the building for 1.5 hours, covering multiple floors; they carried 2 phones, one in the pocket and another in the hand with the screen facing up. Separate arrangements were made to collect ground truth (recall that GPS is not available inside any of these buildings). Markers were placed on the ground at precisely known locations, such as the center of a classroom door, the first step in a staircase, the entry-point to an elevator, or in front of a window. Each of these markers had a number on it, and as a user walked through a marker, the user spoke out the number on the marker, and the phone recorded it. By superimposing the map of the building on Google™ Earth, and identifying the corresponding locations of the markers, their GPS locations were extracted. This provided ground truth at these markers. Between two markers (separated by 5 m on average), step-count was used to interpolate. The system did not rely on any of the ground truth markers to compute location; these were used only for error analysis. At any given time, the difference between ground truth and the system-estimated location was the instantaneous localization error.

Figure 28A:
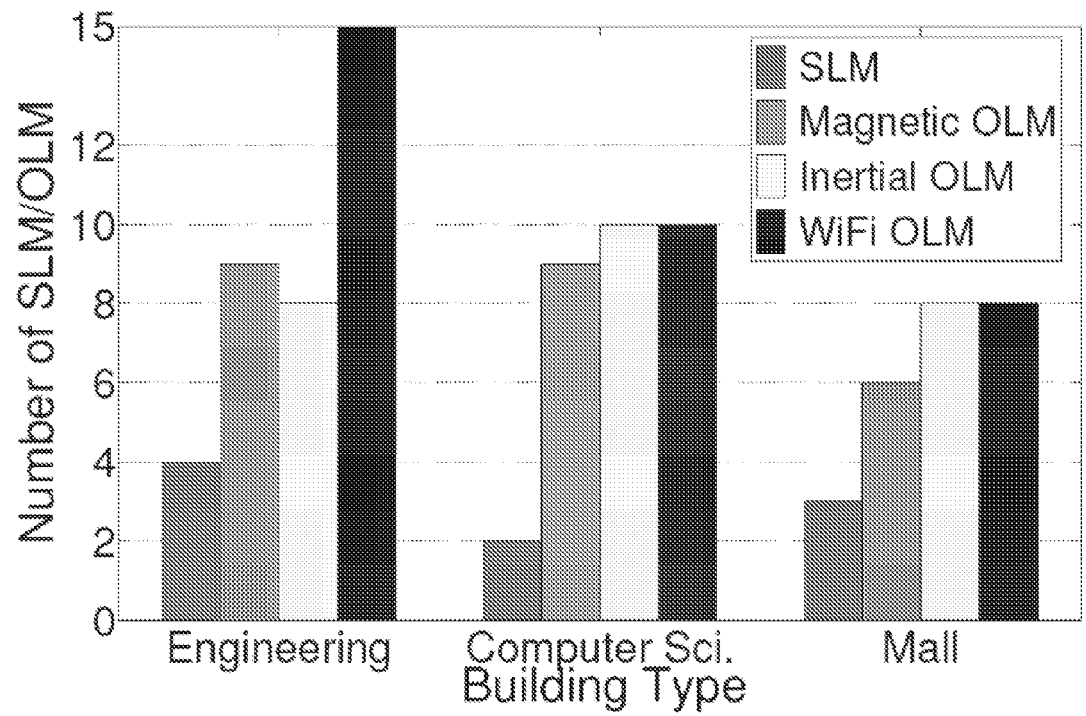
FIG. 28A shows a plot of number of LMs detected.
Figure 28B:
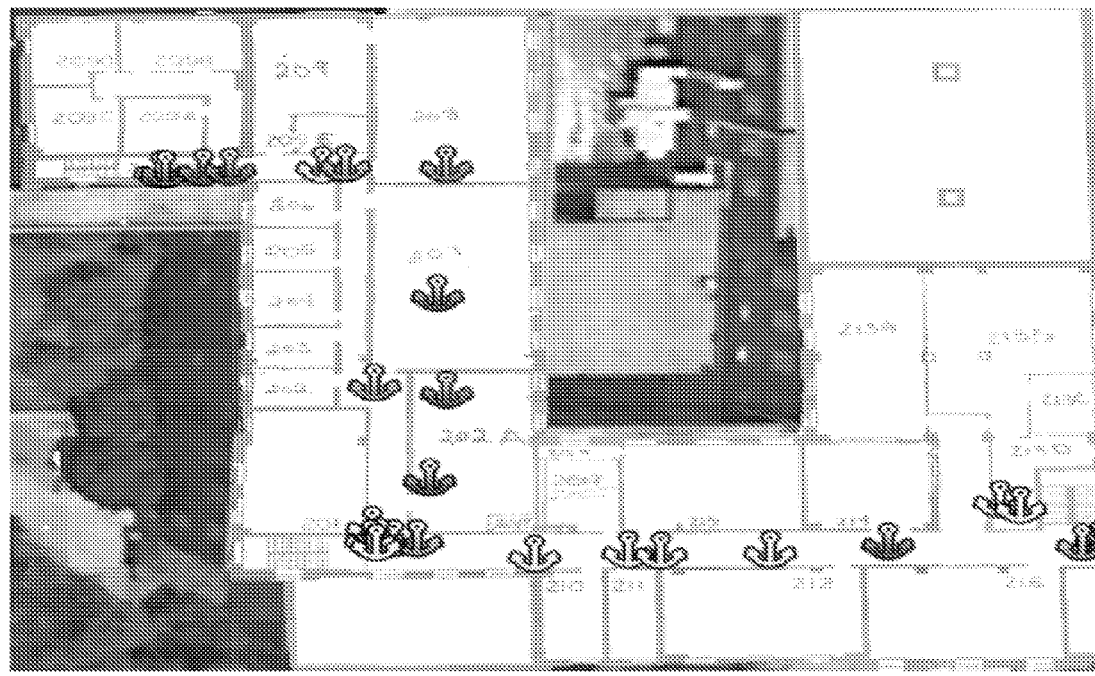
FIG. 28B shows a schematic diagram of LMs.

FIG. 28A shows a plot of the number of LMs detected, and FIG. 28B shows a schematic diagram of LMs. Referring to FIG. 28A, the breakdown of the LMs in the engineering building is nine magnetic, eight turns, and 15 WiFi OLMs. For the computer science building, the breakdown is: nine magnetic, ten turns, and ten WiFi OLMs. Referring to FIG. 28B, these landmarks are quite homogeneously scattered inside the buildings. With these numbers of well-scattered landmarks, a user's dead reckoning error is not likely to grow excessively, in turn helping landmark localization.

Figure 29A:
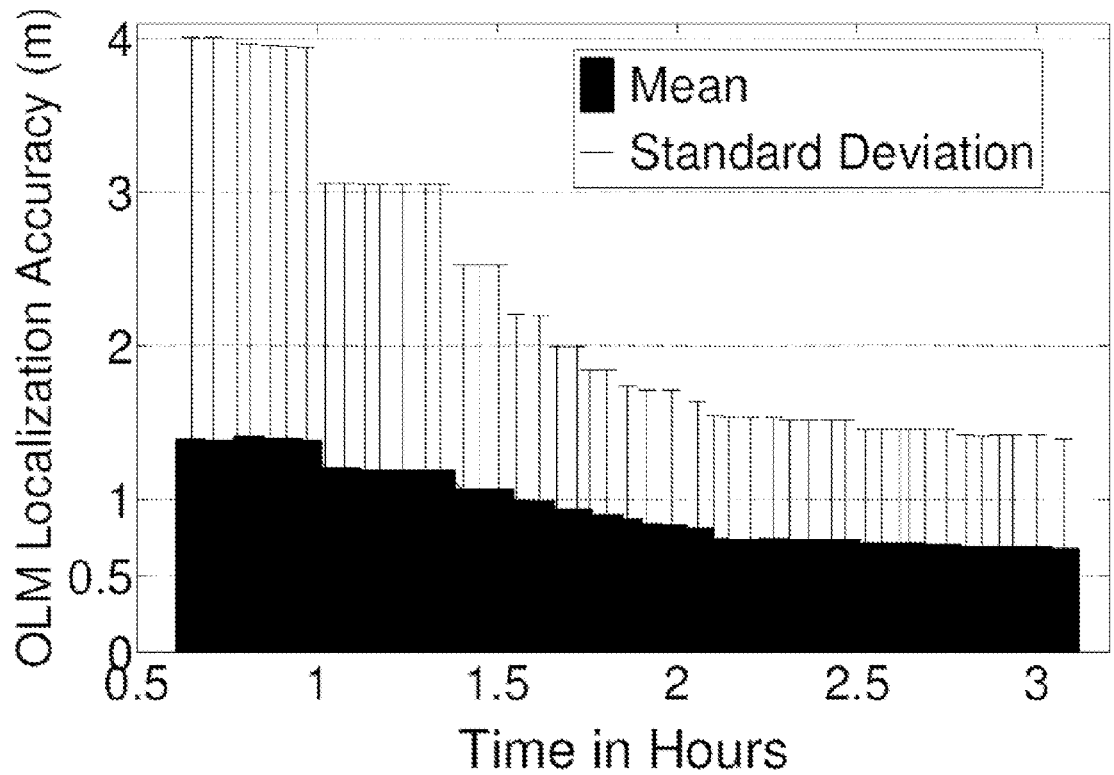
FIG. 29A shows a plot of OLM localization accuracy versus time.
Figure 29B:
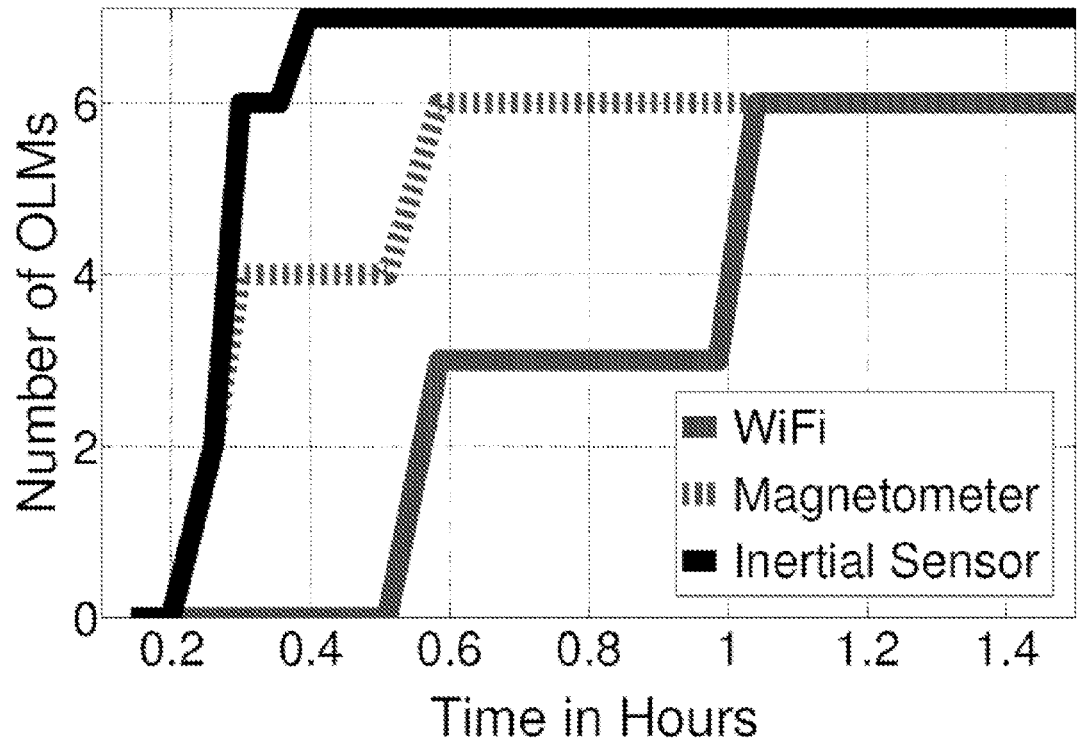
FIG. 29B shows a plot of number of OLMs versus time.
Figure 29C:
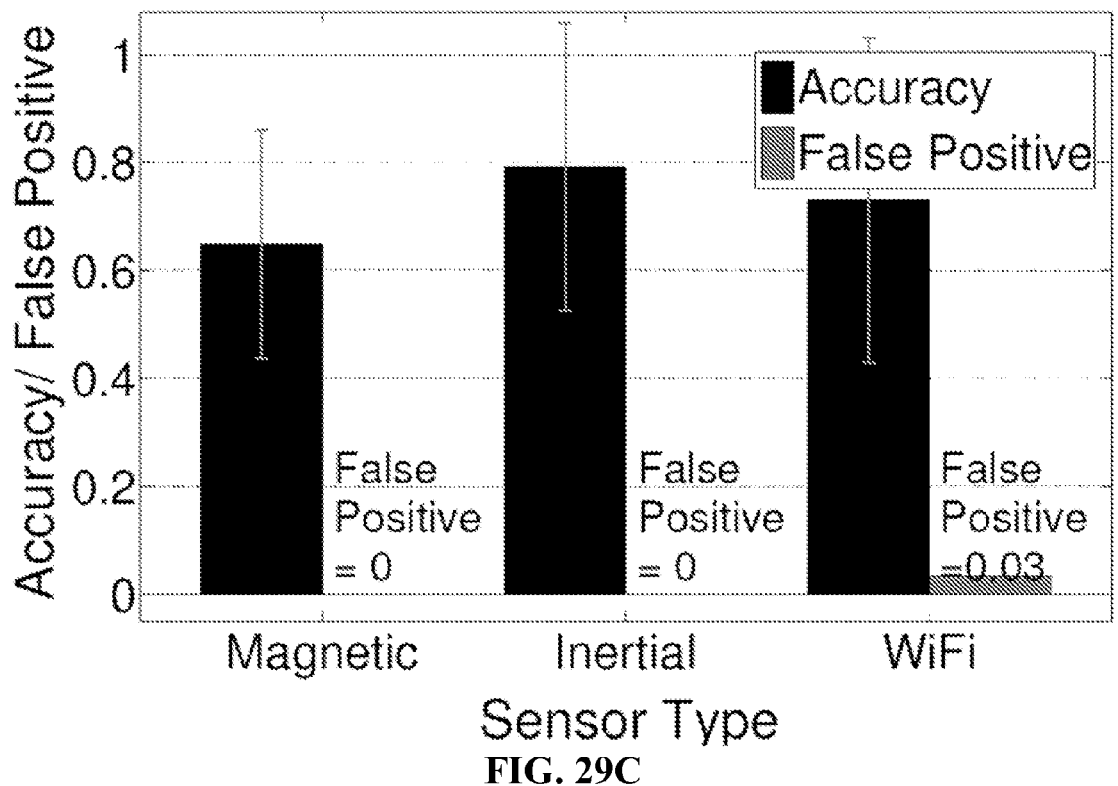
FIG. 29C shows a plot of accuracy versus sensor type.

FIG. 29A shows a plot of OLM localization accuracy versus time; FIG. 29B shows a plot of number of OLMs versus time for different sensor types; and FIG. 29C shows a plot of accuracy versus sensor type. Referring to FIG. 29A, the number of landmarks increases over time, as more users explore the space. FIG. 29B also supports this finding. The accuracy of these landmarks also increase, since different paths bring different independent estimates. The data sets in this example were somewhat limited in diversity of paths since volunteers could not walk around into any rooms or auditoriums in these buildings—many were research offices, faculty offices, or classrooms. The diversity of different independent paths can be expected to augment the accuracy.

Example 7

The experiment described in Example 6 was repeated on multiple days. If landmark signatures fluctuate quickly over time, then OLMs will be unstable. Thus, users may never encounter the established OLMs because their signatures are changing faster than they can be learned. Furthermore, it is entirely possible that users at a different location sense a signature that matches a far-away landmark. In such a case, the user's location will be repositioned to the (highly erroneous) landmark. To verify if such variations occurred in the test buildings, sensor readings were collected on multiple days. Sound consistency was found in the signatures. This is not surprising because all the signatures are designed to be stable, particularly WiFi and accelerometer/gyroscope-based turns. While the magnetic signatures can change, no appreciable change was observed. Nonetheless, systems of the subject invention can embrace a conservative approach by using a low similarity threshold while declaring a LM. In other words, the signature of the landmark should be very dissimilar with other signatures to qualify as a LM. This helps ensure that when a test user matches sensed readings with existing OLMs, the false positive (FP) rate is low.

Referring to FIG. 29C, FPs are quantified and shown to be less than 1%. As a tradeoff for choosing very distinct signatures, it is possible that a test user may not match it well. FIG. 29C shows that the matching accuracy is reasonably high, though not perfect. Given that the number of landmarks is high, missing a few will affect performance much less than matching to an incorrect landmark. In other words, the system can be in favor of trading off matching accuracy to maintain low FPs.

Of course, changes in the ambience, (e.g., relocation of major electrical equipment to a different room, or deactivated WiFi APs) can affect existing landmarks, and the system will not be able to match them. However, the system will learn these changes over time, both the disappearance of the LM from its original location, as well as the emergence of a LM at a different location. The system can remain resilient to LM churn, especially in the case that not all changes occur at the same time.

Figure 30A:
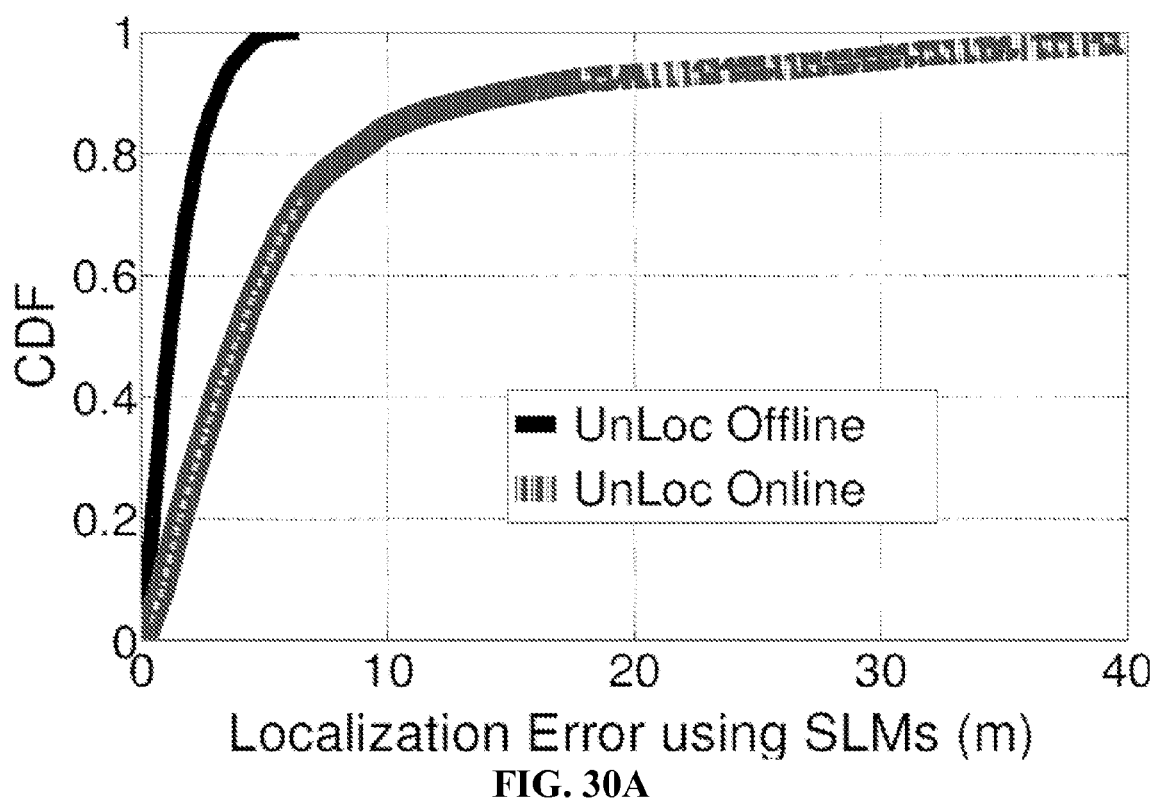
FIG. 30A shows a plot of the CDF of localization error.
Figure 30B:
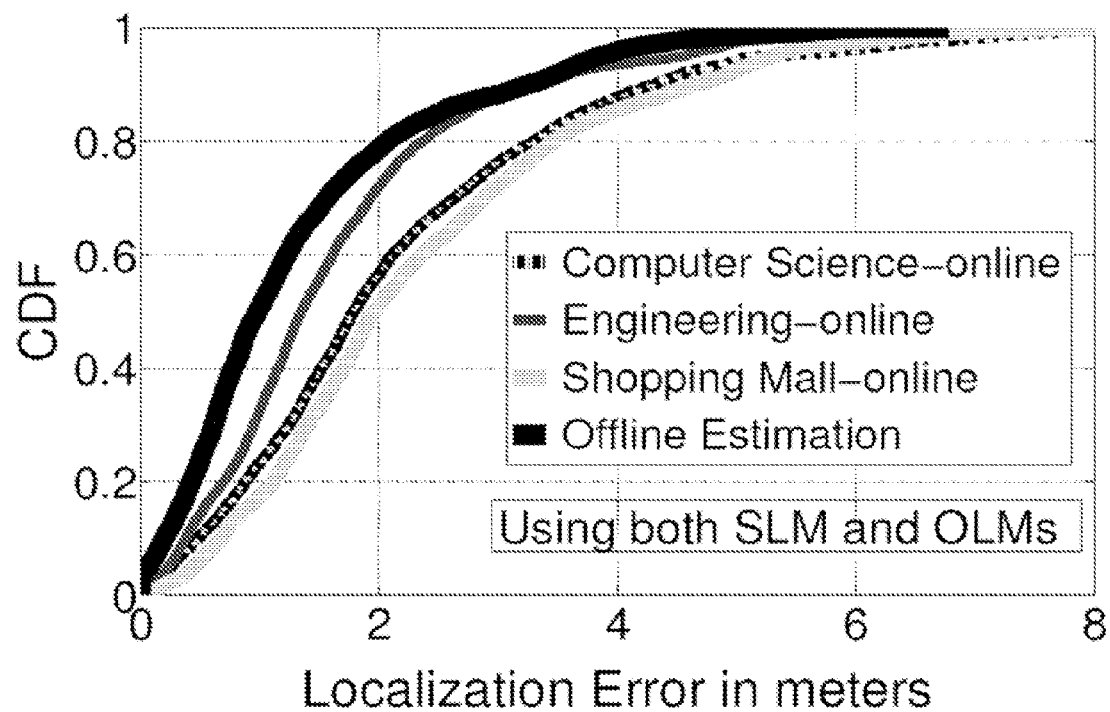
FIG. 30B shows a plot of the CDF of localization error.

In offline localization, whenever a user encounters a LM, the system learns the user's errors, and therefore can track back and partly correct the user's past trail. Online, real-time localization does not offer this benefit. FIG. 30A shows a plot of the CDF of localization error using SLMs for offline and online localization. The offline localization is the darker line. FIG. 30B shows a plot of the CDF of localization error using both SLMs and OLMs for offline estimation and for online localization in the different building. The thick, dark line at the left of the plot is for offline estimation.

Figure 31A:
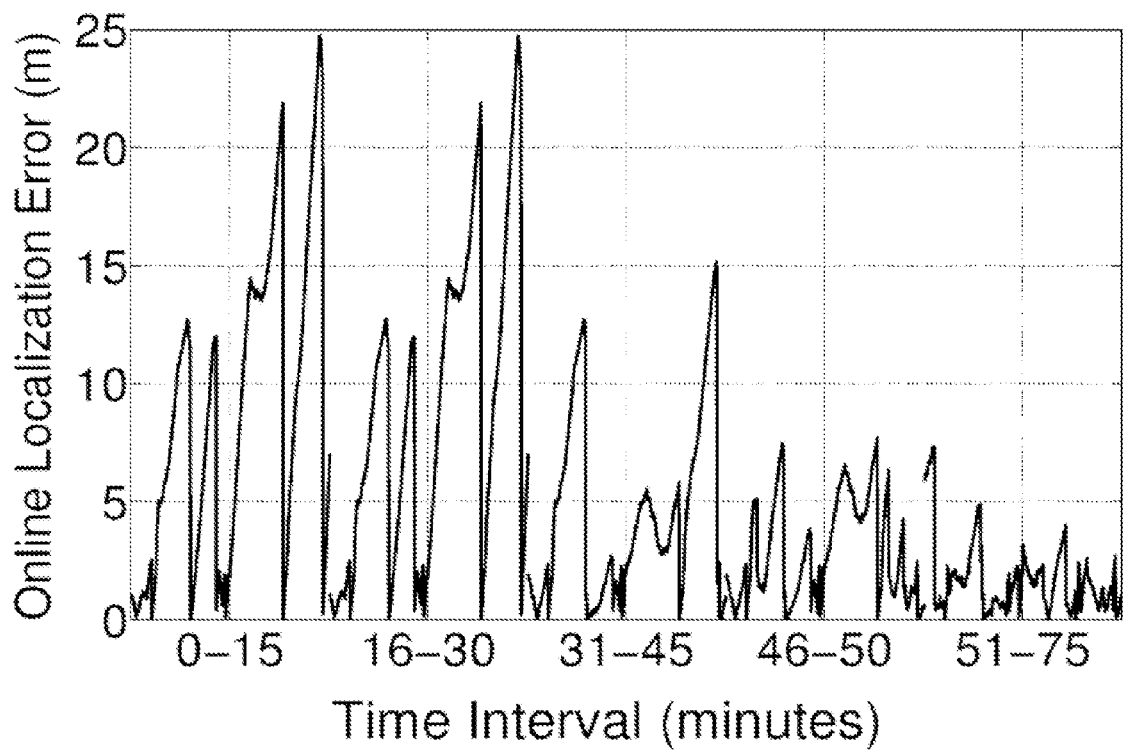
FIG. 31A shows a plot of localization error versus time.
Figure 31B:
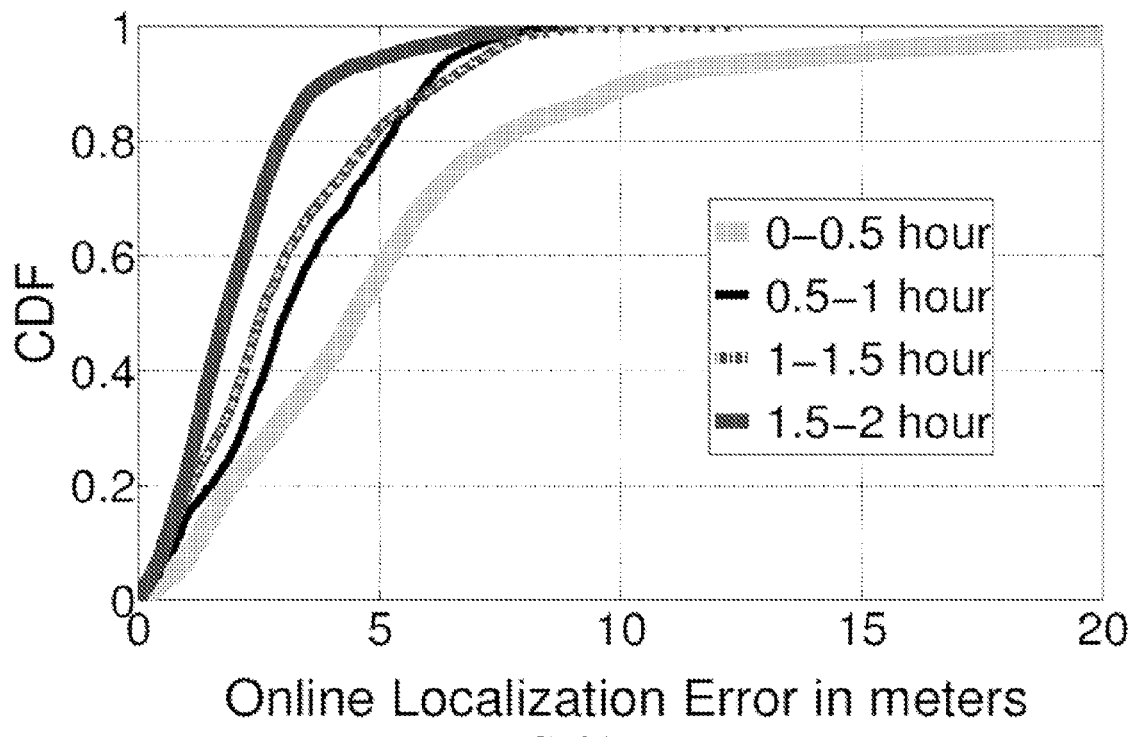
FIG. 31B shows a plot of CDF of localization error.

Referring to FIGS. 30A and 30B, the advantage of offline localization can be appreciable. This implies that for applications which do not need online tracking, localization error can be within 1.15 m on average, even with a few LMs. As the system identifies several OLMs, error correction opportunities can increase. FIG. 30B demonstrates that the mean instantaneous localization error is within 1.69 m. The performance can improve over time as more OLMs are detected. FIG. 31A shows a plot of localization error versus time, and FIG. 31B shows a plot of CDF of localization error at different times. Referring to FIGS. 31A and 31B, the localization error is higher early on but decreases rapidly. Referring to FIG. 31A, as a user moves away from a landmark, the location error grows and eventually gets reset at the next landmark.

Initially, the system may have only has a few LMs, and the error between two LMs can be high. As more landmarks are identified and added to the system, the error growth can be curbed frequently. Referring again to FIG. 32B, the error is aggregated over time across all the users walking on multiple routes. The benefits of additional OLMs are evident.

Figure 32:
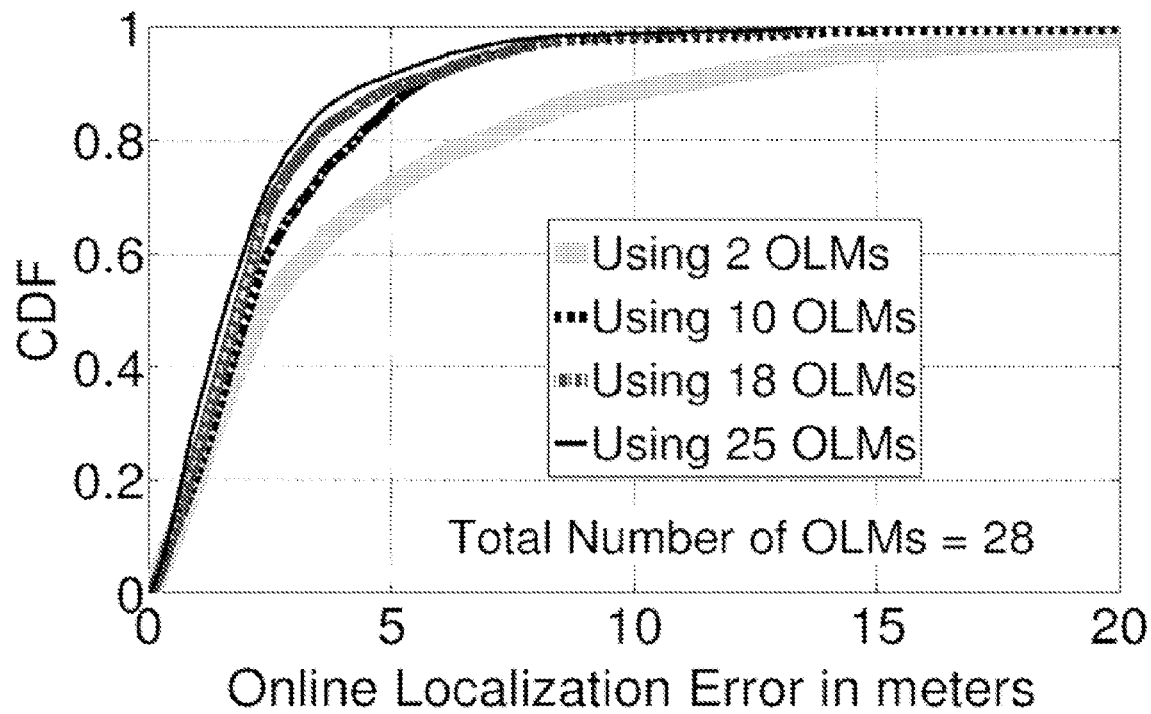
FIG. 32 shows a plot of the CDF of localization error.

FIG. 32 shows a plot of the CDF of localization error using different numbers of OLMs. Even with ten out of the 28 landmarks, average instantaneous location error is within 1.9 m. A few landmarks can be expected to be available in most buildings. In certain embodiments, it is possible for the system to even turn on the microphone to expand to ambient acoustic signatures.

Example 8

Heading direction estimation in certain systems and methods of the subject invention is based on the principles of force and motion in Newtonian physics. According to the principles, all motions of an object are the effect of the forces applied on it. Every change in position or velocity, from the drop of a pen to the complex motion of a car, is actually caused by the forces. The relationship between the force, velocity, and acceleration is better explained with a simple two-dimensional scenario described in the FIG. 33. Here the object was initially stationary at position A, and a constant force (F1) is applied for n seconds on it and after that, at position C, the force reverses its direction (F2) and again acts for n seconds. Even if the force cannot be observed directly, it can be sensed through the changes in position, velocity, and acceleration of the object. The changes in position, velocity, and acceleration caused by this force are depicted in FIG. 33.

Figure 33:
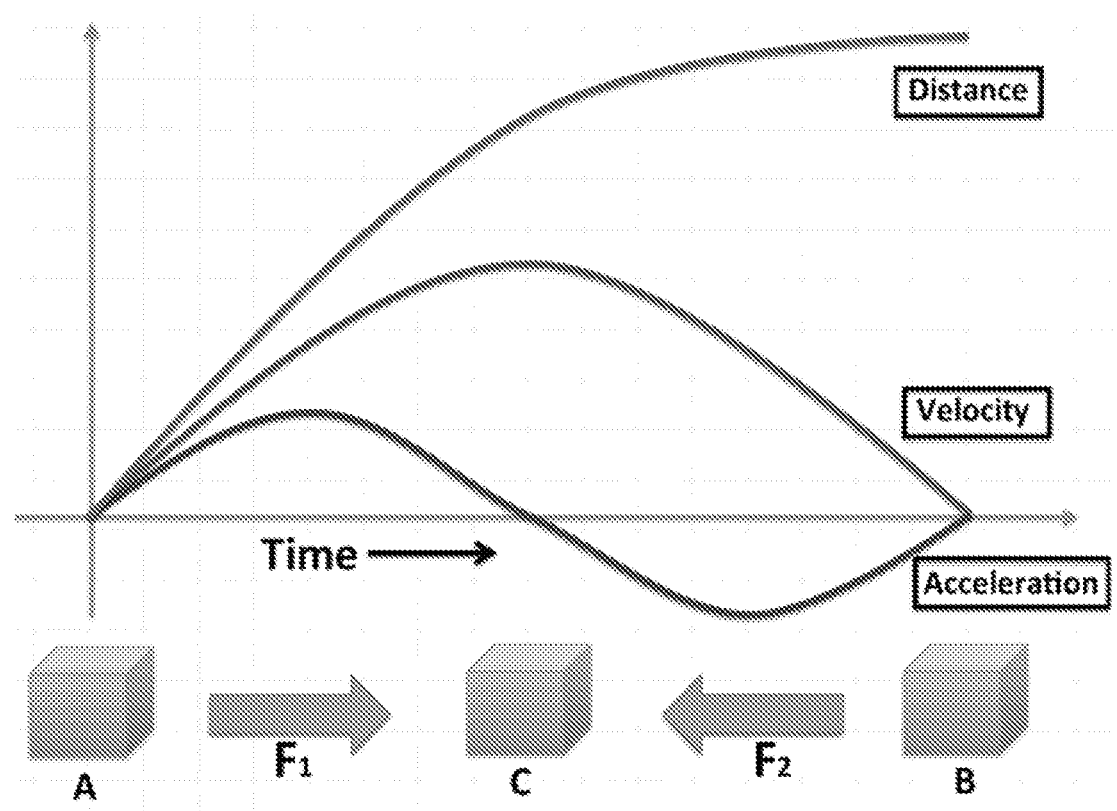
FIG. 33 shows a plot of distance, velocity, and acceleration versus time.

The movement of limbs during walking also follows the basic relationship of the force, velocity, and acceleration discussed with respect to FIG. 33. Each part of the body experiences acceleration due to the force that moves them forward and so does a device placed at that part of the body. The acceleration, recorded by the device at various point of time, can be exploited to get the direction of the force applied to it at that time. A close analysis of human locomotion reveals that the body does not move with same speed throughout the walk. If the walk is divided into repetitive patterns, called gait cycle, it can be observed that at the beginning and end of the cycle the velocity is low. Also, the velocity of the walk slows down whenever either of the feet touches the ground. This means when the leg swings in the air, it experiences two opposite forces. During the first half, a force is applied to increase the velocity of the limb in the direction of the walk and in the next half it reverses its direction to slow down the velocity before touching the ground. The first half of this process can be thought of as an "acceleration phase" and the second half a "deceleration phase".

Multiple subjects carrying smartphones at various places were observed. The phones were carried at locations including inside various kinds of pants pocket, on palm top, in swinging hand, in cases attached to the waist, and inside a backpack. The movement of the subjects was recorded and the sensor data was collected from the smartphones, which were time-synchronized with the camera. Initially, the room was dark and the cameras were running. The smartphones were also sensing the light of the environment through their ambient light sensors. Then, the light was turned on to give a sudden increase in light level sensed by the smartphones as well as the cameras. When sensor data from the smartphones and video from the camera was analyzed, this hint of change in light level was used to achieve millisecond-level synchronization between these two sources of data.

Figure 34A:
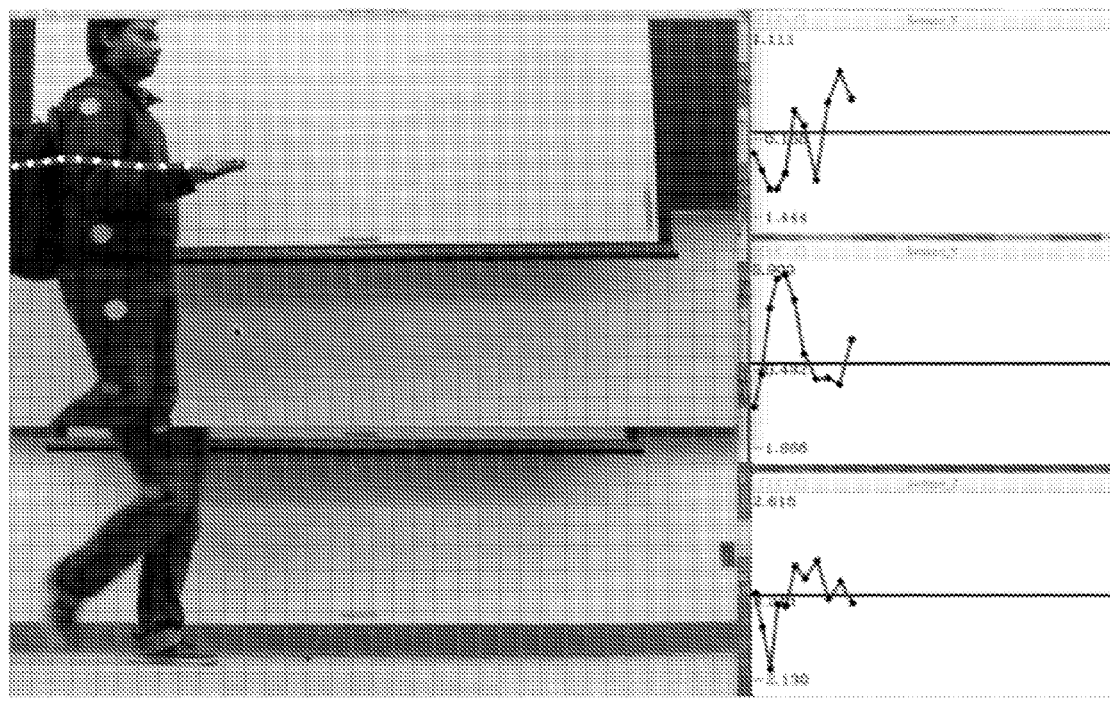
FIG. 34A shows a screen shot of a user walking, with corresponding values of linear acceleration to the right.
Figure 34B:
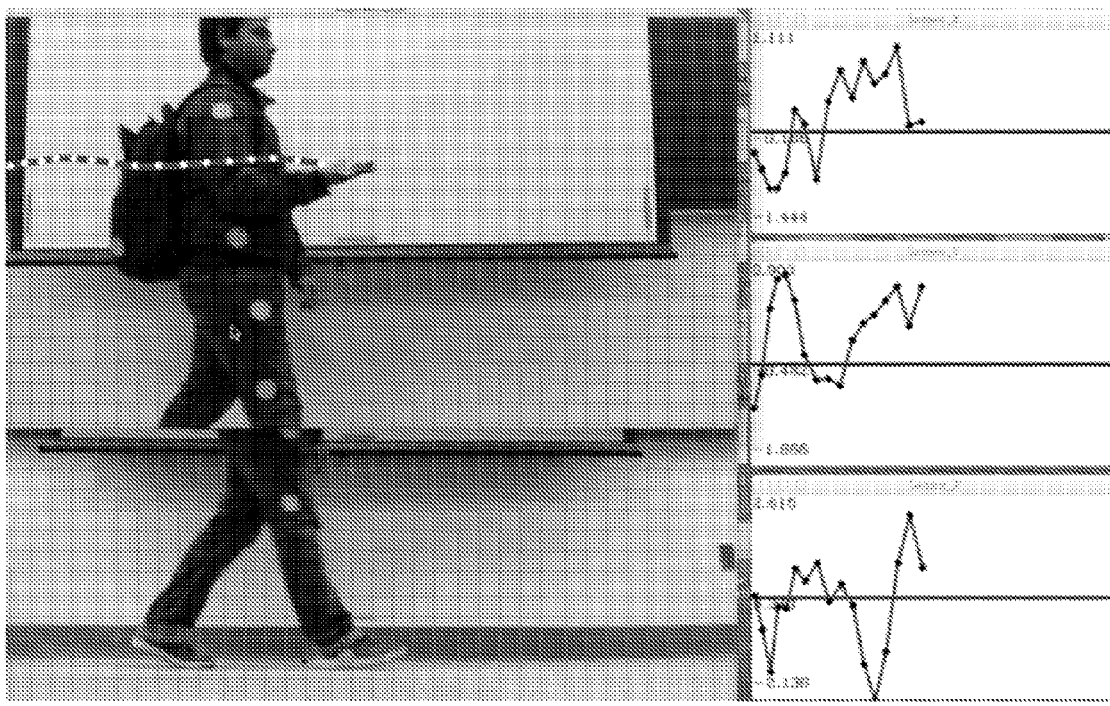
FIG. 34B shows a screen shot of a user walking, with corresponding values of linear acceleration to the right.
Figure 34C:
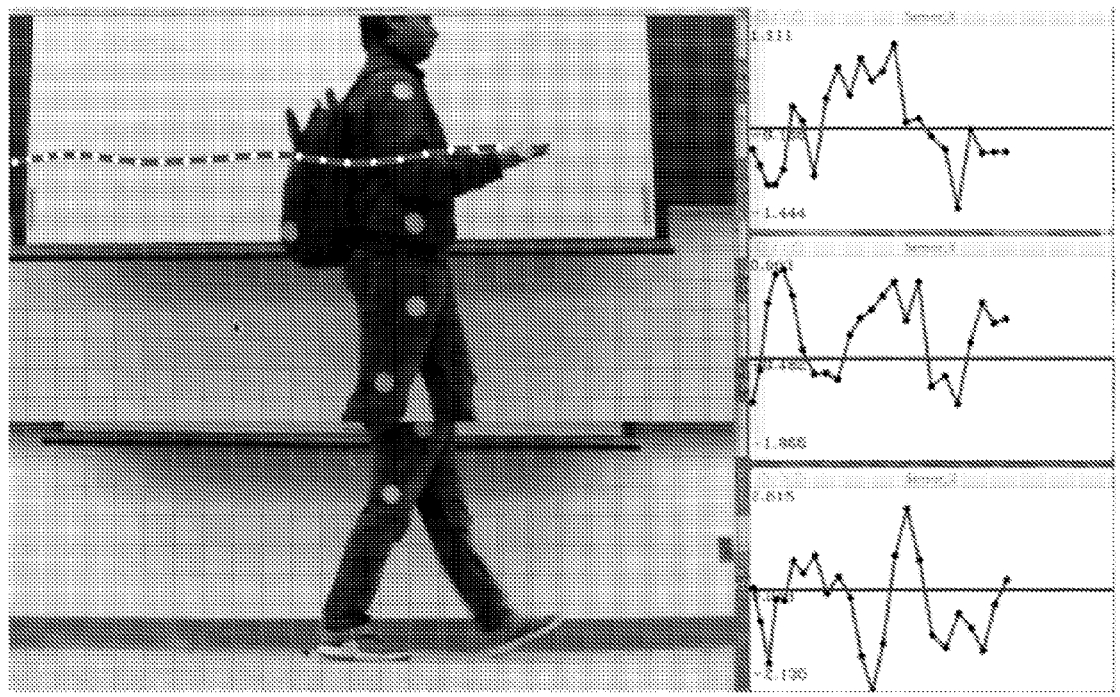
FIG. 34C shows a screen shot of a user walking, with corresponding values of linear acceleration to the right.
Figure 35A:
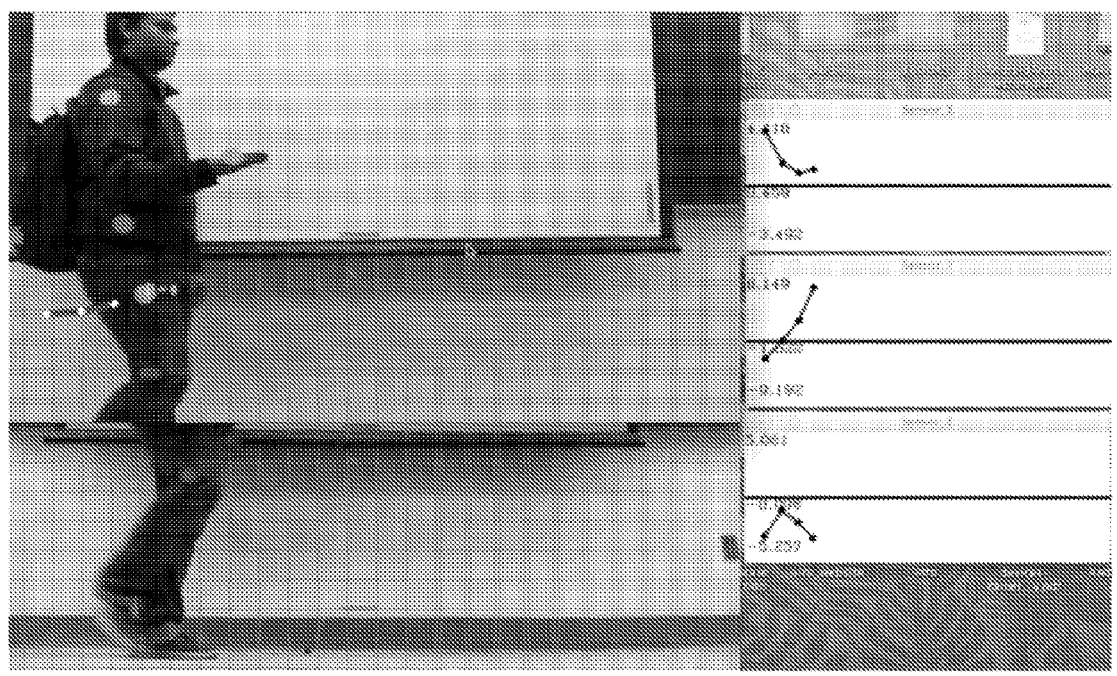
FIG. 35A shows a screen shot of a user walking, with corresponding values of linear acceleration to the right.
Figure 35B:
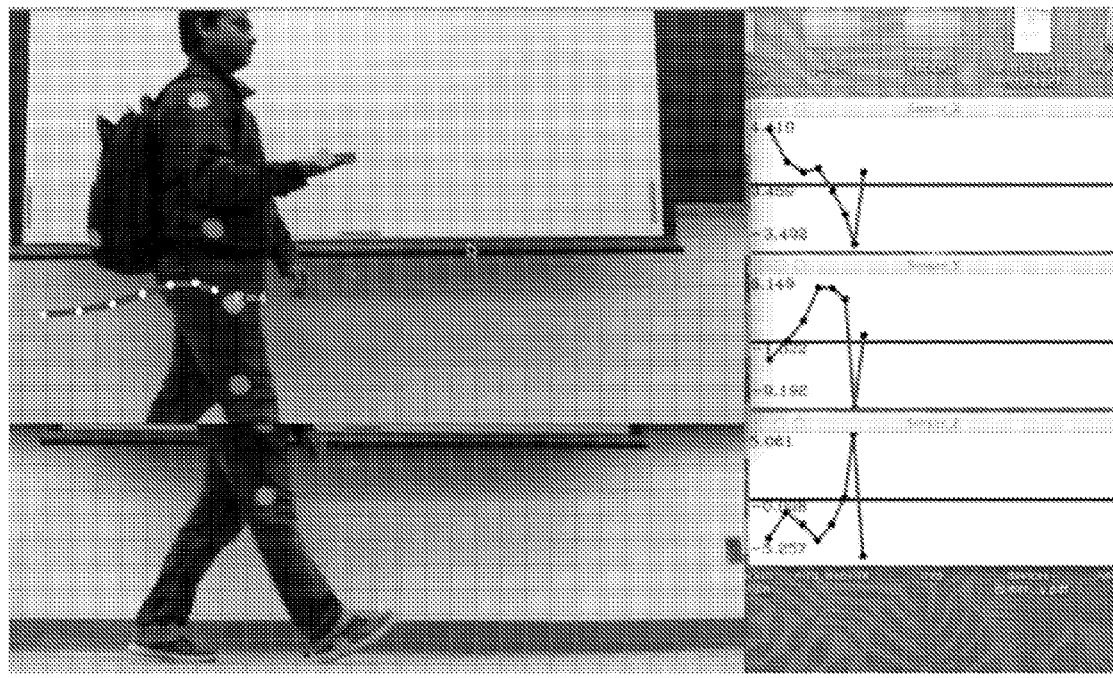
FIG. 35B shows a screen shot of a user walking, with corresponding values of linear acceleration to the right.
Figure 35C:
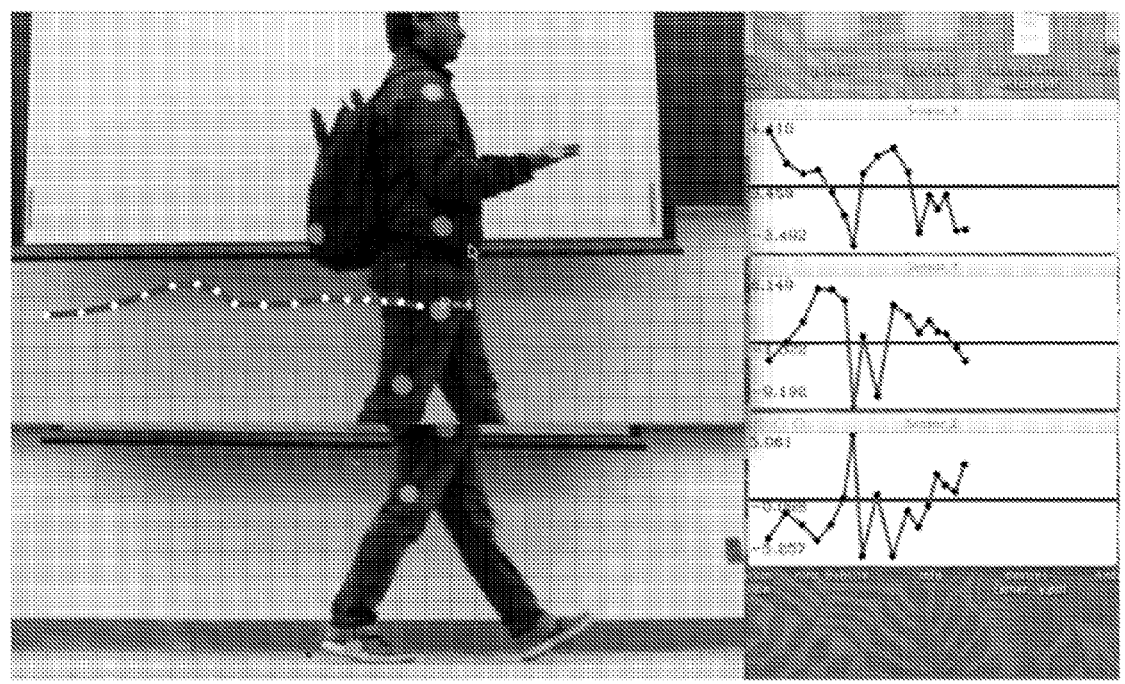
FIG. 35C shows a screen shot of a user walking, with corresponding values of linear acceleration to the right.
Figure 36A:
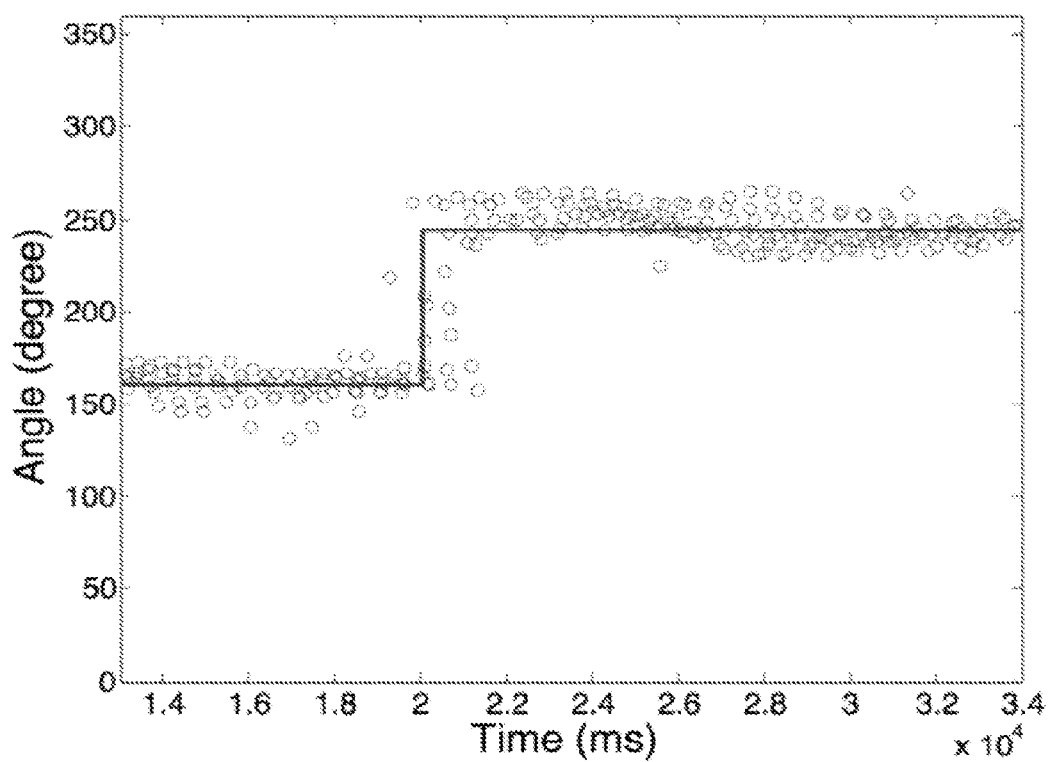
FIGS. 36A and 36B show scatter plots of estimated angles versus time for example implementations.
Figure 36B:
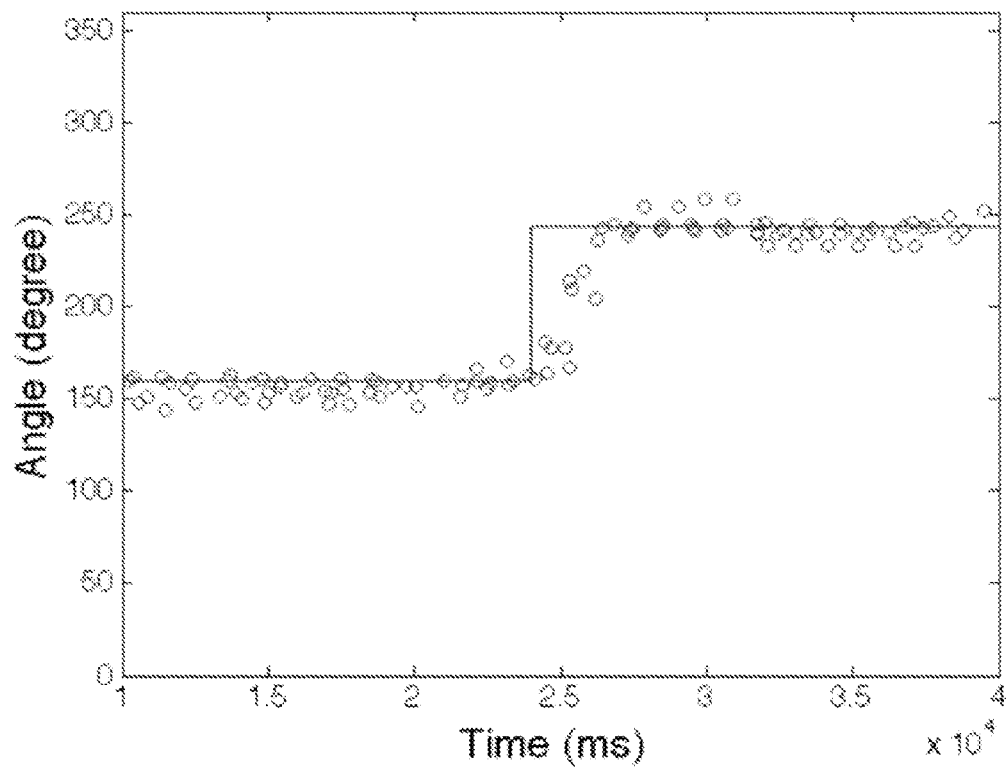
Figure 37:
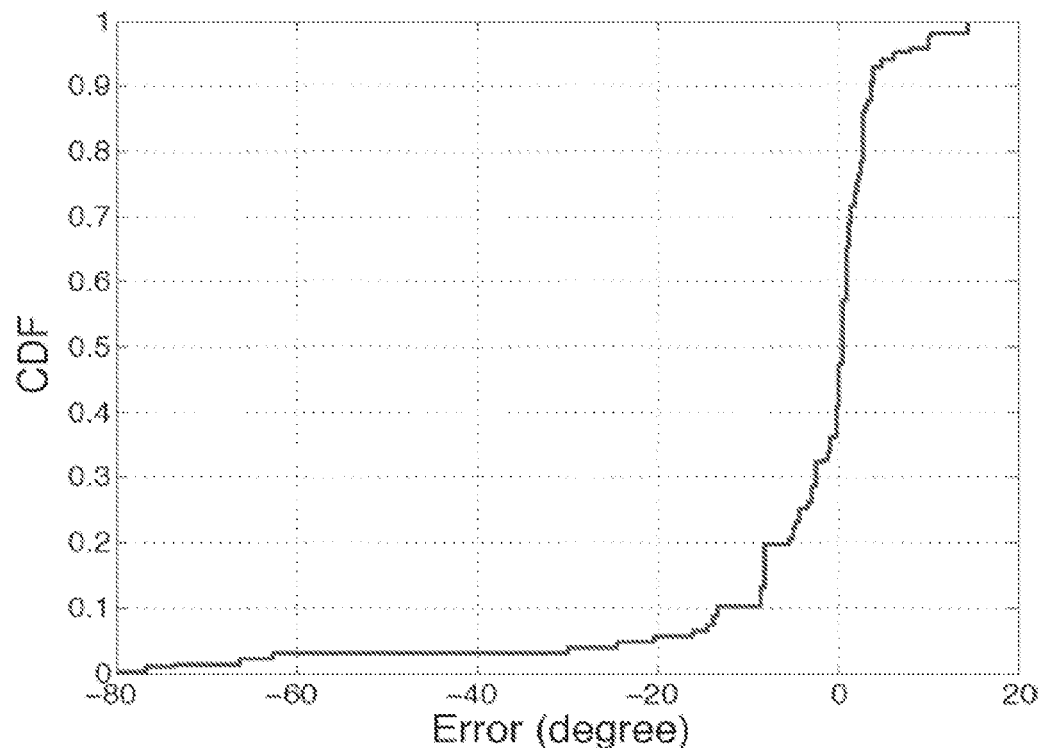
FIG. 37 shows a plot of the CDF of errors in estimated heading direction.

Frame-by-frame movements during the walk of each person were analyzed, as were corresponding changes in the sensor data. FIGS. 34A, 34B, and 34C show the screen shots of the experiment and the corresponding values of linear acceleration in the three small windows on the right. The user held the smartphone on the right palm top during the walk. It also tracks the phone in the video to show the vertical movement of the phone. The window on the top left focuses on the hand and the window below it shows the position of the feet. The screen shots of the same experiment with the linear acceleration data from a smartphone carried in the right pocket of the trousers are given in FIGS. 35A, 35B, and 35C. In the screen shots the changes in the sign of the acceleration vales at different phases of walk can be observed.

The sudden changes in all three axes of the accelerometer can be seen when the leg touches the ground. The results of this experiment lead to the following observations: a) most of the time the body moves in the direction of the leg when it swings in the air (this serves as the basic segment of heading direction of a person for an embodiment of the subject invention); b) the swinging leg experiences a forward force during the first half of the movement and an opposite force during the second half, and the forward force actually shows the heading direction; and c) the movement of the legs and other parts of the body are different in nature. Therefore, for accurate step detection, accelerometer data obtained from devices placed at various parts of the body should be processed to take the location of the sensor into consideration.

Example 9

A heading direction estimation system according to an embodiment of the subject invention was tested. Various users used the system in a predefined path in a corridor and recorded the data including the estimated heading direction. During the walk, each user traveled approximately 25 steps at an angle with magnetic north of 160 degrees before taking a right turn and then again around 30 steps forward at 244 degrees. In this experiment, the 84-degree turn was included in the path to measure the response of the system when the heading direction changes by a large angle. The 160 degree and the 244 degree orientation of the corridor were considered as the ground truth. However, this kind of constant direction value cannot serve as a ground truth for a typical pedestrian walk. In an unrestricted natural walk, the user cannot exactly follow a straight line. Many times, a user will lean towards a side and constantly correct the direction to reach the destination. Therefore, an algorithm that estimates the heading direction at the granularity of a single step cannot use the direction of the line joining the start and end position as the true direction of walk.

Two scenarios were tested, one with the device held in the user's hand (on palm top) and one with the device kept inside a pocket of the user's trousers. In the first scenario, each user held the phone in the hand such that the screen could be watched while walking. This captures one of the common holding positions where a user can use the phone by clicking or typing on the screen or watching something on it. Although there was no restriction on the initial orientation of the phone, the user did not change its orientation during the walk. FIG. 39A shows a scatter plot of estimated angles as a function of time for the first scenario. Referring to FIG. 39A, several traces of this experiment were collected. The dots show the heading angle of the user at each step, and the line shows the actual angle at various times. The calculated heading angle follows the true direction of the walk and changes accordingly. After the turn, the system takes four steps to adopt the new heading angle. The filters used in the system to produce a stable result from the noisy sensors introduce this delay.

Figure 39:
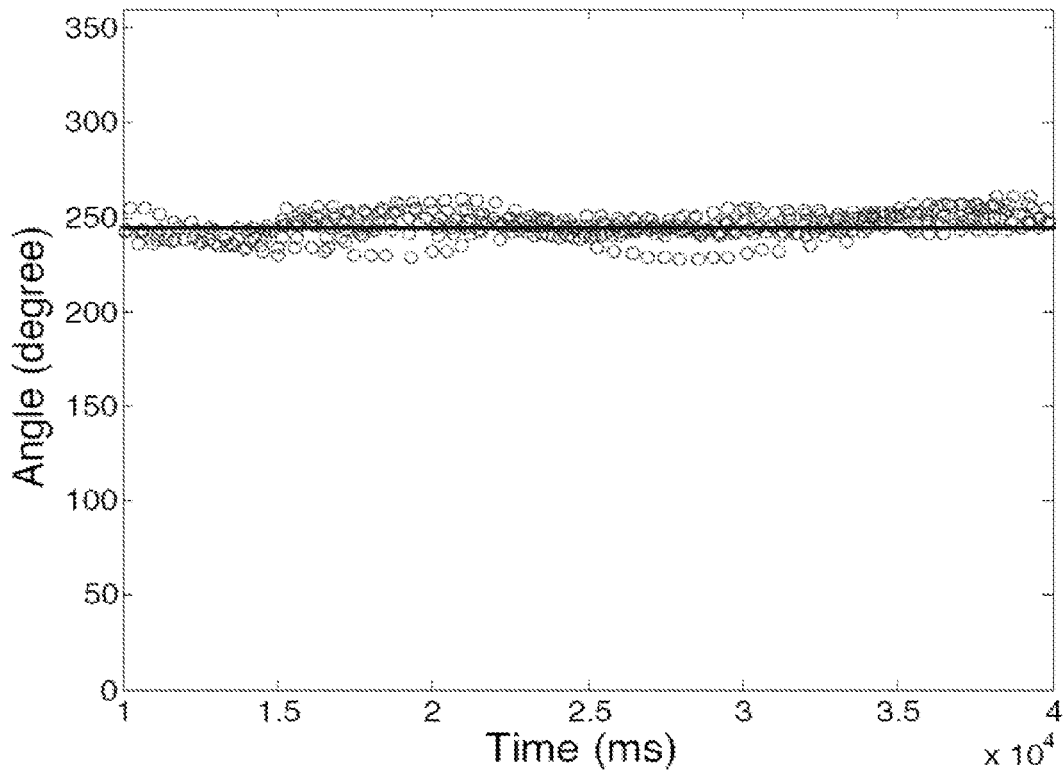
FIG. 39 shows a scatter plot of angle versus time.
Figure 40:
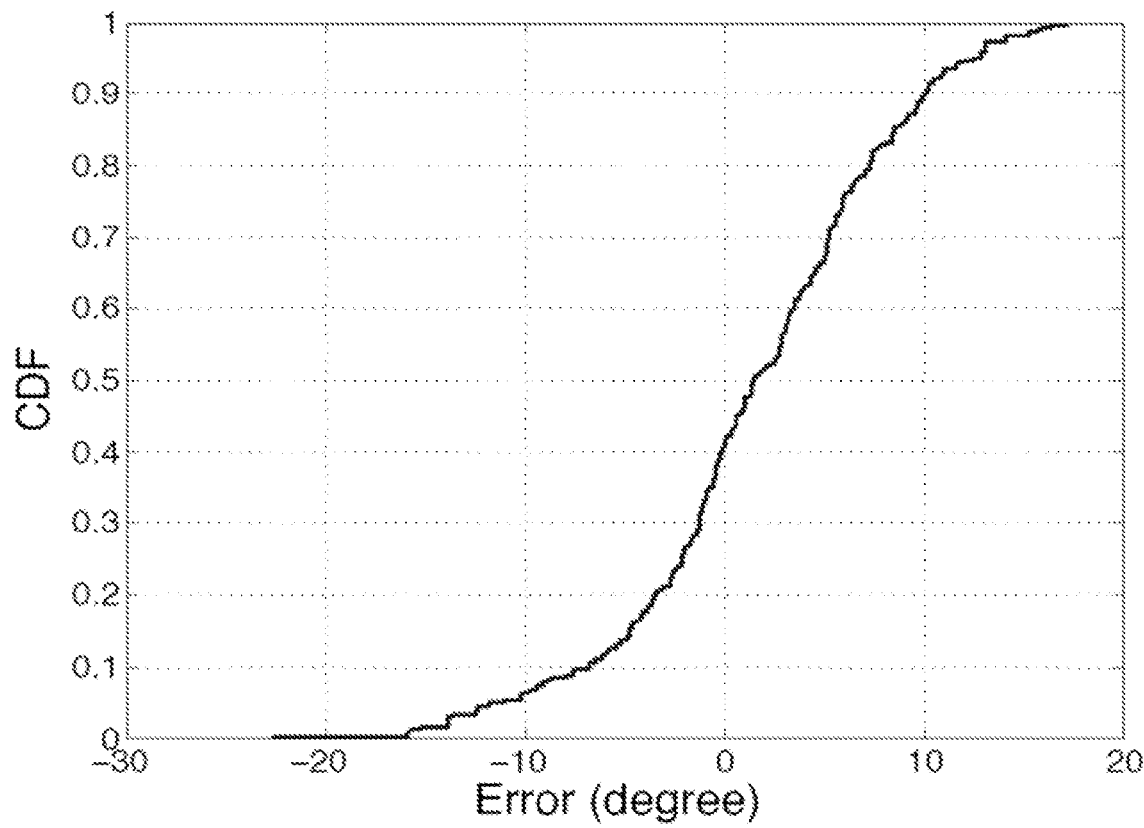
FIG. 40 shows a CDF plot of error in estimated heading direction.

In the second scenario, each user carried the device in a trouser pocket. No restriction was placed on the choice of the pocket and orientation of the phone inside the pocket. The users did not deliberately change the position of the phone during the experiment. FIG. 39B shows a scatter plot of estimated angles as a function of time for the second scenario. Referring to FIG. 39B, a similar scatter plot to that in FIG. 39A was obtained. The error of the estimated heading angles was calculated by taking the difference from the orientation of the corridor. FIG. 40 shows a plot of the CDF of the errors in estimated heading direction. Referring to FIG. 40, the estimated angle remains within 10 degrees of the ground truth for around 70% of the samples. There is a high error region on the plot, from −20 degrees to −80 degrees, for around 5% of the samples. These high errors come from the delay in adopting the 84-degree turn. The mean value of the error is 6 degrees. Table 2 shows various statistics of the error as measured during the experiment.

TABLE 2

Statistics of the error in estimated heading direction.

| Statistics | Value |
| --- | --- |
| Mean | 6.2058 |
| Median | 2.7402 |
| Standard Deviation | 12.4174 |
| Minimum error | 0.0256 |
| Maximum error | 80.3090 |

Example 10

Experiments were designed where the direction of the walk remained unchanged, but the user changed the orientation of the device to large angles. In this test, each user carried a smartphone in hand. Each user walked 60 steps in a straight corridor, and after every 15 steps the orientation of the phone was changed. Under such a scenario, ideally the output of the heading direction estimation system should remain constant throughout the walk and should always point to the actual direction of the walk, unaffected by the device's orientation change.

Figure 38A:
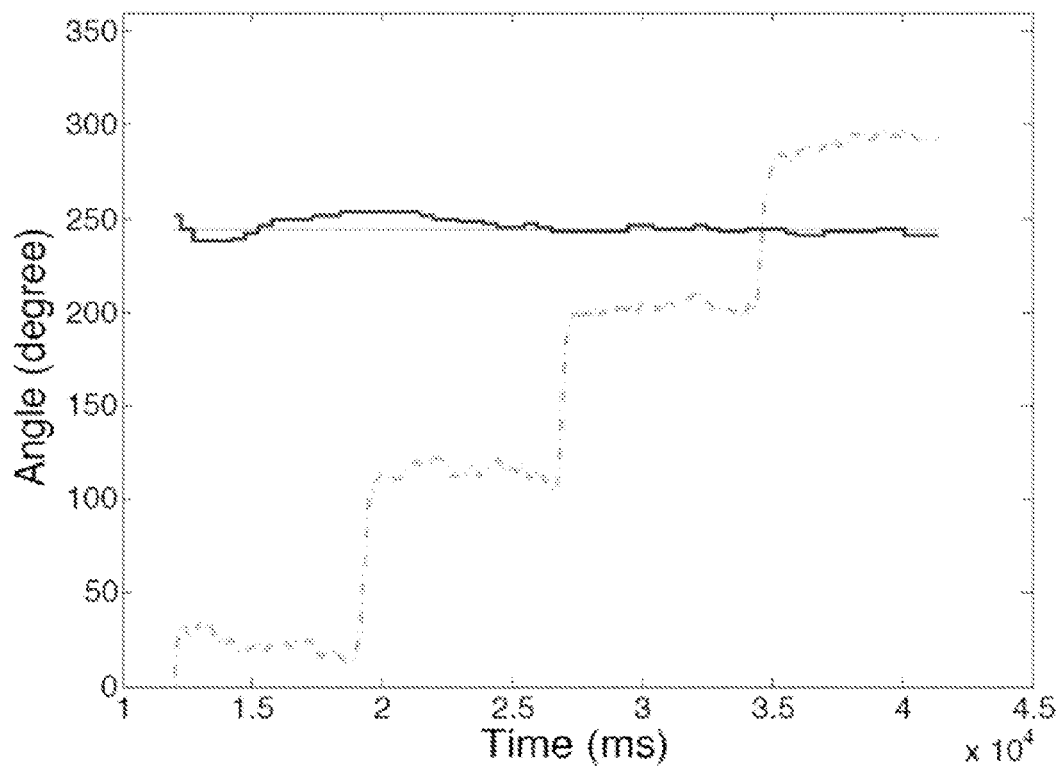
FIGS. 38A and 38B show plots of the angle versus time for example implementations.

In the first experiment, the change in orientation was approximately 90 degrees after every 15 steps. FIG. 38A shows a plot of the angle versus time for this experiment. The direction of the walk as calculated by the system is the dark solid line. The x-axis represents the time of the walk, and the y-axis shows the angle in degrees. All the angles were calculated as the deviation from magnetic north in a horizontal plane. The dashed line shows the compass angle, which is the direction the y-axis of the phone points to. The compass angle gives a hint about the change of the orientation of the phone. The thin solid line (which is very close to the dark solid line) shows the actual orientation angle of the corridor, 244 degrees.

Referring to FIG. 38A, the calculated orientation is not affected by the orientation change. The change in the phone's orientation can be seen orientation from the compass angle plot.

Figure 38B:
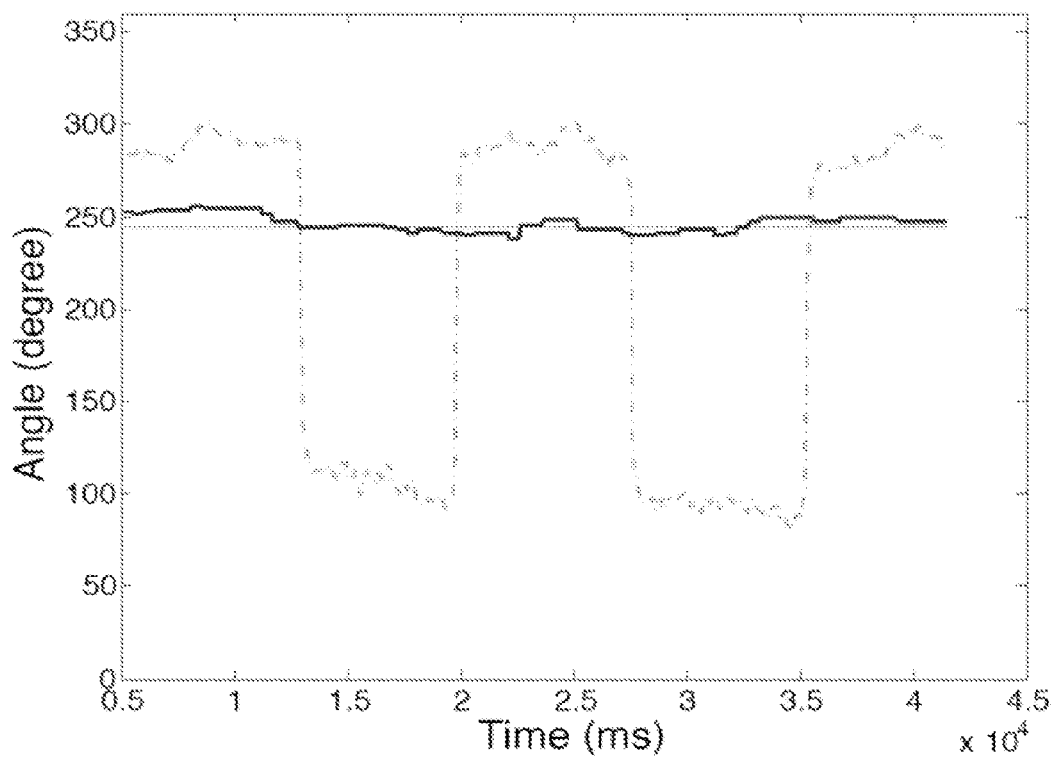

To test in more common orientation change scenarios, in the second experiment, the user switched the phone orientation between texting and calling positions. FIG. 38B shows a plot of angle versus time for this experiment. The user switched the orientation of the smartphone from texting position to calling position after every 15 steps. The direction of the walk as calculated by the system is the dark solid line. The x-axis represents the time of the walk, and the y-axis shows the angle in degrees. All the angles were calculated as the deviation from magnetic north in a horizontal plane. The dashed line shows the compass angle, which is the direction the y-axis of the phone points to. The compass angle gives a hint about the change of the orientation of the phone. The thin solid line (which is very close to the dark solid line) shows the actual orientation angle of the corridor, 244 degrees.

Referring to FIG. 38B, the results of the second experiment are similar to those of the first experiment, shown in FIG. 38A. That is, the system remained unaffected by the orientation change.

The same experiment was repeated with various users, and the data was collected. The initial orientation of the smartphone and the change in orientation was up to the user and therefore random. FIG. 39 shows a scatter plot of angle versus time for all of these traces. The circles represent the calculated angles, and the solid line represents the orientation of the corridor (244 degrees). Referring to FIG. 39, the calculated angle follows the general direction of walk.

The error in heading direction estimation was calculated by taking 244 degrees as the ground truth, although this does not follow the true heading at each step. FIG. 40 shows a CDF plot of the error in the estimated heading direction. Referring to FIG. 40, the error was limited to 10 degrees for more than 80% of the samples. Table 3 shows various statistics, generated on these estimated error values, that summarize the performance of the system in withstanding orientation change to the phone during the walk, based on this Example. The mean of the error remains close to the statistics presented in Table 2.

TABLE 3

Statistics of the error in estimated heading direction.

| Statistics | Value |
|---|---|
| Mean | 5.4701 |
| Median | 4.5573 |
| Standard Deviation | 4.2746 |
| Minimum error | 0.0404 |
| Maximum error | 22.5499 |

Example 11

The performance of the motion mode detection algorithm of a system of the subject invention was tested by recording the calculated motion mode at each step of the user, for multiple users. The users walked in a corridor having one left turn, one about turn, and one right turn. Approximately 80 steps were required for each user to walk on this specific path during the experiment. The users naturally carried the smartphone in one specific pattern for each experiment. The swinging hand (Case 1), pocket (Case'), and palm-top (Case 3) scenarios were focused on for this evaluation. Table 4 shows the confusion matrix with the percentage of the calculated motion modes for each of the experiments. The rows correspond to the experiments with one motion mode and the columns show the percentage of times the algorithm predicted the corresponding motion mode. Each experiment was repeated multiple times for each user, and the results showed that more than 82% of the time the algorithm correctly identified a motion mode. In fact, Case 1 was correctly identified 82.88% of the time, Case 2 was correctly identified 84.04% of the time, and Case 3 was correctly identified 97.22% of the time. Systems and methods of the subject invention can correctly identify each of these cases at least this percentage of the time (i.e., Case 1 at least 82.88% of the time, Case 2 at least 84.04% of the time, and Case 3 at least 97.22% of the time).

TABLE 4

A confusion matrix showing the performance of the motion mode detection algorithm (values indicate the percentage of the calculated motion pattern).

| TrueMode | Case1 (SwingHand) | Case2 (Pocket) | Case3 (PalmTop) | Case4 (Jerk) | Case5 (Other) |
|---|---|---|---|---|---|
| Case 1 | 82.88 | 0.75 | 0 | 15.85 | 0.52 |
| Case 2 | 13.21 | 84.04 | 0 | 0 | 2.75 |
| Case 3 | 0 | 0 | 97.22 | 0 | 2.78 |

Example 12

Figure 41:
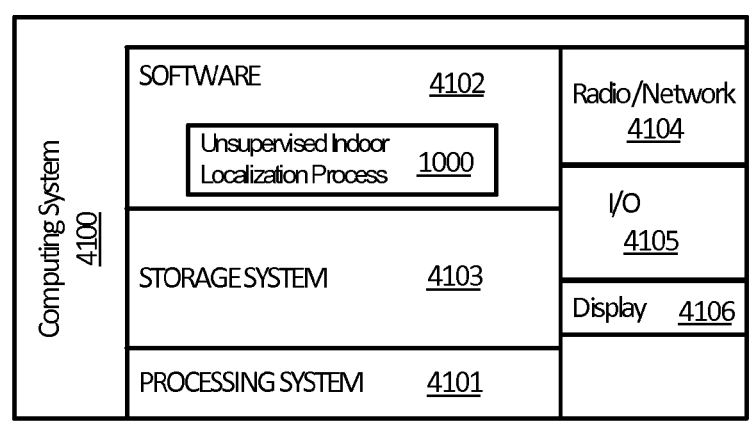
FIG. 41 illustrates a computing system that may be used in some embodiments.

FIG. 41 illustrates a computing system 4100 that may be used in some embodiments. For example, system 4100 can be used in implementing a mobile device such as a smart phone, wearable computer (e.g., watch-based, glasses-based or other wearable form), tablet or the like. In some embodiments, system 4100 is an integrated computing device, such as an integrated PDA and wireless phone. System 4100 can include a power supply (not shown), which may be implemented as one or more batteries and/or an energy harvester (ambient-radiation, photovoltaic, piezoelectric, thermoelectric, electrostatic, and the like).

Referring to FIG. 41, computing system 4100 includes a processing system 4101 that may comprise a microprocessor and other circuitry that retrieves and executes software 4105 from storage system 4103. Processing system 4101 may be implemented within a single processing device but may also be distributed across multiple processing devices or subsystems that cooperate in executing program instructions. Examples of processing system 4101 include general purpose central processing units, application specific processors, and logic devices, as well as any other type of processing device, combinations, or variations thereof.

Processing system 4101 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 4104).

Storage system 4103 may comprise any computer readable storage media readable by processing system 4101 and capable of storing software 4105. Storage system 4103 may include volatile and nonvolatile, removable and non-removable media implemented in any method or technology for storage of information, such as computer readable instructions, data structures, program modules, or other data. Examples of storage media (and computer-readable storage media) include volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic disk storage, magnetic tape, CDs, DVDs, or any other suitable storage media. In no case is the storage media a propagated signal. In addition to storage media, in some implementations storage system 4103 may also include communication media over which software 4105 may be communicated internally or externally. Storage system 4103 may be implemented as a single storage device but may also be implemented across multiple storage devices or subsystems co-located or distributed relative to each other. Storage system 4103 may comprise additional elements, such as a controller, capable of communicating with processing system 4101.

Software 4105 may be implemented in program instructions and among other functions may, when executed by computing system 4100 in general or processing system 4101 in particular, direct computing system 4100 or processing system 4101 to operate as described herein for indoor localization and/or heading direction estimation 1000 (see e.g., FIGS. 2-5 and 18). Software 4105 may include additional processes, programs, or components, such as operating system software or other application software. Software 4105 may also comprise firmware or some other form of machine-readable processing instructions executable by processing system 4101.

In general, software 4105 may, when loaded into processing system 4101 and executed, transform computing system 4100 overall from a general-purpose computing system into a special-purpose computing system customized to facilitate indoor localization and/or heading direction as described herein for each implementation. Indeed, encoding software 4105 on storage system 4103 may transform the physical structure of storage system 4103. The specific transformation of the physical structure may depend on various factors in different implementations of this description. Examples of such factors may include, but are not limited to the technology used to implement the storage media of storage system 4103 and whether the computer-storage media are characterized as primary or secondary storage.

For example, if the computer-storage media are implemented as semiconductor-based memory, software 4105 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 4100 is generally intended to represent a computing system with which software 4105 is deployed and executed in order to implement indoor localization and/or heading direction estimation processes 1000 (and variations thereof). However, computing system 4100 may also represent any computing system on which software 4105 may be staged and from where software 4105 may be distributed, transported, downloaded, or otherwise provided to yet another computing system for deployment and execution, or yet additional distribution.

Referring again to FIG. 41, communication interface (e.g., radio/network interface 4104) may include communication connections and devices that allow for communication between computing system 4100 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface I/O 4105, which is optional, may include a mouse, a keyboard, a voice input device, a touch input device for receiving a touch gesture from a user, a motion input device for detecting non-touch gestures and other motions by a user, and other comparable input devices and associated processing elements capable of receiving user input from a user. Output devices such as a display 4106, speakers, haptic devices, and other types of output devices may also be included in user interface 4105.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents or publications mentioned in this specification (including in the References section) are herein incorporated by reference in their entireties to the same extent as if each individual publication was specifically and individually indicated to be incorporated by reference.

It should be understood that the examples and embodiments described herein are for illustrative purposes only and that various modifications or changes in light thereof will be suggested to persons skilled in the art and are to be included within the spirit and purview of this application. One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A method of unsupervised indoor localization, the method comprising:
    estimating a location of a user within an indoor environment, wherein estimating the location of the user comprises:
        estimating a movement trace of the user within the indoor environment using first sensor data obtained from at least one sensor, wherein the first sensor data comprises accelerometer data; and
        identifying at least one landmark within the indoor environment using second sensor data obtained from the at least one sensor;
    wherein estimating the movement trace of the user comprises:
        estimating a number of steps taken by the user over a first period of time by analyzing the accelerometer data;
        estimating a distance traveled by the user during the first period of time by multiplying the number of steps with an estimated step size;
        estimating a heading direction of the user; and
        calculating a movement trace vector based on the distance traveled and the heading direction.

2. The method of claim 1, wherein the second sensor data comprises at least one selected from the group consisting of: accelerometer data; compass data; gyroscope data; magnetometer data; barometer data; microphone data; light sensor data; temperature sensor data; chemical sensor data; humidity sensor data; Bluetooth signal strength data; WiFi signal strength data; and cellular signal strength data.

3. The method according to claim 1, wherein at least a portion of the first sensor data is the same as at least a portion of the second sensor data.

4. The method according to claim 1, wherein the at least one landmark does not include a label.

5. The method according to claim 1, wherein the at least one landmark comprises at least one structure selected from the group consisting of: a building entrance; a staircase; an elevator; and an escalator.

6. The method according to claim 1, further comprising:
    identifying a plurality of landmarks within the indoor environment using the second sensor data; and
    resetting the estimate of the movement trace of the user each time a landmark is identified, wherein the estimate of the movement trace of the user is reset to the location of the identified landmark.

7. The method according to claim 1, further comprising:
    obtaining sensor data from a plurality of users within the indoor environment; and
    analyzing the sensor data from the plurality of users to obtain a weighted-average estimated location for each of a plurality of landmarks within the indoor environment.

8. The method of claim 1, wherein the entire method is performed locally by a device of the user, wherein the device comprises the at least one sensor.

9. The method according to claim 8, wherein the first sensor data and the second sensor data remain locally stored on the device and are not uploaded to any other device during the method.

10. A method of unsupervised indoor localization, the method comprising:
    estimating a location of a user within an indoor environment, wherein estimating the location of the user comprises:
    estimating a movement trace of the user within the indoor environment using first sensor data obtained from at least one sensor, wherein the first sensor data comprises accelerometer data, gyroscopic data, and compass data;
    identifying at least one landmark within the indoor environment using second sensor data obtained from the at least one sensor;
    estimating a heading direction of the user, wherein estimating the heading direction of the user comprises:
        determining a motion mode of the user by analyzing the accelerometer data;
        determining a number of steps taken by the user by analyzing the accelerometer data in view of the motion mode;
        determining an initial heading direction of the user in three-dimensional space using the gyroscope data and the number of steps;
        determining a heading direction vector of the user by estimating the heading angle of the user relative to a reference direction; and
        projecting the heading direction vector onto a plane on which the user is moving to estimate the heading direction of the user.

11. The method according to claim 10, wherein projecting the heading direction vector onto a plane on which the user is moving comprises projecting the heading direction vector onto a horizontal plane perpendicular to a gravity vector.

* * * * *